(12) United States Patent
Grasso et al.

(10) Patent No.: US 7,522,745 B2
(45) Date of Patent: Apr. 21, 2009

(54) SENSOR AND IMAGING SYSTEM

(76) Inventors: Donald P. Grasso, 472 Elder La., Winnetka, IL (US) 60093; John Sonn, 7155 O'Donohue, Hartford, WI (US) 53029; Steve Johnson, 32 Saronnet Trail, Little Compton, RI (US) 02837

( * ) Notice: Subject to any disclaimer, the term of this patent is extended or adjusted under 35 U.S.C. 154(b) by 1312 days.

(21) Appl. No.: 10/363,149

(22) PCT Filed: Aug. 31, 2001

(86) PCT No.: PCT/US01/27351

§ 371 (c)(1),
(2), (4) Date: Sep. 15, 2003

(87) PCT Pub. No.: WO02/19698

PCT Pub. Date: Mar. 7, 2002

(65) Prior Publication Data

US 2005/0074140 A1 Apr. 7, 2005

Related U.S. Application Data

(60) Provisional application No. 60/229,613, filed on Aug. 31, 2000.

(51) Int. Cl.
*G06K 9/00* (2006.01)
*A61B 3/14* (2006.01)

(52) U.S. Cl. .......................... 382/103; 382/181; 351/210
(58) Field of Classification Search ................. 382/103, 382/181; 351/200, 205, 206, 209, 210, 246; 348/169
See application file for complete search history.

(56) References Cited

U.S. PATENT DOCUMENTS

| 2,758,676 | A | 8/1956 | Nikazy |
| 3,195,126 | A | 7/1965 | Barker |
| 3,255,434 | A | 6/1966 | Schwarz |
| 3,534,499 | A | 10/1970 | Chaffee |
| 3,562,423 | A | 2/1971 | Murphy |
| 3,590,151 | A | 6/1971 | Keith |
| 3,663,937 | A | 5/1972 | Bolner |
| 3,668,625 | A | 6/1972 | Wolf et al. |
| 3,685,012 | A | 8/1972 | Case et al. |
| 3,686,434 | A | 8/1972 | Lemelson |
| 3,691,302 | A | 9/1972 | Gaebele et al. |
| 3,691,556 | A | 9/1972 | Bloice |
| 3,740,466 | A | 6/1973 | Marshall et al. |
| 3,796,208 | A | 3/1974 | Bloice |

(Continued)

OTHER PUBLICATIONS

Agrawal et al., entitled "Computer Analysis of Motion using a Network of Processors," pp. 305-308, published at Wayne State University in Detroilt Michigan in 1980.

(Continued)

*Primary Examiner*—Abolfazl Tabatabai
(74) *Attorney, Agent, or Firm*—Factor & Lake, Ltd.

(57) ABSTRACT

A system is disclosed having a camera, a processor, and a user interface. The camera transmits image data responsive to a scene within a field of view. In response to the image data, the processor indicates whether a condition has been satisfied. The user interface is operably connected to the processor and allows a user to select criteria for detection of objects, for indicating criteria selected, and for providing visual confirmation that an object has been detected.

69 Claims, 47 Drawing Sheets

U.S. PATENT DOCUMENTS

| | | |
|---|---|---|
| 3,816,648 A | 6/1974 | Noll et al. |
| 3,852,592 A | 12/1974 | Scoville et al. |
| 3,890,463 A | 6/1975 | Ikegami et al. |
| 3,924,130 A | 12/1975 | Cohen et al. |
| 3,930,735 A | 1/1976 | Kerr |
| 3,947,833 A | 3/1976 | Eckstein, Jr. |
| 3,988,533 A | 10/1976 | Mick et al. |
| 4,044,860 A | 8/1977 | Kaneko et al. |
| 4,063,282 A | 12/1977 | Exton |
| 4,081,830 A | 3/1978 | Mick et al. |
| 4,133,004 A | 1/1979 | Fitts |
| 4,136,950 A | 1/1979 | Labrum et al. |
| 4,148,062 A | 4/1979 | Kamin |
| 4,160,998 A | 7/1979 | Kamin |
| 4,163,357 A | 8/1979 | Greive et al. |
| 4,163,991 A | 8/1979 | Burrig |
| 4,173,402 A | 11/1979 | Hosike et al. |
| 4,183,013 A | 1/1980 | Agrawala et al. |
| 4,185,298 A | 1/1980 | Billet et al. |
| 4,187,519 A | 2/1980 | Vitels et al. |
| 4,198,653 A | 4/1980 | Kamin |
| 4,214,265 A | 7/1980 | Olesen |
| 4,219,845 A | 8/1980 | Gibbons et al. |
| 4,219,847 A | 8/1980 | Pinkney et al. |
| 4,240,109 A | 12/1980 | Michael et al. |
| 4,245,243 A | 1/1981 | Gutjahr et al. |
| 4,249,207 A | 2/1981 | Harman et al. |
| 4,249,212 A | 2/1981 | Ito et al. |
| 4,257,063 A | 3/1981 | Loughry et al. |
| 4,258,351 A | 3/1981 | Shigeta et al. |
| 4,298,858 A | 11/1981 | Romanski |
| 4,317,130 A | 2/1982 | Brown |
| 4,337,481 A | 6/1982 | Mick et al. |
| 4,364,113 A | 12/1982 | Sengebusch et al. |
| 4,395,699 A | 7/1983 | Sternberg |
| 4,408,224 A | 10/1983 | Yoshida |
| 4,410,910 A | 10/1983 | Andes |
| 4,414,685 A | 11/1983 | Sternberg |
| 4,433,325 A | 2/1984 | Tanaka et al. |
| 4,433,438 A | 2/1984 | Couturier |
| 4,435,835 A | 3/1984 | Sakow et al. |
| 4,449,144 A | 5/1984 | Suzuki |
| 4,450,482 A | 5/1984 | Ackerman |
| 4,455,550 A | 6/1984 | Iguchi |
| 4,458,266 A | 7/1984 | Mahoney |
| 4,479,145 A | 10/1984 | Azuma et al. |
| 4,490,851 A | 12/1984 | Gerhart et al. |
| 4,493,420 A | 1/1985 | Dennis |
| 4,506,765 A | 3/1985 | Payne et al. |
| 4,520,343 A | 5/1985 | Koh et al. |
| 4,520,504 A | 5/1985 | Walker et al. |
| 4,543,567 A | 9/1985 | Shiratan et al. |
| 4,554,459 A | 11/1985 | Tsutsumi et al. |
| 4,555,724 A | 11/1985 | Enriquez |
| 4,556,900 A | 12/1985 | Willis |
| 4,565,029 A | 1/1986 | Kornbrekke et al. |
| 4,569,078 A | 2/1986 | Zuk |
| 4,574,393 A | 3/1986 | Blackwell et al. |
| 4,577,344 A | 3/1986 | Waslen et al. |
| 4,589,030 A | 5/1986 | Klay |
| 4,589,139 A | 5/1986 | Hada et al. |
| 4,626,891 A | 12/1986 | Achiha |
| 4,626,908 A | 12/1986 | Tani |
| 4,639,767 A | 1/1987 | Suzuki |
| 4,641,120 A | 2/1987 | Bonfig et al. |
| 4,641,356 A | 2/1987 | Sternberg |
| 4,653,109 A | 3/1987 | Lemelson et al. |
| 4,662,479 A | 5/1987 | Tsuji et al. |
| 4,665,554 A | 5/1987 | Sternberg |
| 4,669,218 A | 6/1987 | Kornbrekke et al. |
| 4,679,077 A | 7/1987 | Yuasa et al. |
| 4,680,704 A | 7/1987 | Konicek et al. |
| 4,685,145 A | 8/1987 | Schiller |
| 4,685,146 A | 8/1987 | Fenster et al. |
| 4,692,806 A | 9/1987 | Anderson et al. |
| 4,694,329 A | 9/1987 | Belmares-Sarabia et al. |
| 4,698,937 A | 10/1987 | Kornbrekke et al. |
| 4,709,264 A | 11/1987 | Tamusa et al. |
| 4,736,252 A | 4/1988 | Nakagawa et al. |
| 4,737,847 A | 4/1988 | Araki et al. |
| 4,739,401 A | 4/1988 | Sacks et al. |
| 4,742,549 A | 5/1988 | Roschier |
| 4,760,607 A | 7/1988 | Sternberg et al. |
| 4,779,131 A | 10/1988 | Matsumoto et al. |
| 4,783,833 A | 11/1988 | Kawabata et al. |
| 4,794,248 A | 12/1988 | Gray |
| 4,799,243 A | 1/1989 | Zepke |
| 4,807,034 A | 2/1989 | Takeuchi et al. |
| 4,823,010 A | 4/1989 | Kornbrekke et al. |
| 4,825,393 A | 4/1989 | Nishiya |
| 4,831,641 A | 5/1989 | Niemi |
| 4,839,648 A | 6/1989 | Beucher et al. |
| 4,845,761 A | 7/1989 | Cate et al. |
| 4,847,772 A | 7/1989 | Michalopoulos et al. |
| 4,849,906 A | 7/1989 | Chodos et al. |
| 4,858,156 A | 8/1989 | Martin |
| 4,860,371 A | 8/1989 | Matsuyama et al. |
| 4,868,651 A | 9/1989 | Chou et al. |
| 4,871,948 A | 10/1989 | Nelson |
| 4,874,063 A | 10/1989 | Taylor |
| 4,876,728 A | 10/1989 | Roth |
| 4,881,270 A | 11/1989 | Knecht et al. |
| 4,884,136 A | 11/1989 | Ninomiya et al. |
| 4,906,940 A | 3/1990 | Greene et al. |
| 4,908,704 A | 3/1990 | Fujioka et al. |
| 4,920,572 A | 4/1990 | Sugita et al. |
| 4,924,310 A | 5/1990 | von Brandt |
| 4,924,416 A | 5/1990 | Sasao |
| 4,928,176 A | 5/1990 | Schmidt et al. |
| 4,931,864 A | 6/1990 | Kawamura et al. |
| 4,937,878 A | 6/1990 | Lo et al. |
| 4,947,353 A | 8/1990 | Quinlan, Jr. |
| 4,951,137 A | 8/1990 | Kisov et al. |
| 4,959,714 A | 9/1990 | Lo et al. |
| 4,962,419 A | 10/1990 | Hibbard et al. |
| 4,967,083 A | 10/1990 | Kornbrekke et al. |
| 4,969,202 A | 11/1990 | Groezinger |
| 4,974,077 A | 11/1990 | Kusaba |
| 4,975,970 A | 12/1990 | Zettel et al. |
| 4,975,973 A | 12/1990 | Kasane et al. |
| 4,979,136 A | 12/1990 | Weiman et al. |
| 4,984,071 A | 1/1991 | Yonezawa |
| 4,985,618 A | 1/1991 | Inada et al. |
| 4,987,602 A | 1/1991 | Brunner et al. |
| 4,991,092 A | 2/1991 | Greensite |
| 5,001,557 A | 3/1991 | Begle |
| 5,008,739 A | 4/1991 | D'Luua et al. |
| 5,010,578 A | 4/1991 | Siener et al. |
| 5,018,218 A | 5/1991 | Peregrim et al. |
| 5,022,062 A | 6/1991 | Annis |
| 5,023,809 A | 6/1991 | Spackman et al. |
| 5,031,227 A | 7/1991 | Raasch et al. |
| 5,032,905 A | 7/1991 | Koga |
| 5,034,986 A | 7/1991 | Karmann et al. |
| 5,047,851 A | 9/1991 | Sauerwein et al. |
| 5,052,045 A | 9/1991 | Peregrim et al. |
| 5,067,014 A | 11/1991 | Bergen et al. |
| 5,075,632 A | 12/1991 | Payne et al. |
| 5,091,967 A | 2/1992 | Ohsawa |
| 5,099,324 A | 3/1992 | Abe |
| 5,101,440 A | 3/1992 | Watanabe et al. |
| 5,103,305 A | 4/1992 | Watanabe |
| 5,115,477 A | 5/1992 | Groezinger |
| 5,119,442 A | 6/1992 | Brown |

| | | | | | |
|---|---|---|---|---|---|
| 5,121,201 A | 6/1992 | Seki | 5,598,338 A | 1/1997 | Tanigrchi et al. |
| 5,134,472 A | 7/1992 | Abe | 5,604,822 A | 2/1997 | Pearson et al. |
| 5,134,661 A | 7/1992 | Reinsch | 5,606,432 A | 2/1997 | Ohtsuka et al. |
| 5,140,649 A | 8/1992 | Kageyama | 5,609,152 A | 3/1997 | Pellegrino et al. |
| 5,142,152 A | 8/1992 | Boiucaner | 5,612,928 A | 3/1997 | Haley et al. |
| 5,149,921 A | 9/1992 | Picado | 5,617,484 A | 4/1997 | Wada et al. |
| 5,150,421 A | 9/1992 | Morishita et al. | 5,621,868 A | 4/1997 | Mizutani et al. |
| 5,150,426 A | 9/1992 | Bauh et al. | 5,625,709 A | 4/1997 | Kasdon |
| 5,151,945 A | 9/1992 | Lee et al. | 5,631,975 A | 5/1997 | Riglet et al. |
| 5,159,646 A | 10/1992 | Kumagai | 5,631,984 A | 5/1997 | Graf et al. |
| 5,161,107 A | 11/1992 | Mayeaux et al. | 5,640,468 A | 6/1997 | Hsu |
| 5,162,902 A | 11/1992 | Bell et al. | 5,657,403 A | 8/1997 | Wolff et al. |
| 5,181,254 A | 1/1993 | Schweizer et al. | 5,668,890 A | 9/1997 | Winkelman |
| 5,182,776 A | 1/1993 | Suzuki et al. | 5,673,355 A | 9/1997 | Strolle et al. |
| 5,182,778 A | 1/1993 | Rudek et al. | 5,675,624 A | 10/1997 | Relihan et al. |
| 5,187,747 A | 2/1993 | Capello et al. | 5,682,438 A | 10/1997 | Kojima et al. |
| 5,212,740 A | 5/1993 | Pack et al. | 5,684,898 A | 11/1997 | Brady et al. |
| 5,239,596 A | 8/1993 | Mahoney | 5,687,249 A | 11/1997 | Kato |
| 5,241,608 A | 8/1993 | Fogel | 5,687,251 A | 11/1997 | Erler et al. |
| 5,243,663 A | 9/1993 | Kudoh | 5,701,163 A | 12/1997 | Richards et al. |
| 5,243,668 A | 9/1993 | Kitamura et al. | 5,727,080 A | 3/1998 | Cox et al. |
| 5,247,366 A | 9/1993 | Ginosar et al. | 5,734,746 A | 3/1998 | Jaspers |
| 5,249,241 A | 9/1993 | Silverman et al. | 5,740,801 A | 4/1998 | Branson |
| 5,257,209 A | 10/1993 | Maskandey | 5,748,773 A | 5/1998 | Tashiro et al. |
| 5,258,586 A | 11/1993 | Suzuki et al. | 5,748,802 A | 5/1998 | Winkelman |
| 5,263,098 A | 11/1993 | Hovikami | 5,756,981 A | 5/1998 | Roustaei et al. |
| 5,271,064 A | 12/1993 | Dhawan et al. | 5,757,286 A | 5/1998 | Jonsson et al. |
| 5,281,964 A | 1/1994 | Iida et al. | 5,761,326 A | 6/1998 | Brady et al. |
| 5,282,337 A | 2/1994 | Duhame et al. | 5,771,485 A | 6/1998 | Echigo |
| 5,283,573 A | 2/1994 | Takatov et al. | 5,774,569 A | 6/1998 | Waldenmaier |
| 5,289,520 A | 2/1994 | Pellegrino et al. | 5,799,100 A | 8/1998 | Clarke et al. |
| 5,291,313 A | 3/1994 | Kim | 5,799,106 A | 8/1998 | Mooney et al. |
| 5,294,986 A | 3/1994 | Tsuji et al. | 5,802,208 A | 9/1998 | Podilchuk et al. |
| 5,296,852 A | 3/1994 | Rathi | 5,808,697 A | 9/1998 | Fujimura et al. |
| 5,298,697 A | 3/1994 | Suzuki et al. | 5,809,162 A | 9/1998 | Csipkes et al. |
| 5,300,739 A | 4/1994 | Bittner | 5,822,453 A | 10/1998 | Lee et al. |
| 5,305,395 A | 4/1994 | Mahoney et al. | 5,825,922 A | 10/1998 | Pearson et al. |
| 5,311,598 A | 5/1994 | Bose et al. | 5,832,111 A | 11/1998 | Florent |
| 5,313,295 A | 5/1994 | Taniguchi et al. | 5,832,118 A | 11/1998 | Kim |
| 5,315,389 A | 5/1994 | Izawa et al. | 5,832,139 A | 11/1998 | Battesman et al. |
| 5,319,547 A | 6/1994 | Krug et al. | 5,835,613 A | 11/1998 | Breed et al. |
| 5,353,021 A | 10/1994 | Toyamas | 5,835,618 A | 11/1998 | Fang et al. |
| 5,359,674 A | 10/1994 | van der Wal | 5,835,638 A | 11/1998 | Rucklidge et al. |
| 5,376,962 A | 12/1994 | Zorten | 5,838,299 A | 11/1998 | Smith et al. |
| 5,387,768 A | 2/1995 | Izard et al. | 5,838,758 A | 11/1998 | Krug et al. |
| 5,387,930 A | 2/1995 | Toh | 5,844,565 A | 12/1998 | Mizutani et al. |
| 5,402,118 A | 3/1995 | Aoki | 5,845,000 A | 12/1998 | Breed et al. |
| 5,406,501 A | 4/1995 | Florent | 5,845,007 A | 12/1998 | Ohashi et al. |
| 5,410,418 A | 4/1995 | Yonezawa | 5,847,755 A | 12/1998 | Wixson et al. |
| 5,420,971 A | 5/1995 | Westerink et al. | 5,848,179 A | 12/1998 | Braet |
| 5,426,517 A | 6/1995 | Schwartz | 5,848,190 A | 12/1998 | Kleehammer et al. |
| 5,426,685 A | 6/1995 | Pellegrino et al. | 5,854,851 A | 12/1998 | Bamberger et al. |
| 5,432,528 A | 7/1995 | Ritter | 5,857,029 A | 1/1999 | Patel |
| 5,436,984 A | 7/1995 | Saskkinen et al. | 5,859,698 A | 1/1999 | Chau et al. |
| 5,438,360 A | 8/1995 | Edwards | 5,862,254 A | 1/1999 | Kim et al. |
| 5,450,502 A | 9/1995 | Eschbach et al. | 5,872,857 A | 2/1999 | Chudos et al. |
| 5,483,351 A | 1/1996 | Mailloux et al. | 5,875,264 A | 2/1999 | Carlstrom |
| 5,490,218 A | 2/1996 | Krug et al. | 5,877,819 A | 3/1999 | Branson |
| 5,500,904 A | 3/1996 | Markaudey et al. | 5,883,969 A | 3/1999 | Le Gouzouguec et al. |
| 5,509,082 A | 4/1996 | Toyama et al. | 5,890,808 A | 4/1999 | Neff et al. |
| 5,511,133 A | 4/1996 | Shimizu et al. | 5,892,917 A | 4/1999 | Myerson |
| 5,519,784 A | 5/1996 | Vermeulen et al. | 5,901,241 A | 5/1999 | Koljonen et al. |
| 5,528,703 A | 6/1996 | Lee | 5,907,643 A | 5/1999 | Adach |
| 5,537,224 A | 7/1996 | Suzuki et al. | 5,912,721 A * | 6/1999 | Yamaguchi et al. ......... 351/210 |
| 5,544,258 A | 8/1996 | Levien | 5,937,090 A | 8/1999 | Kim |
| 5,551,533 A | 9/1996 | Ng | 5,946,404 A | 8/1999 | Bakshi et al. |
| 5,555,318 A | 9/1996 | Ito et al. | 5,946,407 A | 8/1999 | Bamberger et al. |
| 5,572,595 A | 11/1996 | Kumagai et al. | 5,949,918 A | 9/1999 | McCaffrey |
| 5,581,370 A | 12/1996 | Fuss et al. | 5,956,435 A | 9/1999 | Buzug et al. |
| 5,581,625 A | 12/1996 | Connell | 5,963,276 A | 10/1999 | Inbar |
| 5,590,217 A | 12/1996 | Toyama | 5,970,164 A | 10/1999 | Bamberger et al. |
| 5,592,567 A | 1/1997 | Kilger | 5,974,169 A | 10/1999 | Bachelder |
| 5,596,418 A | 1/1997 | Strolle et al. | 5,978,502 A | 11/1999 | Ohash |

| | | |
|---|---|---|
| 5,978,507 A | 11/1999 | Shackleton et al. |
| 5,982,424 A | 11/1999 | Simerly et al. |
| 5,982,917 A | 11/1999 | Clarke et al. |
| 5,999,660 A | 12/1999 | Zorin et al. |
| 6,002,525 A | 12/1999 | Poulo et al. |
| 6,002,782 A | 12/1999 | Dionysian |
| 6,020,931 A | 2/2000 | Bilbrey et al. |
| 6,041,138 A | 3/2000 | Nishida |
| 6,055,334 A | 4/2000 | Kato |
| 6,067,366 A | 5/2000 | Simanovsky et al. |
| 6,069,971 A | 5/2000 | Kanno et al. |
| 6,075,871 A | 6/2000 | Simanovsky et al. |
| 6,075,890 A | 6/2000 | Park |
| 6,081,618 A | 6/2000 | Naoi et al. |
| 6,088,468 A | 7/2000 | Ito et al. |
| 6,101,294 A | 8/2000 | McCaffrey et al. |
| 6,104,763 A | 8/2000 | Limberg |
| 6,111,607 A | 8/2000 | Kampyama |
| 6,111,974 A | 8/2000 | Hiraoglu et al. |
| 6,111,980 A | 8/2000 | Sano et al. |
| 6,118,892 A | 9/2000 | Williams |
| 6,134,339 A | 10/2000 | Luo |
| 6,134,373 A | 10/2000 | Strolle et al. |
| 6,137,893 A | 10/2000 | Michael et al. |
| 6,148,103 A | 11/2000 | Nenonen |
| 6,154,560 A | 11/2000 | Cothren et al. |
| 6,157,373 A | 12/2000 | Rago |
| 6,163,621 A | 12/2000 | Paik et al. |
| 6,201,616 B1 | 3/2001 | Sasanuma et al. |
| 6,219,447 B1 | 4/2001 | Lee |
| 6,246,450 B1 | 6/2001 | Inbar |
| 6,246,827 B1 | 6/2001 | Strolle et al. |
| 6,255,650 B1 | 7/2001 | Warner et al. |
| 6,259,472 B1 | 7/2001 | Park |
| 6,266,102 B1 | 7/2001 | Azuma et al. |
| 6,272,246 B1 | 8/2001 | Taka |
| 6,320,981 B1 | 11/2001 | Yada |
| 6,373,533 B1 | 4/2002 | Kawabata et al. |
| 6,392,764 B1 | 5/2002 | Eschbach et al. |
| 6,393,148 B1 | 5/2002 | Bhaskar |
| 6,415,049 B1 | 7/2002 | Yanagita et al. |
| 6,421,097 B1 | 7/2002 | O'Rourke |

OTHER PUBLICATIONS

Goujou et al., entitled "Human Detection with a Video Surveillance System," pp. 1179-1184, published on Jun. 11, 1995 under Publication No. XP 000559355.

* cited by examiner

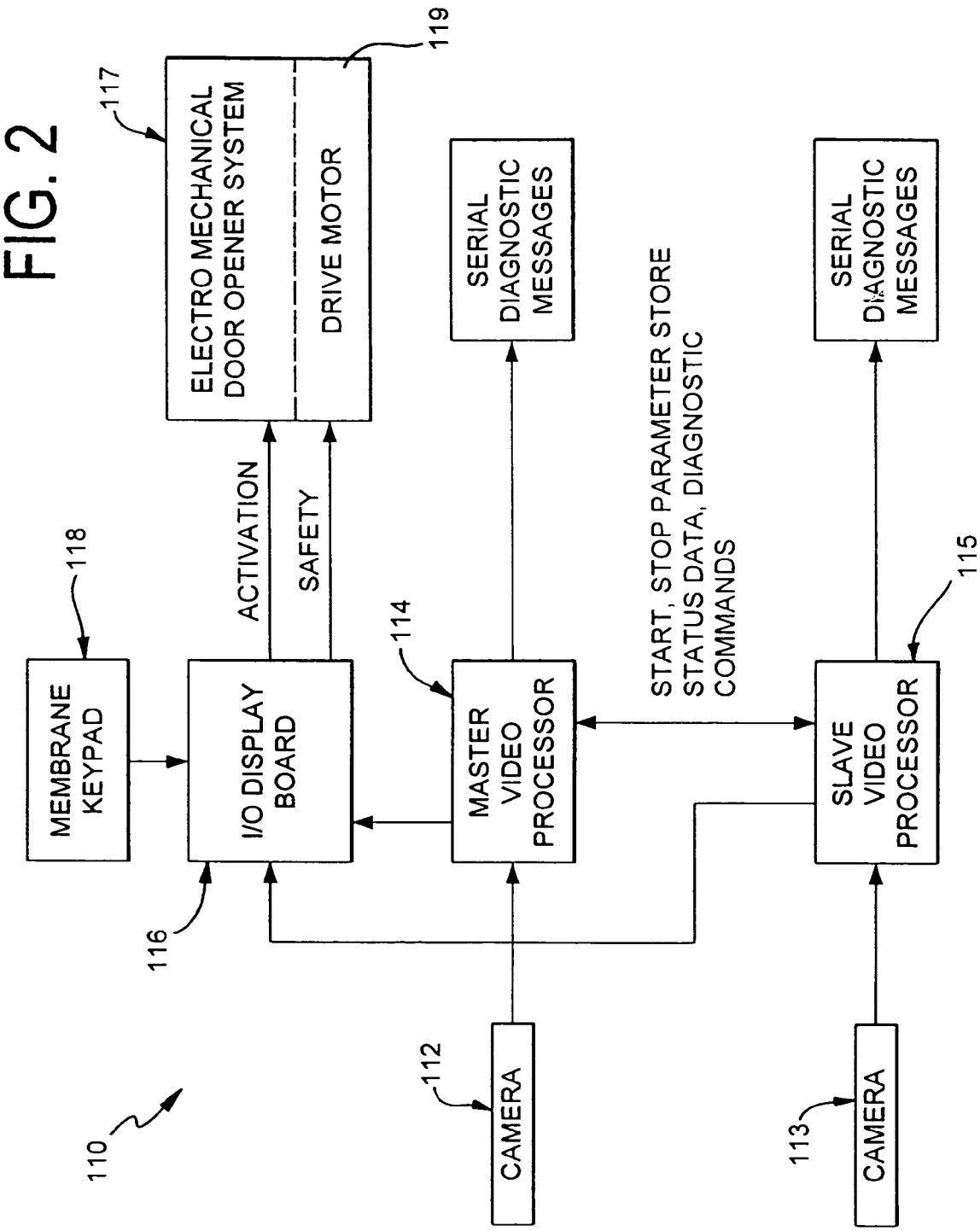

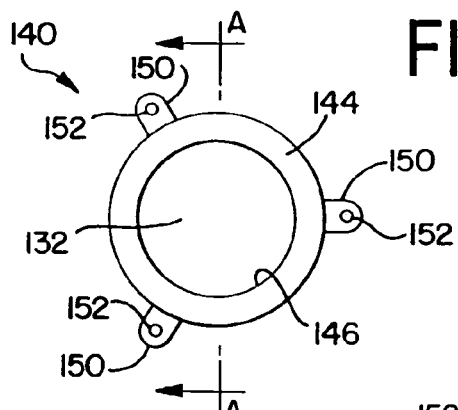
FIG. 7
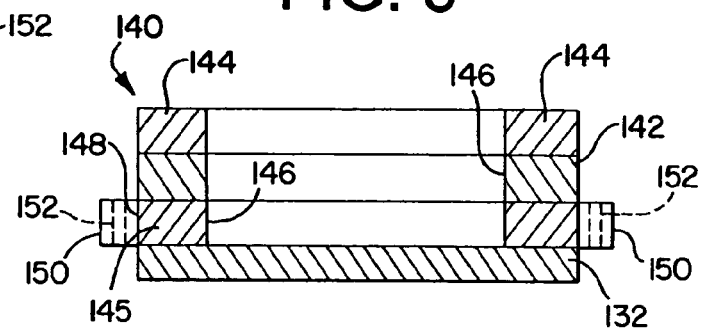
FIG. 8
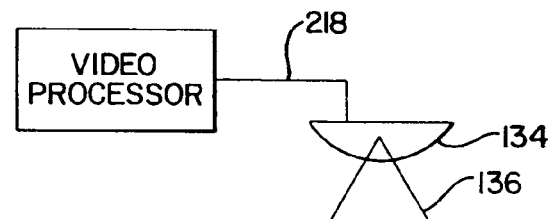
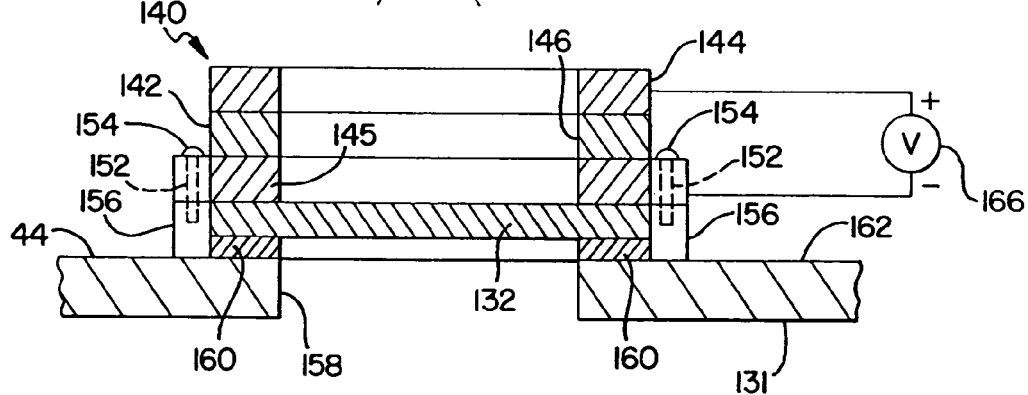
FIG. 9
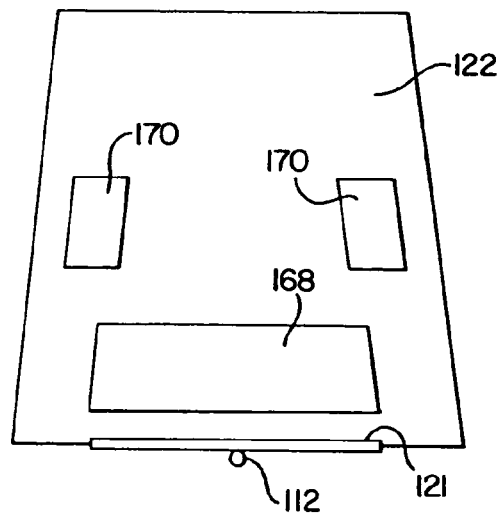
FIG. 10

☆ = FUNCTION NOT PRESENT ON SLAVE BOARD

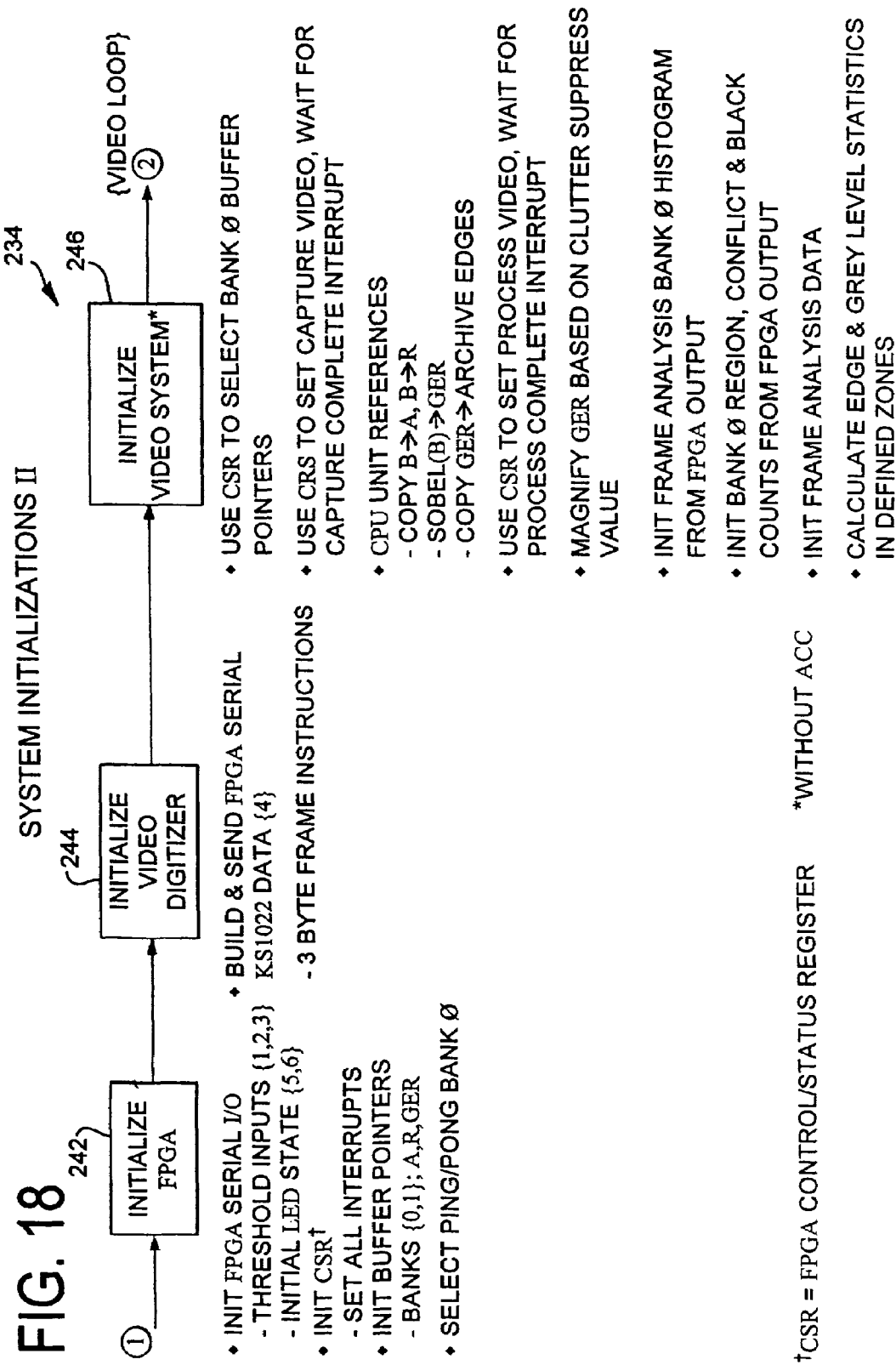

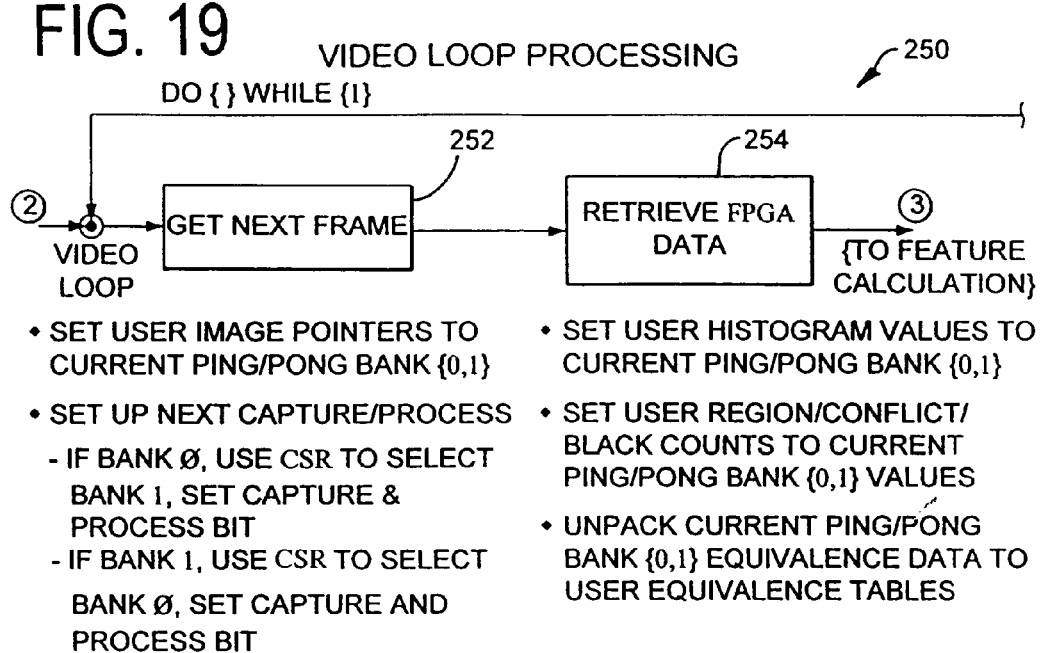
FIG. 19 VIDEO LOOP PROCESSING
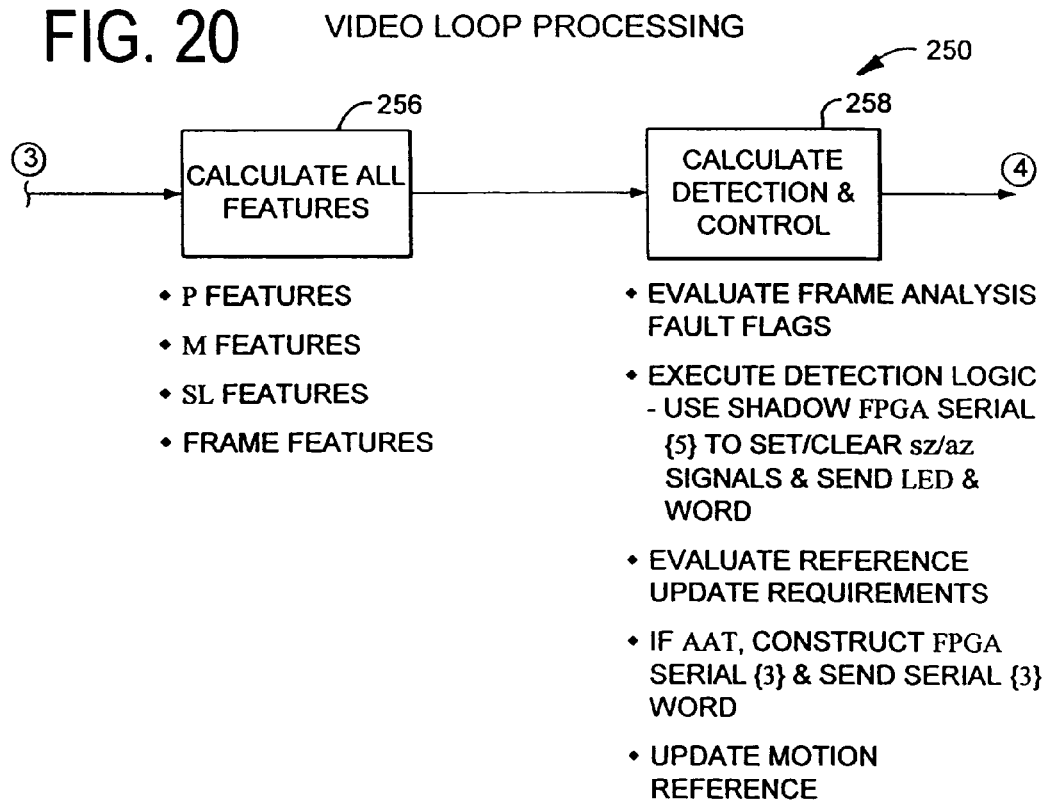
FIG. 20 VIDEO LOOP PROCESSING

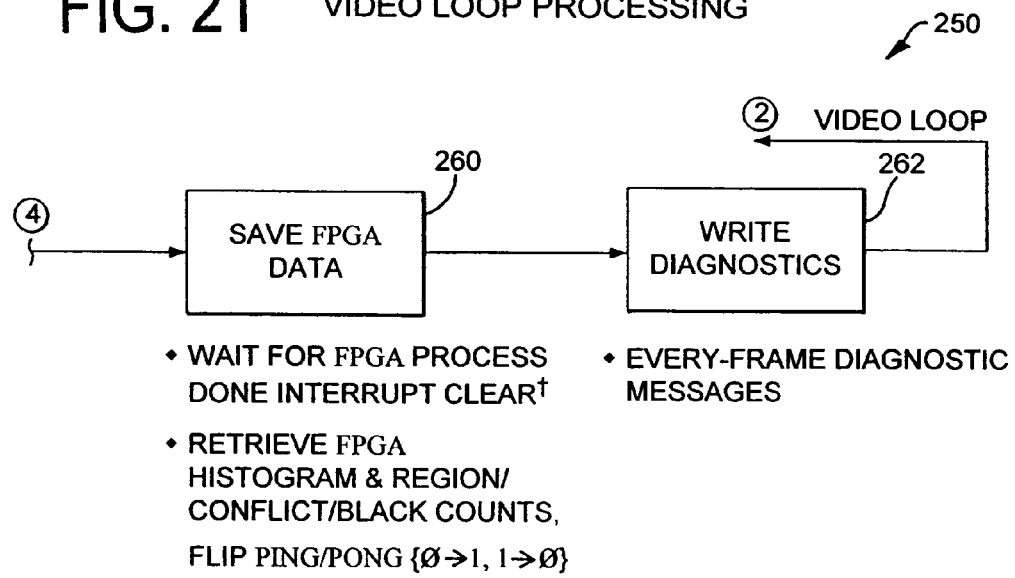
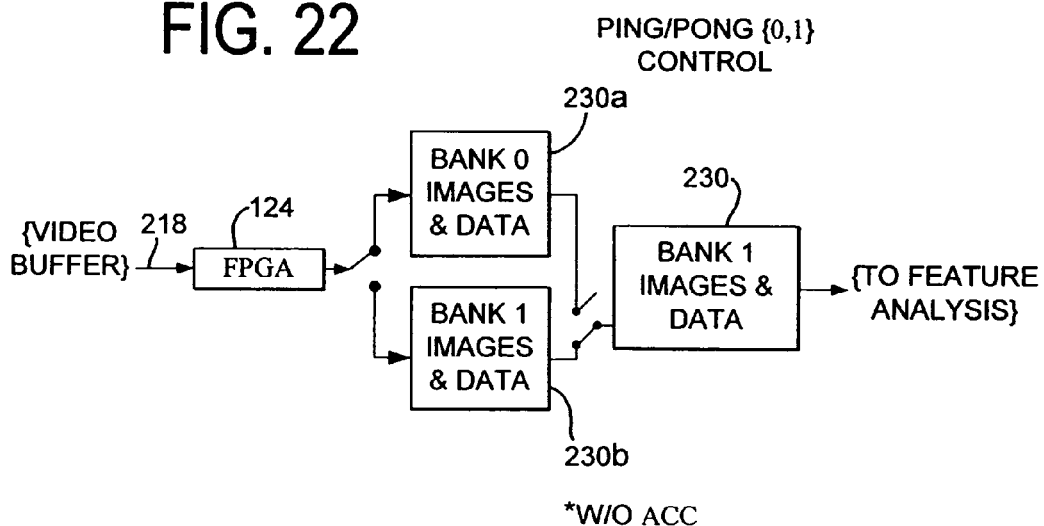

SYSTEM IMAGE PROCESSING I: EDGE DETECTOR

SYSTEM IMAGE PROCESSING IV:
MOTION DETECTOR USING EDGES

FIG. 41  SYSTEM DATA PROCESSING IV: CALCULATE FRAME FEATURES

FIG. 48

IMAGE OPERATOR DEFINITIONS (-)  POSITIVE DIFFERENCE (OF TWO GREY-SCALE (8-BIT) IMAGES)

$P_{ij} - Q_{ij} = P_{ij} - Q_{ij}$ IF $P_{ij} > Q_{ij}$
= 0, OTHERWISE.

+  PIXEL-WISE (BIT-WISE) (INCLUSIVE) LOGICAL OR
   (OF TWO BINARY IMAGES)

T  THRESHOLD (AN 8-BIT IMAGE)

IF $P_{ij}$ > THRES THEN
 $P_{ij}$ = 1
ELSE
 $P_{ij}$ = 0

IT  INVERT/THRESHOLD $P_{ij} = 255 - P_{ij}$
IF $P_{ij}$ > THRES THEN
 $P_{ij}$ = 1
ELSE
 $P_{ij}$ = 0

E  BINARY EROSION, 3x3

3X3 KERNEL Ke

| 1 | 1 | 1 |
|---|---|---|
| 1 | C | 1 |
| 1 | 1 | 1 |

IF CENTER = 0, DO NOTHING, NEXT KERNEL POSITION
IF CENTER = 1, {BLACK} THEN TEST
  TO SEE IF SHOULD CHANGE TO WHITE...
    IF SUM OF 8 NEIGHBORS <= 4, SET CENTER = 0

SET IMAGE BOUNDARY TO 0

D  BINARY DILATION, 3x3

3X3 KERNEL Kd

| 1 | 1 | 1 |
|---|---|---|
| 1 | C | 1 |
| 1 | 1 | 1 |

IF CENTER = 1, DO NOTHING, NEXT KERNEL POSITION
IF CENTER = 0, {WHITE} THEN TEST
  TO SEE IF SHOULD CHANGE TO BLACK...
    IF SUM OF 8 NEIGHBORS >= 4, SET CENTER = 1

FIG. 49

SET IMAGE BOUNDARY TO 0

S   SOBEL EDGE OPERATOR, 3X3,
(SUM ABSOLUTE VALUES, AMPLITUDE ONLY)

CONVOLVE IMPUT IMAGE WITH STANDARD SOBEL 3X3
(HORIZONTAL & VERTICAL)
KERNELS Ksh, Ksv PRODUCING INNER PRODUCTS
h & v RESPECTIVELY

Ksh

| 1 | 2 | 1 |
|---|---|---|
| 0 | 0 | 0 |
| -1 | -2 | -1 |

Ksv

| -1 | 0 | 1 |
|---|---|---|
| -2 | 0 | 2 |
| -1 | 0 | 1 |

$OUTPUT_{ij} = abs(h) + abs(v)$

SET IMAGE BOUNDARY TO 0

AD   ABSOLUTE DEVIATION, 3X3

3X3 KERNEL Kad

| 1 | 1 | 1 |
|---|---|---|
| 1 | X | 1 |
| 1 | 1 | 1 |

CALCULATE Mk & Sk ON THE KERNEL (8 ELEMENTS)

$Mk$ = RIGHT SHIFT 3 BITS (SUM $P_{ij}$ ON Kad)
$Sk$ = RIGHT SHIFT 3 BITS (SUM abs($P_{ij}$ − Mk) ON Kad)

$OUTPUT_{ij} = Sk$

SET IMAGE BOUNDARY TO 1

A0   REGION LABELING, FIRST PASS
2X2 KERNEL Ka0 OVER BINARY IMAGE
PER ATTACHED C-CODE SEGMENT

A) BACKGROUND (WITH STATIONARY OBJECTS REPRESENTING CLUTTER, AFTER SPECKLE FILTERING)

B) CURRENT IMAGE (WITH A NEW OBJECT, A TARGET AFTER SPECKLE FILTERING

C) DIFFERENCE IMAGE B) - A)

FIG. 53  D) DIFFERENCE IMAGE A) - B)
FIG. 54  E) IMAGE C AFTER THRESHOLDING & SHAPE FILTERING (CLOSE / OPEN)
FIG. 55  F) IMAGE D AFTER THRESHOLDING & SHAPE FILTERING (CLOSE / OPEN)

FIG. 56  G) LOGICAL OR COMBINATION OF IMAGES E & F
FIG. 57  H) SAME AS G, BUT WITH CONNECTED REGION LABELED FOR CLASSIFICATION

SENSOR AND IMAGING SYSTEM

RELATED APPLICATIONS

This Application is a U.S. National filing under §371 of International Application No. PCT/US/27351, filed Aug. 31, 2001, claiming priority from U.S. Ser. No. 60/229,613, filed Aug. 31, 2000 (which is hereby incorporated by reference).

TECHNICAL FIELD

The present invention relates to sensor and imaging systems, and more particularly to a system for providing and interpreting image data.

BACKGROUND OF THE INVENTION

Sensor and imaging systems are increasingly in demand in today's technology driven economy. These systems include a camera for viewing objects included within a field of view. The camera generates image data that is analyzed by a computer to determine what, if any, action should be taken in response to the object detected.

Many recognition systems use two or more cameras for viewing objects included within one field of view. In addition to the costs associated with using several cameras, these systems require a specific mounting arrangement for each of the cameras. Such systems have a reduced level of reliability over single camera systems because both cameras are needed for proper operation.

Single camera systems are typically mounted at a fixed location and look for objects that satisfy, or fail to satisfy, predetermined criteria. For instance—systems that check for structural defects. These systems are incapable of making decisions that are not already specified.

Accordingly, a need exists for a sensor and imaging system that, by using an image provided by a camera, can decide whether a condition has, or has not, been satisfied.

SUMMARY OF THE INVENTION

In an embodiment in accordance with the present invention, a system is provided having a camera, a processor, and a user interface. The camera transmits image data responsive to a scene within a field of view. In response to the image data, the processor indicates whether a condition has been satisfied. The user interface is operably connected to the processor and allows a user to select criteria for detection of objects, for indicating criteria selected, and for providing visual confirmation that an object has been detected.

In another embodiment, a control interface is also provided for effecting other devices. Further, the system provides signals to influence other devices.

In yet another embodiment, the system provides a signal to open a door upon a determination by the processor that a condition has been satisfied. The door is then open by a conventional electro mechanical door opener system having a drive motor operably connected to the door.

Other features and advantages of the invention will be apparent from the following specification taken in conjunction with the following drawings.

BRIEF DESCRIPTION OF THE DRAWINGS

FIG. 2 is a simplified schematic of another embodiment of a sensor and imaging system in accordance with the present invention and having a pair of camera assemblies connected to a pair of sensor/imaging circuits, respectively;

FIG. 7 is a plan view of a heater assembly attached to the window of the camera assembly housing of FIG. 5;

FIG. 8 is a cross-sectional view of the heater assembly, and window, taken along plane A-A of FIG. 7;

FIG. 9 is a simplified schematic of the camera within the camera assembly of FIG. 8 connected to one of the video processors of FIG. 2, FIG. 10 is a top, perspective view, of one side of the door of FIGS. 3 and 4 wherein one of the camera assemblies of FIG. 2 has a field of view that includes the area in front of the door;

FIG. 18 is a simplified block diagram of the initialization sequence for the processing system of FIG. 16, for initializing the FPGA image processing thresholds and video digitizer settings from user input data via the FPGA serial input/output board, and for initializing the feature and detection processing systems;

FIG. 19 is a simplified block diagram of a video loop processing sequence for the processing system of FIG. 16, utilizing a ping-pong buffer to point to, load and unpack reference images into user data;

FIG. 20 is a simplified block diagram of the video loop processing sequence for the processing system of FIG. 16, utilizing user data in the CPU to generate features and detection decisions on a current image frame;

FIG. 21 is a simplified block diagram of the video loop processing sequence for the processing system of FIG. 16, having diagnostic messages outputted at the end of each frame processing and at any point in the video processing;

FIG. 22 is a simplified block diagram of a ping-pong system in accordance with the present invention;

FIGS. 48 and 49 are tables for defining various image operations;

FIG. 53 is the difference between subtracting the current image in FIG. 51 from the reference image in FIG. 50;

FIG. 54 is a resulting image after thresholding and shape filtering the image in FIG. 52;

FIG. 55 is a resulting image after thresholding and shape filtering the image in FIG. 53;

FIG. 56 is a resulting image after completing a logical OR operation on the images in FIG. 54 and FIG. 55; and FIG. 57 is similar to FIG. 56 except that regions within the image of FIG. 56 are labeled for classification.

DETAILED DESCRIPTION OF THE PREFERRED EMBODIMENT

Figure 1A:
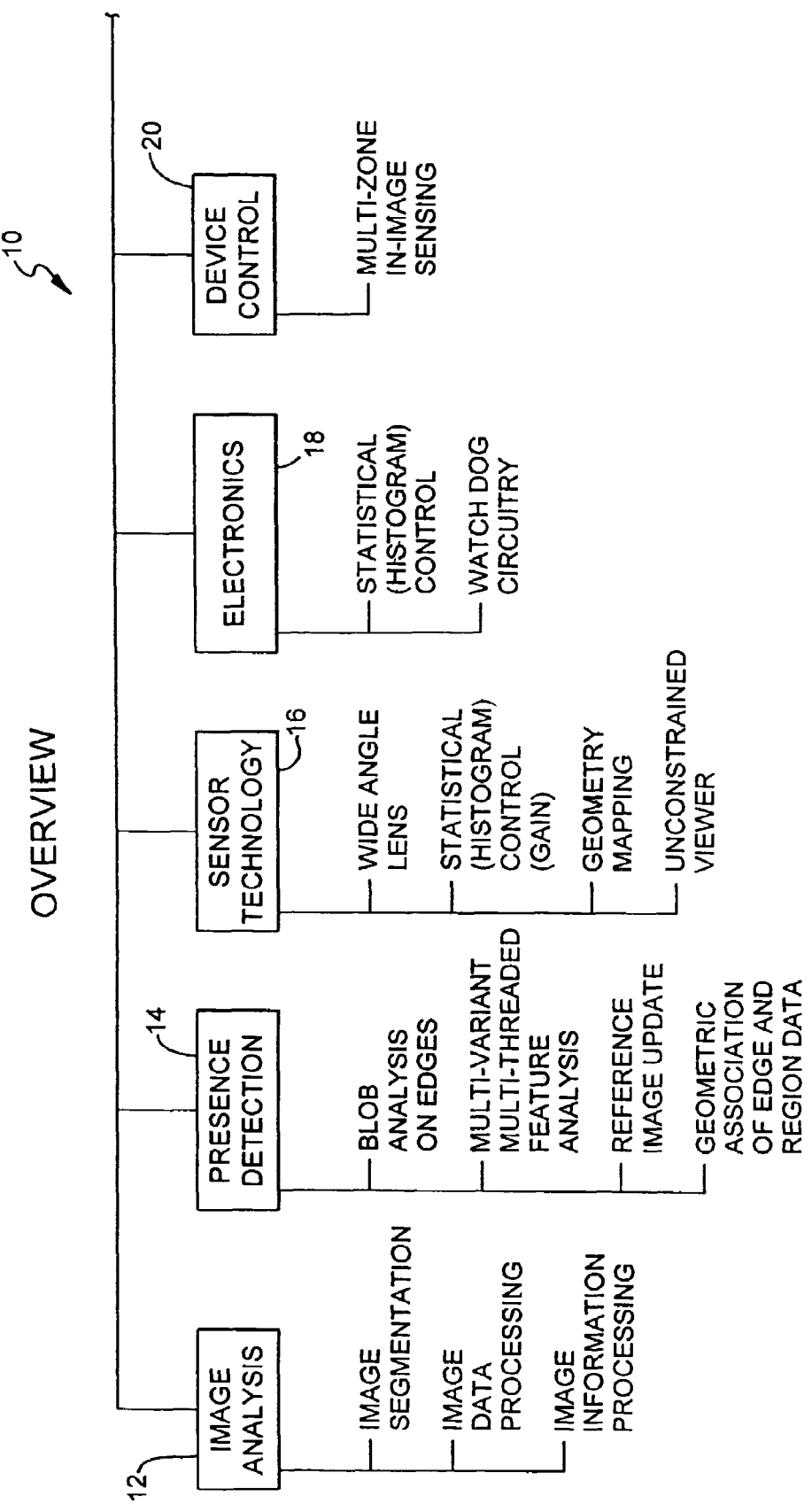
FIGS. 1a and 1b are a block diagram of an embodiment of a sensor and imaging system in accordance with the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1B:
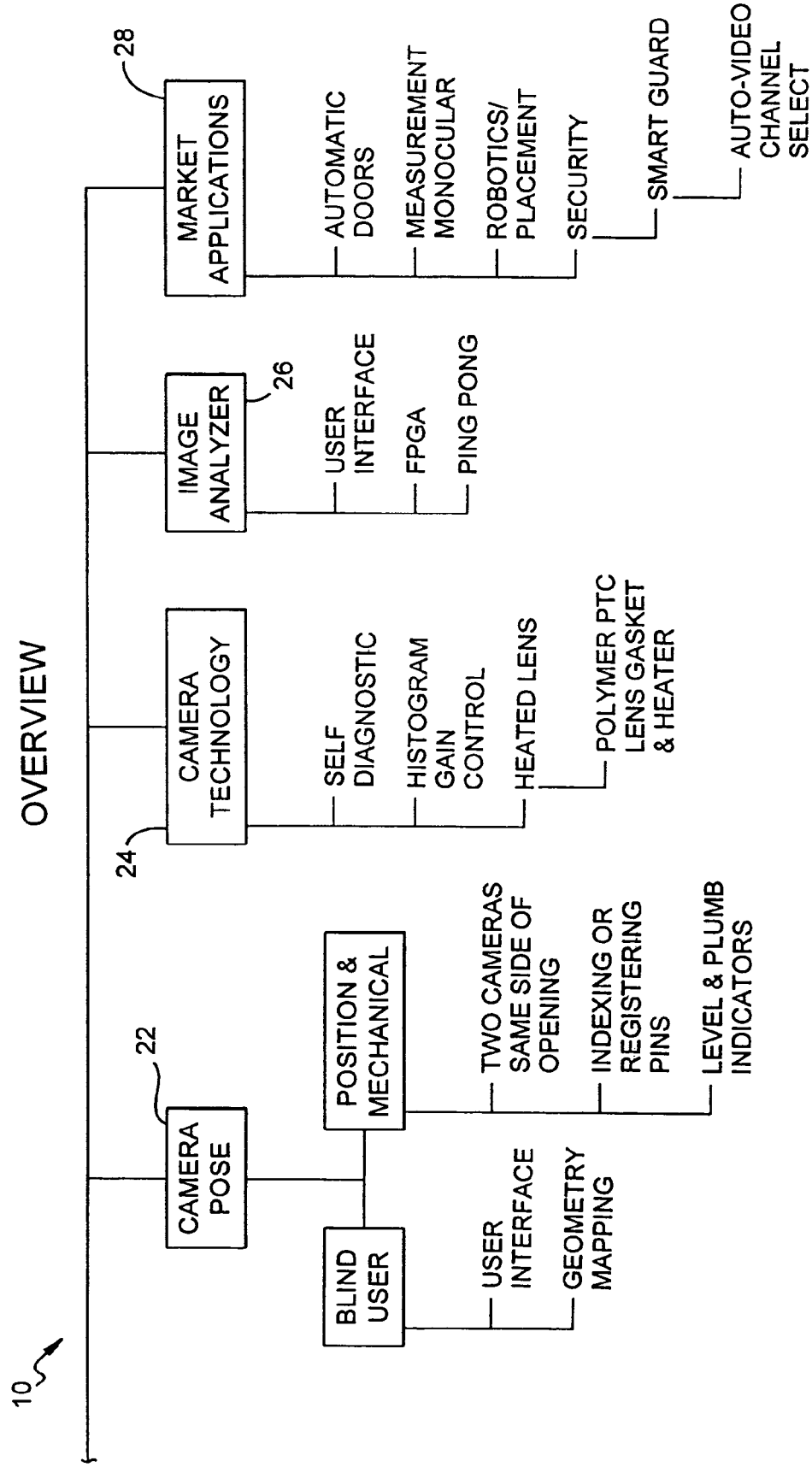

Turning to FIGS. 1a and 1b, a block diagram of an embodiment of a system in accordance with the present invention is depicted. The system 10 includes aspects directed to image analysis 12, presence detection 14, sensor technology 16, electronics 18, device control 20, camera pose 22, camera technology 24, image analysis 26, and market application 28.

Turning to FIG. 2, a simplified schematic of another embodiment of a system in accordance with the present invention is depicted. The system 110 includes a pair of camera assemblies 112,113 operably connected, respectively, to a pair of sensor/imaging circuits 114,115. The sensor/imaging circuits 114,115 are operably connected to an I/O display board 116 that is connected to a keypad 118. In a further embodiment, the system 110 can include an electro mechanical door opener system 117 having a drive motor 119 operably connected to a door 121 (FIGS. 3 and 4).

The cameras assemblies 112 and 113 can include charge coupled devices (CCD), or the like, having preferably a wide-angle lens, and capable of transmitting image data to the sensor/imaging circuits 114 and 115, respectively. The image data corresponds, respectively, to a scene within each camera's field of view.

The sensor/imaging circuits 114,115 process the image data for determining whether a user selected condition has been satisfied. The user selected conditions are selected via a man-machine interface comprising the I/O display board 116 and the membrane keypad 118. In an embodiment, the man-machine interface is operably connected to the sensor/imaging circuits 114,115 and allow a user to select criteria for detection of objects, for indicating criteria selected, and for providing visual confirmation that an object has been detected.

Figure 3:
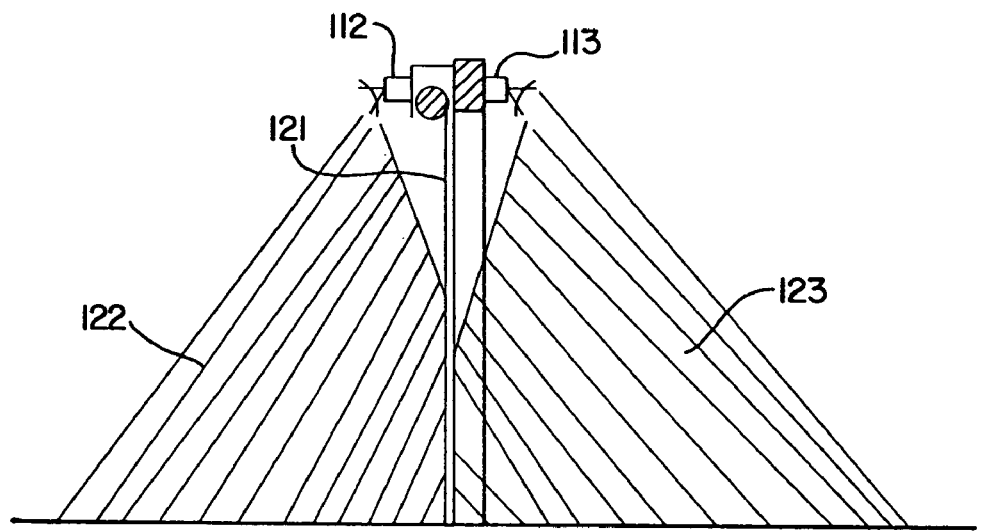
FIG. 3 is an elevation view of a closed door having the camera assemblies of FIG. 2 mounted in proximity thereto.
Figure 4:
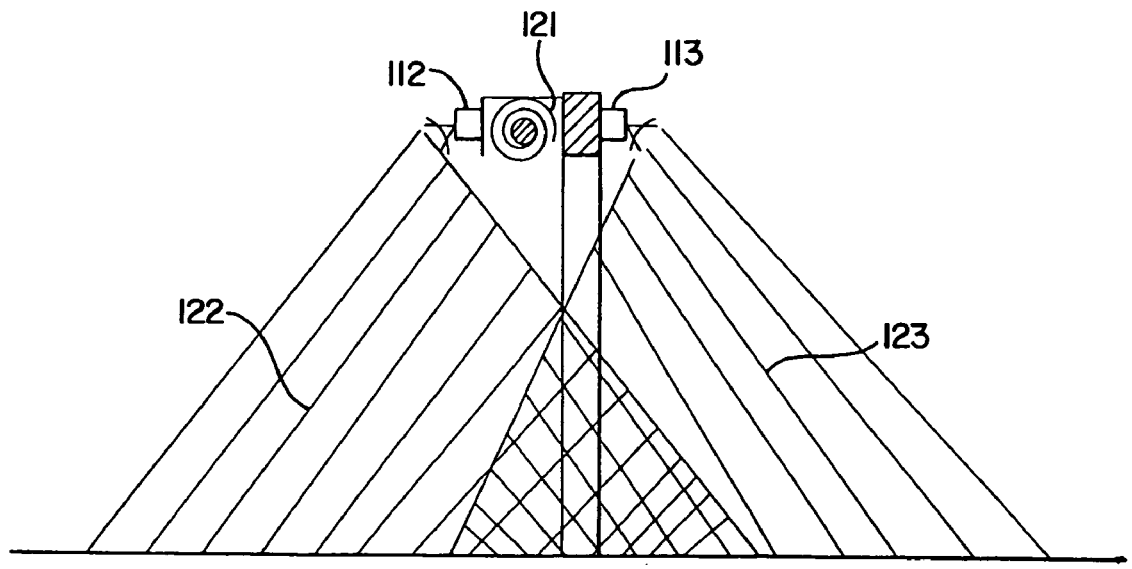
FIG. 4 is similar to FIG. 3 except the door is open.

FIG. 3 provides a cross sectional elevation view of a doorway 120 that is closed by a door 121. Mounted in proximity to the doorway 120 and on opposite sides thereof are the camera assemblies 112,113 of FIG. 2. According, the camera assemblies 112 and 113 have a field-of-view 122 and 123, respectively, on opposite sides of the doorway. Preferably, the field-of-view of at least one camera assembly includes the doorway 120 when the door 121 is open as shown in FIG. 4. Further, the field-of-views 122 and 123 overlap about the doorway 120.

Figure 5:
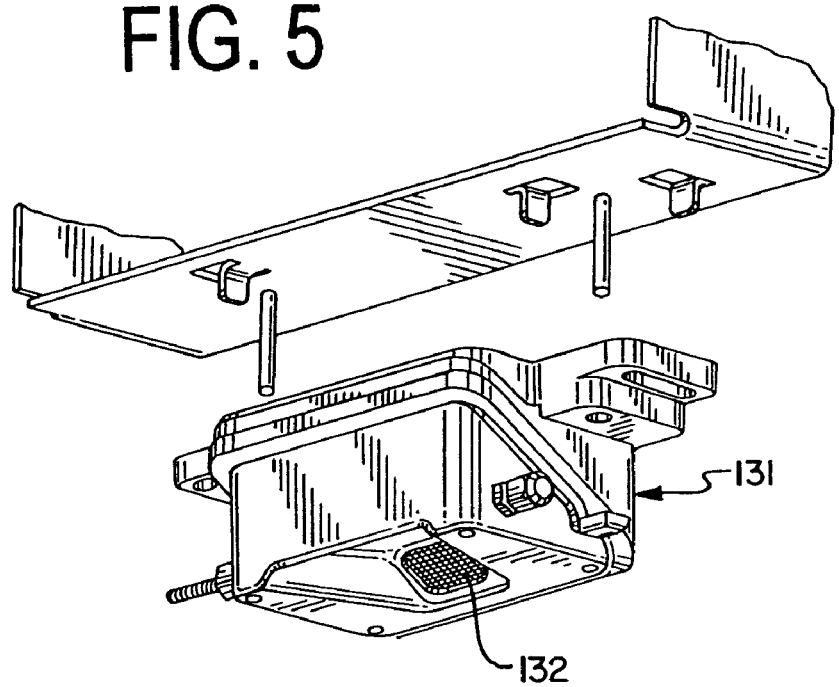
FIG. 5 is a perspective partial assembly view of one of the camera assemblies of FIG. 2 for attachment to a header above the door of FIG. 3.
Figure 6:
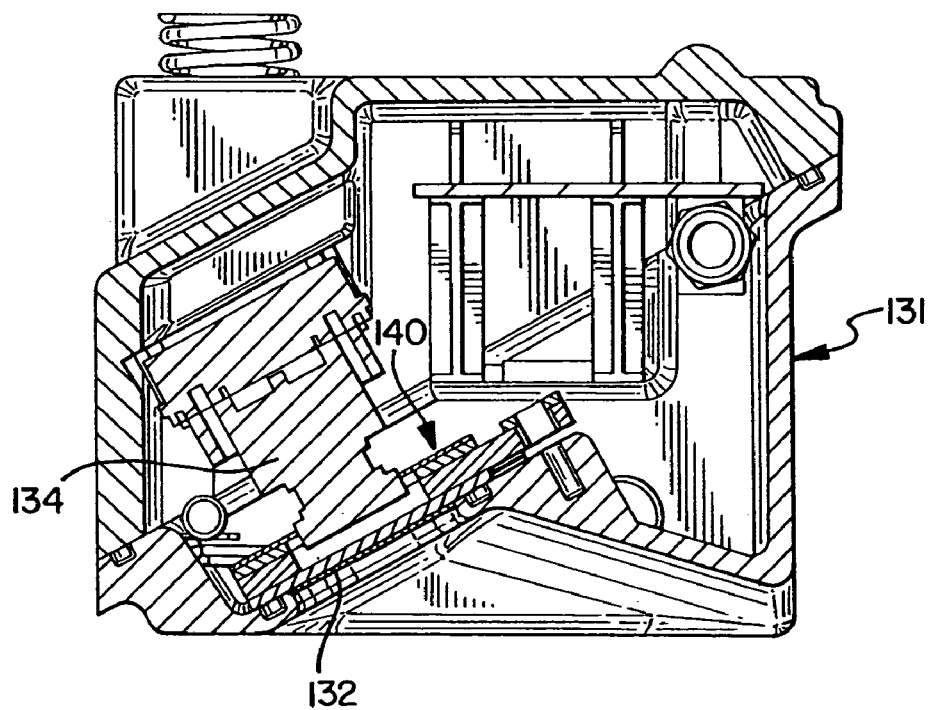
FIG. 6 is a cross-sectional view of the camera assembly of FIG. 5.

Turning to FIG. 5 a perspective partial assembly view is depicted of one of the camera assemblies 112,113 of FIG. 2 for attachment to a header above the door 121 of FIG. 3. The camera assembly includes a housing assembly 131 having a window 132. FIG. 6 provides a cross-sectional view of the camera assembly of FIG. 5. Mounted within the housing assembly 131 is a camera 134 having a field-of-view 136 and a heater assembly 140. In a further embodiment, a power supply (not shown) can be mounted within the heater assembly for supplying power to the camera 134.

FIGS. 7 and 8 provide a plan view and a cross-sectional view, respectively, of the heater assembly 140. In an embodiment, the heater assembly 140 adjoins the window 132 of the camera assembly housing 131, preferably made of cast metal or the like, and includes a ceramic resistor 142 sandwiched between a pair of conductive terminals 144,145. The ceramic resistor 142 is generally ring shaped and constructed of a material that exhibits what is commonly referred to as a PTCR (positive-temperature coefficient or resistance) or PTC effect. Likewise, the conductive terminals 144,145 are generally ring shaped and constructed of an electrically and thermally conductive material such as copper.

In an embodiment, annular apertures 146 extend through the axis of the ceramic resistor 142 and the conductive terminals 144,145. The apertures 146 have substantially identical outer circumferences and are concentrically aligned with each other.

Preferably, the outer perimeter 148 of conductive terminal 145 includes a plurality of ears 150 extending outwardly therefrom. Extending through each ear 150 is an aperture 152 for extending an attachment screw 154 (FIG. 9) therethrough.

Turning to FIG. 9, the heater assembly 140 is mounted within the housing 131 of the camera assembly. As indicated previously, attachment screws 154 couple the conductive terminal 145 of the heater assembly 140 to a mounting surface, or alternatively, mounting posts 156 that inwardly extend into the housing 131 and are integrally attached thereto.

The camera assembly housing 131 includes an aperture 158 that allows the camera's field-of-view 136 to extend outside of the housing. The window 132 is mounted over the aperture 158 to prevent contaminants such as dirt and moisture from entering the camera assembly.

Preferably, the window 132 is sandwiched between the thermally conductive terminal ring 145 of the heater assembly 140 and an annular gasket 160 made of a resilient material and adjoining against the inner surface 162 of the camera assembly housing 131 about aperture 158. In an embodiment, the window 132 is made of a visually transparent material such as borosilicate glass.

The camera 134 generates image data or electronic pixel data 218 representative of what is observed in the camera's field-of-view 136. In an embodiment, the image data 218 is analyzed by one of the video processors 114,115 (FIG. 2) for determining what, if any, action should be taken in response to what is detected in the camera's field-of-view 136.

Within the camera assembly housing 131, the terminals 144,145 of the heater assembly 140 are coupled to a voltage source 166 for maintaining a voltage potential across the ceramic resistor 142. The heat generated by the ceramic resistor 142 as current flows therethrough is dissipated through conductive terminal 145 and onto the window 132. In an embodiment, enough heat is provided to maintain the window 132 at a temperature above the dew-point of the air outside of the camera assembly housing 131. For instance, the heater can activate at about 87° F. and deactivate at about 106° F.

As will be appreciated by those having skill in the art, the use of a ceramic resistor 142 eliminates the need for a mechanical thermostat or the like since the resistor material exhibits a positive-temperature coefficient. The elimination of a thermostat increases the reliability of the heater and reduces the amount of noise placed on voltage supplies as a result of switching. Turning back to FIG. 2, in an embodiment the camera assemblies 112,113 can include an illumination source (not shown), such as a lightbulb, light emitting diodes within the humanly visible or non-visible spectrum, or the like, to illuminate the field of view. The output of the camera assemblies 112,113 can be received by a removably coupled display (not shown) for allowing a user to view check that each camera assemblies' field of view is properly configured.

Turning to FIG. 10 a top perspective view is provide of one side of the door 121 of FIGS. 3 and 4 wherein one of the camera assemblies (in particular camera assembly 112) of FIG. 2 has a field of view 122 that includes the area in front of the door. The camera assembly 122 provides image data to the video processor 114 (FIG. 2) which, in an embodiment, superimposes a safety zone 168 and, if desired, one or more activation zones 170. Preferably, when an object is detected by either of the video processors 114,115 to be in a safety zone 168, the door 121 is opened and remains so until the object is outside of the safety zone 168. Further, when an object is detected by either of the video processor 114,115 to enter an activation zone 168, the door 121 is opened are remains open for a period of time after the object stops moving in the activation zone or leaves the activation zone.

Preferably, the safety zone 168 is maintained in an area immediately surrounding the door 121 to prevent the door from closing when a person or object is in the immediate vicinity of the door. Moreover, the activation zone(s) 168 open the door when a person or vehicle approaches the door 121. A failsafe system can also be provided to open the door 121 whenever there is a loss of illumination within the field of view, severe illumination changes, electronics failure, camera knocked ajar, or the camera lens is obscured.

Figure 11:
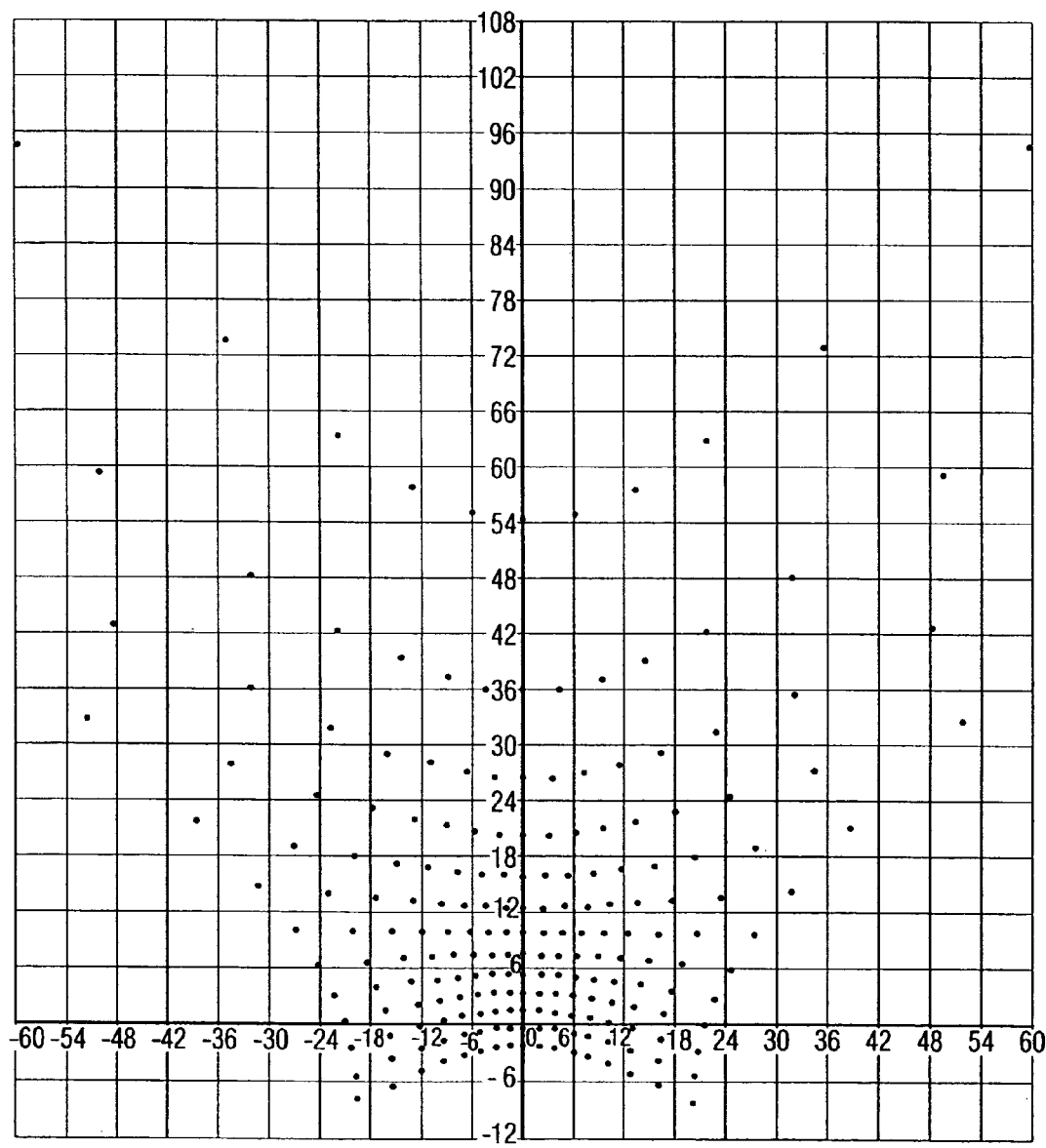
FIG. 11 is a graphical illustration of the pixel density of the field of view within FIG. 10 as objects are placed further away from the camera assembly.
Figure 12:
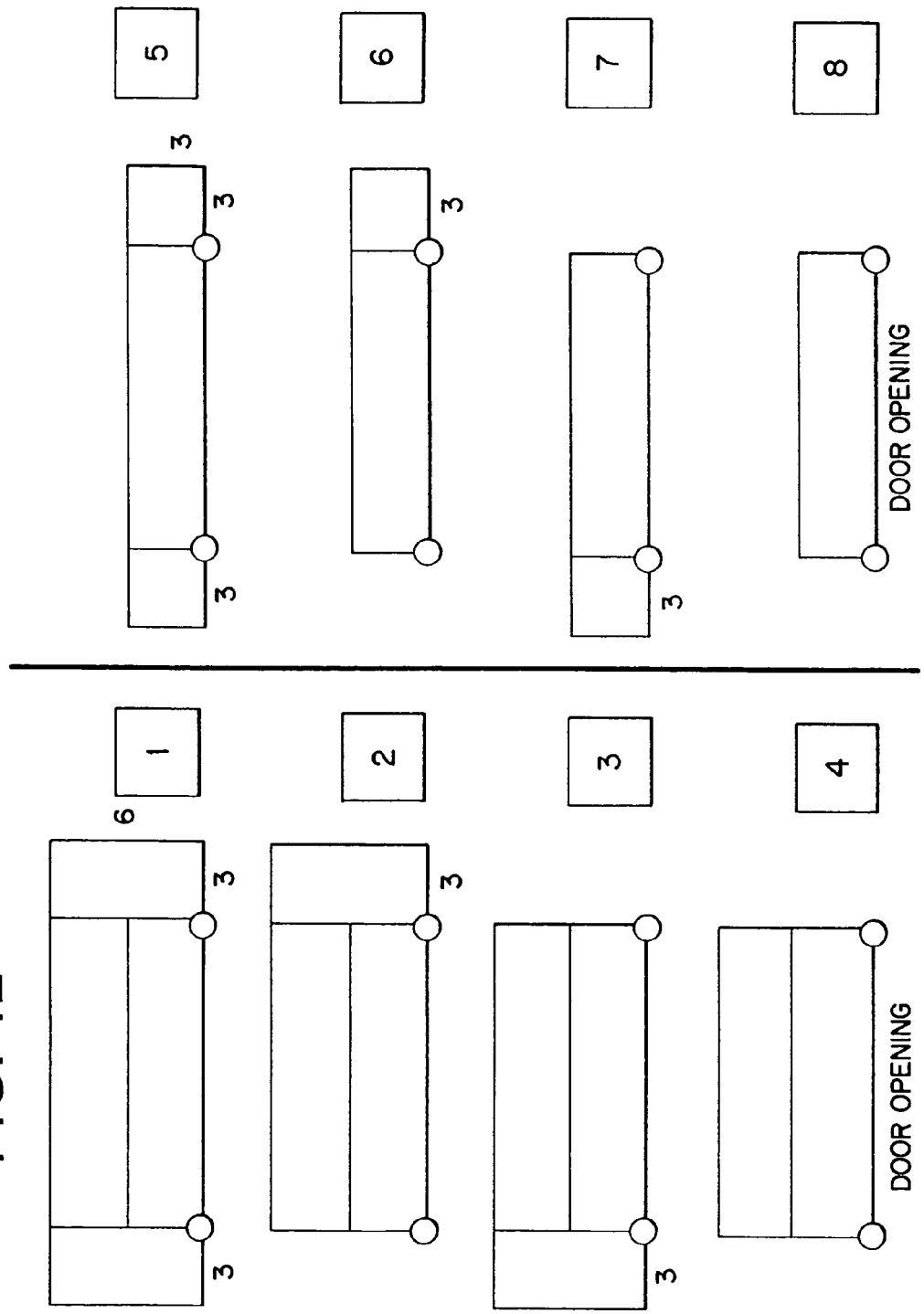
FIG. 12 provides a plurality of safety zone configurations that can, in an embodiment, be selected by a user using the membrane keypad of FIG. 2.

FIG. 11 depicts the pixel density of the field of view 122 as objects are placed further away from the camera assembly 122. FIG. 12 provides a plurality of safety zone configurations that can, in an embodiment, be selected by a user using the membrane keypad 118 (FIG. 2).

Figure 13:
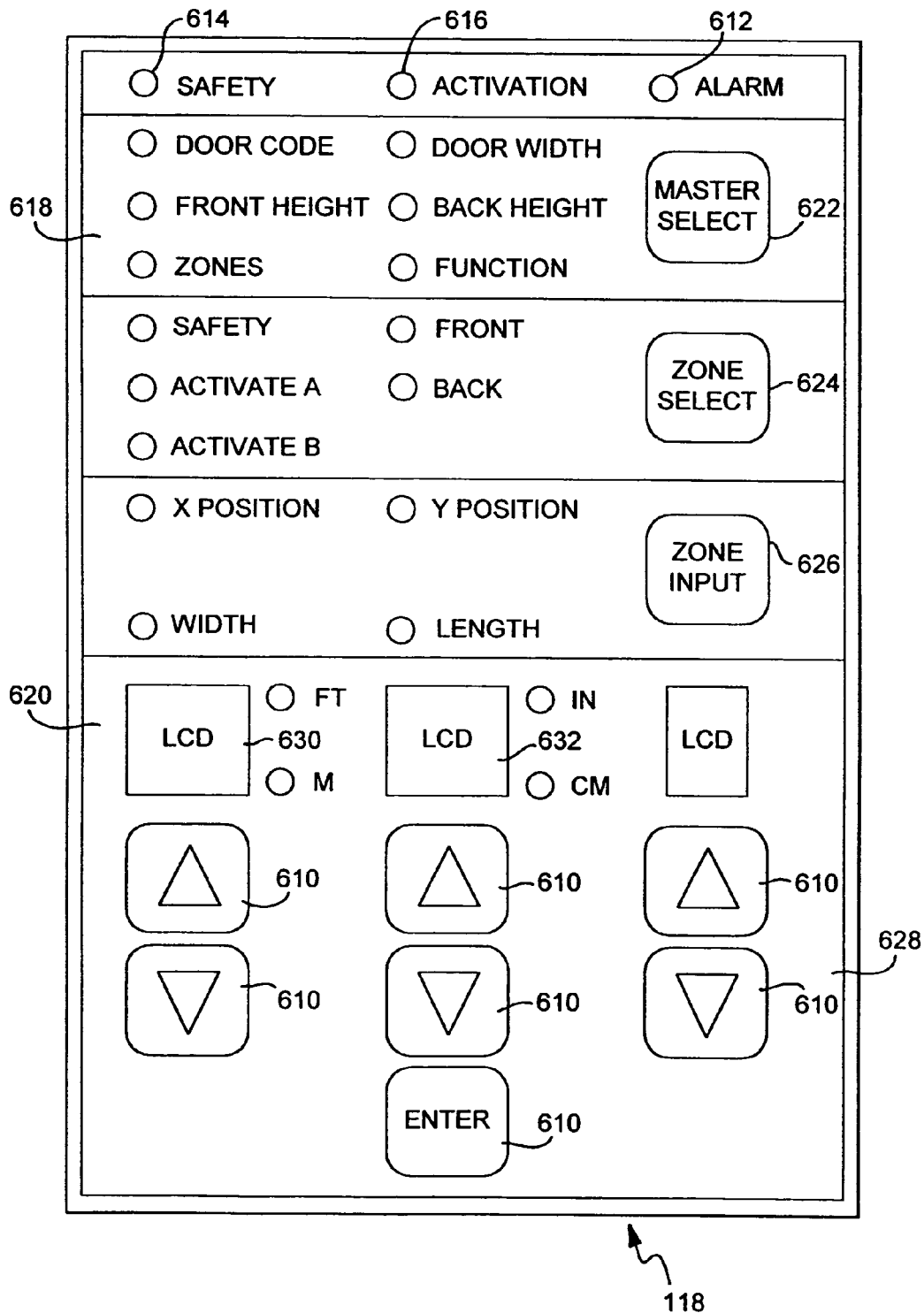
FIG. 13 is a plan view of an embodiment of the membrane keypad depicted in FIG. 2.

FIG. 13 provides an plan view of an embodiment of the membrane keypad 118 depicted in FIG. 2. The membrane keypad 118 and the I/O display board 116 (FIG. 2) provide a user interface or man-machine interface for a user to setup the system (FIG. 2). In an embodiment, the user interface allows a user to define the door type, and dimensions, and establish the size, location, and type of detection zones the system 110 will use. Preferably, the user interfaces allows a user to enter data to define at least one control zone parameter (i.e., activation zone or safety zone) from the group consisting of area, location, shape, number of control zones, and control criteria.

As indicated previously, the system 110, via the user interface, has the capability to define at least a portion of an image received by the camera assemblies as a control zone. In an embodiment, the system 110 has the capability to choose coordinates from all pixel coordinated by direct access within the control zone. Alternatively, the system 110 has the capability to choose from multiple predefined zones. Moreover, the system 110 can have the capability to put real objects in the field of view so as to delineate boundary coordinates and the real objects become part of the image data.

In an embodiment, the user interface has three modes of operation: parameter edit mode, run mode, and diagnostic mode. In parameter edit mode, a user can input or modify configuration parameters, using touch keypad buttons 610, 622, 624, and 626, such as the door model, English or metric units, camera heights and distance from the door. In the run mode, the system 110 is activated. As such, the system 110 processes images from the cameras 112,113 and outputs safety and activation zone indication signals through the I/O board 116, and displays status information on the display LEDs 614, and 616. In the diagnostic mode, additional information regarding the status of the system 110 is made available via an I/O port (not shown).

Figure 14:
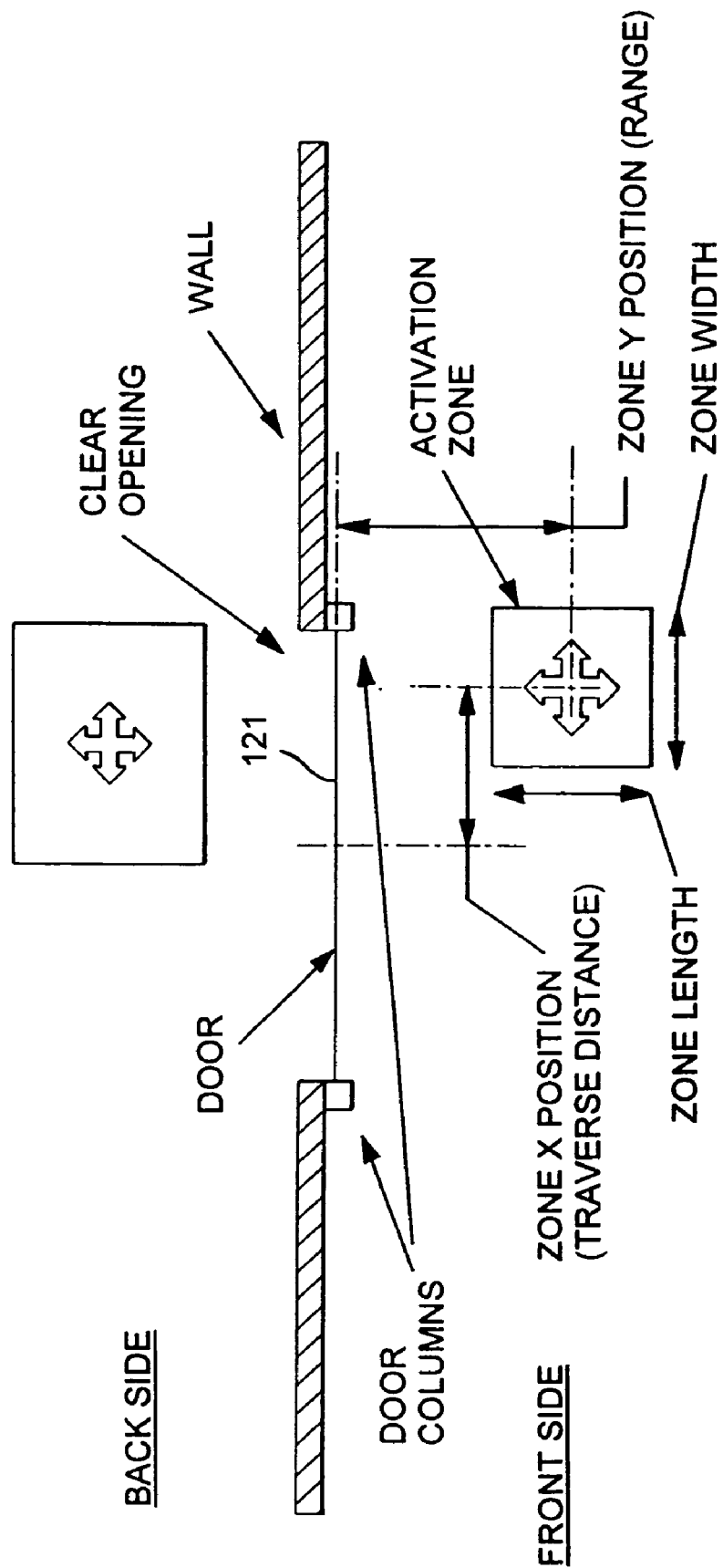
FIG. 14 is a plan view of a zone positioning method using the membrane keypad of FIG. 13.

FIG. 14 provides a diagram depicting movement of zones using the membrane keypad of FIG. 13. In an embodiment, a user can move activation zones to various locations within the field-of-view of the camera assemblies 112,113.

FIG. 15 provides a simplified block diagram of one of the sensor/imaging circuits 114,115 of FIG. 2. In an embodiment, the sensor/imagining circuits 114,115 are substantially similar in physical design and include a Field Programmable Gate Array (FPGA) 124, a Central Processing Unit (CPU) 125, and a video digitizer 126.

In an embodiment, the video digitizer 126 receives an analog image signal from one of the cameras, digitizes the analog image signal, and transmits the digitized image signal to the field programmable gate array 124.

As explained in detail further herein, the field programmable gate array 124 is programmed to perform one or more image processing operations in response to the digitized image signal received. In an embodiment, these operations include comparing predetermined traits of the digitized image signal with one or more previously received digitized image signals to provide composite image data. In response to the composite image data, the central processing unit 125 determines whether one or more conditions have been satisfied.

Operably coupled to the video digitizer 126 is a temperature sensor 128 having an output correlating to the temperature of the video digitizer. Upon an indication by the temperature sensor of a condition whereby the video digitizer 126 is not operating within a predetermined temperature range or limit, reset command is issued by a reset circuit 130 whereby the system 110 maintained in a reset state until the temperature of the video digitizer returns to within the predetermined temperature range or limit.

In an embodiment, the FPGA 124 performs a relatively high-rate pixel processing in order to unburden the CPU 125 and achieve a desired video processing frame rate. This hardware architecture balance reduces overall system cost by removing the cost associated with an adequately fast CPU chip. A further frame rate speed up can be achieved by using the FPGA and CPU processing simultaneously in parallel. This parallel processing is accomplished by FPGA pixel processing the next frame during the interval that the CPU is data processing the current frame. Thus, the new FPGA output is immediately available to the CPU process when the CPU finishes the current frame data processing. This process structure requires the ability to maintain two independent sets of data, and is referred to later herein as ping/pong control.

Figure 15A:
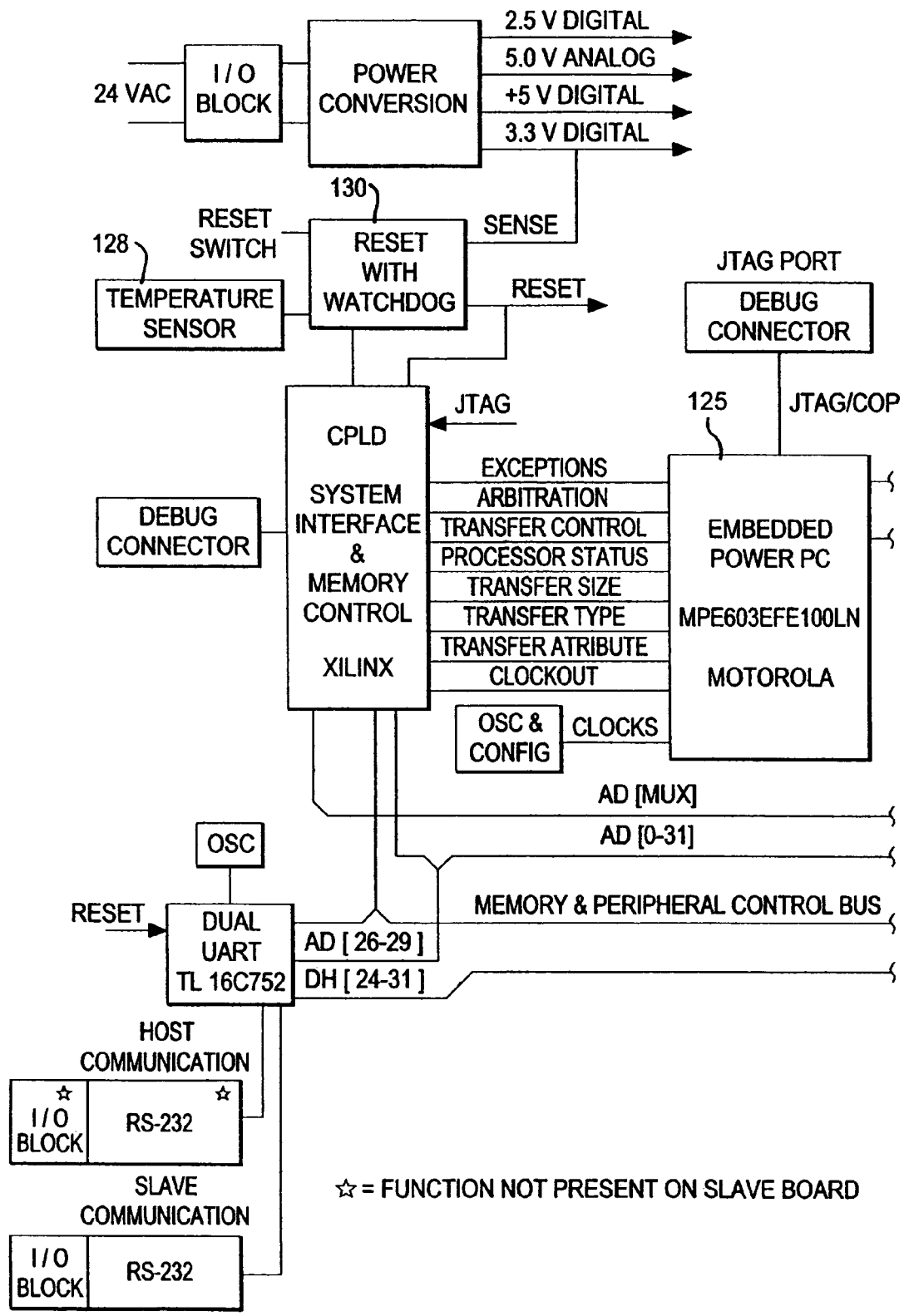
FIGS. 15a and 15b are a simplified block diagram of one of the object sensor/imaging circuits of FIG. 2 having a Field Programmable Gate Array (FPGA) and a Central Processing Unit (CPU)
Figure 15B:
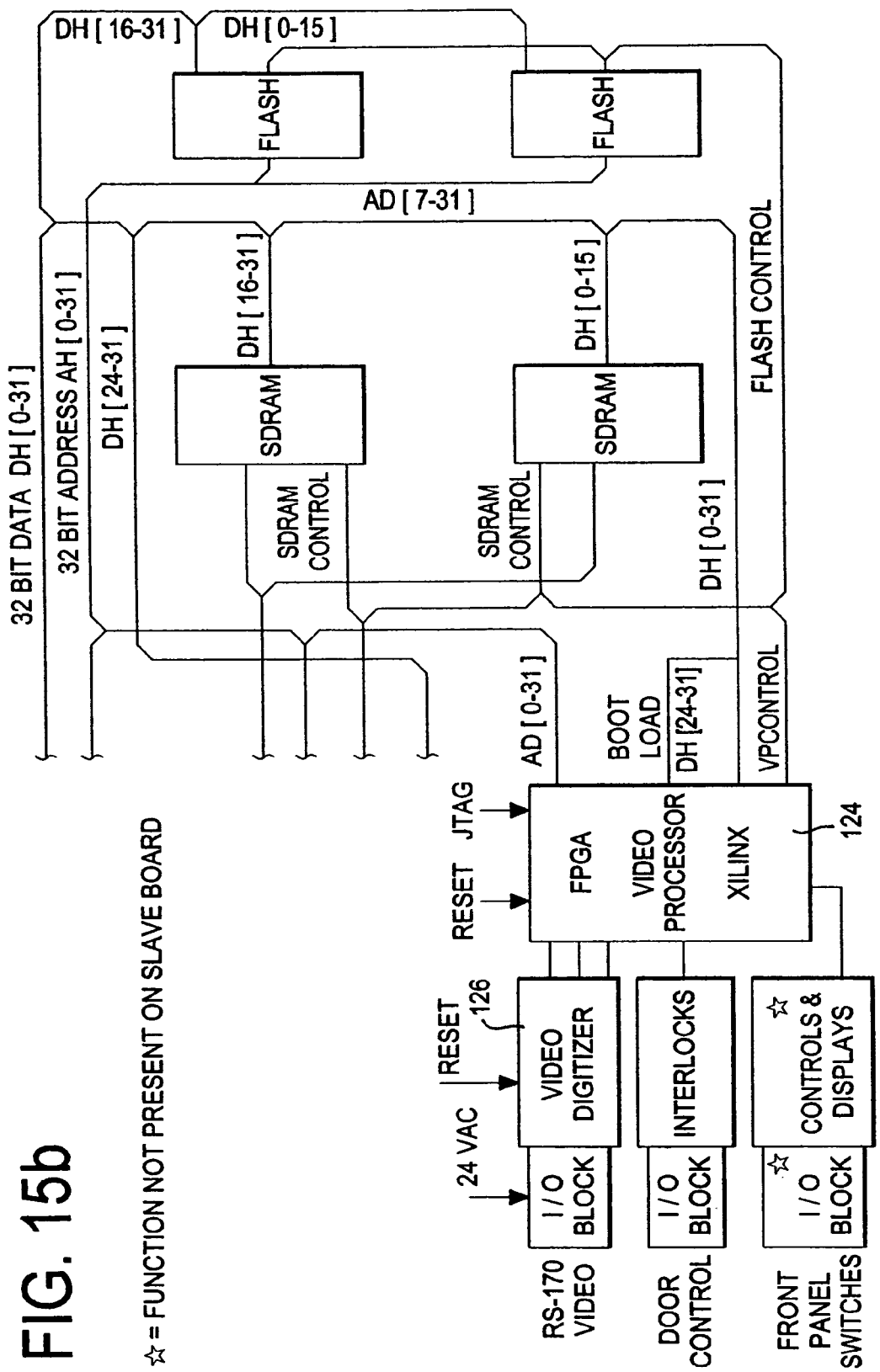
Figure 16:
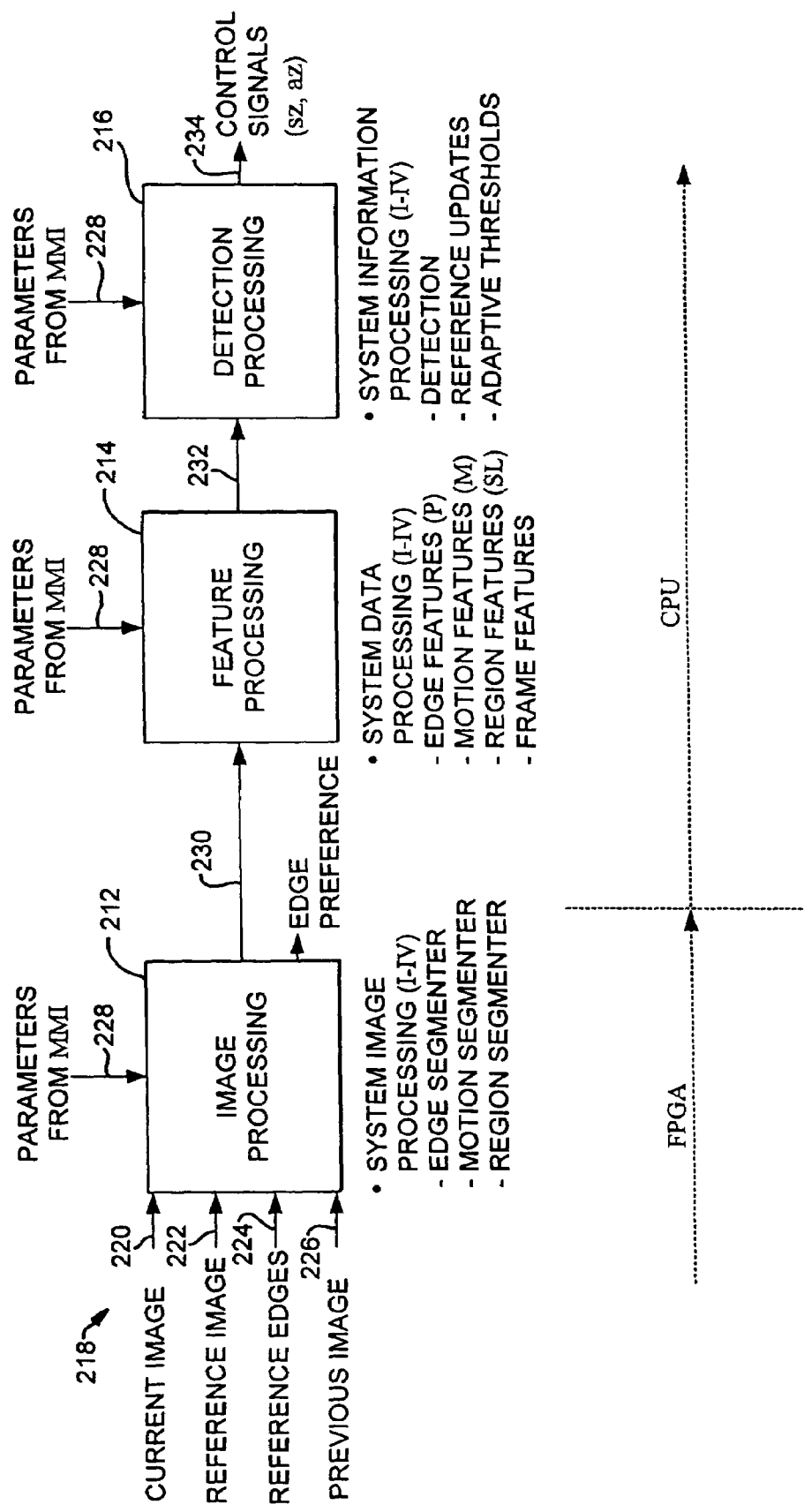
FIG. 16 is a top-level simplified block diagram of a processing system in accordance with the present invention, having an image processing module with the FPGA of FIGS. 15a and 15b, a feature processing module executed by the CPU of FIGS. 15a and 15b, and a detection processing module executed by the CPU of FIGS. 15a and 15b.

Turning to FIG. 16, a top-level simplified block diagram is depicted of a processing system in accordance with the present system. The system preferably includes an image processing module 212 within the FPGA 124 of FIGS. 15a and 15b, a feature processing module 214 executed by the CPU 125 of FIGS. 15a and 15b, and a detection processing module 216 also executed by the CPU 125 of FIGS. 15a and 15a.

In an embodiment, the image processing module 212 receives stored electronic pixel data 218 comprising current image data 220, reference image data 222, reference edges data 224, and previous image data 226. Preferably, the current image data 220 is the most recently taken image (i.e., taken at t), the previous image data 226 is the next most recently taken image data (i.e., taken at t+1), and the reference image data 222 is the oldest of the taken image data (i.e., taken at t+1+x). Moreover, as explained in detail further herein, the reference edges data 224 consists of edge data extracted from the reference image data 222.

The image processing module 212 also receives parameter data 228 from the man-machine interface (i.e., membrane keypad 118 and I/O display board 116 of FIG. 2). As explained in detail further herein, the parameter data 228 includes information pertaining what areas (i.e., control zones) that a detected object within the field of views (112 and 123 of FIGS. 2 and 3) is to result in opening of the door 121 (FIGS. 2 and 3).

As explained in detail further herein, in response to the electronic pixel data 218 and the parameter data 228, the image processing module 212 produces derived image data 230 comprising edge segmentation, motion segmentation, and region segmentation.

The feature processing module 214 receives the derived image data 230 and the parameter data 228. As explained in detail further herein, the feature processing module 214 produces, in response to the image data 230 and parameter data 228, feature data 232 comprising edge features, motion features, region features, and frame features.

The detection processing module 216 receives the feature data 232 and the parameter data 228. In response to the data, the detection processing module 216 produces control signals 234 comprising a detection signal for opening and closing the door 121 (FIGS. 2 and 3), reference updates, and adaptive thresholds.

Figure 17:
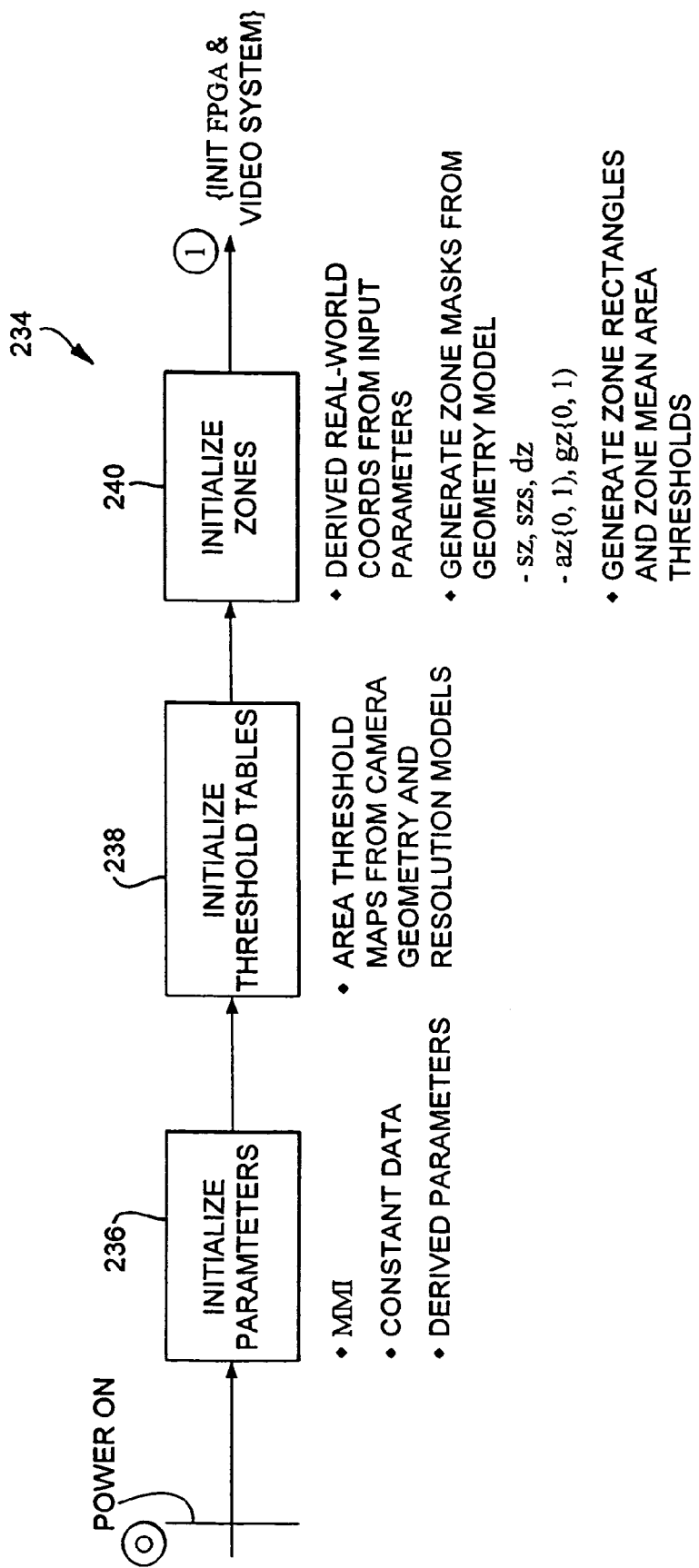
FIG. 17 is a simplified block diagram of an initialization sequence for the processing system of FIG. 16, for initializing input parameters and calculating related, derived parameters, for initializing detection threshold tables, and for initializing detection and feature calculation zones.

Turning to FIGS. 17 and 18, a simplified block diagram is depicted of an initialization sequence for the processing system of FIG. 16. The initialization sequence 234 includes an initialize parameters step 236, an initialize threshold tables step 238, an initialize zones step 240, an initialize FPGA step 242, an initialize video digitizer step 244, and an initialize video system step 246.

The initialize parameters step 236 includes initialization of the man-machine interface and constant data and derived parameters. During initialization of the man-machine interface, user entered data is read and stored into memory. Constant data is also loaded into memory along with derived parameters relating to control zones for opening and closing the door.

Thus, as indicated above, upon application of power to the system, the initialize parameter module 236 initiates the initialization of the man-machine interface (i.e., membrane keypad 118 and I/O display board 116 of FIG. 2), constant data, and derived parameters. The initialize threshold table module 238 initiates the initialization of the area threshold maps from the camera geometry and resolution models. These maps are used to determine minimum and maximum pixel characteristics of objects such as people and vehicles such as, for example, forklifts.

The initialize zones module 234 initiates the initialization of the control zones whereupon data associated with user or predefined safety zones and activation zones is complied. The initialize FPGA 242 and the initialize video digitizer 244 initiates the initialization of the FPGA 124 FIGS. 15a and 15b) and the video digitizer 126 (FIGS. 15a and 15b), respectively. In particular, the control status register (CSR) and image buffers pointer are initialized during FPGA initialization. Further, the video digitizer is initialized by constructing the required instructions and sending them, via the FPGA serial I/O.

The initialize video system 246 initiates the initialization of the CPU 125 (FIGS. 15a and 15b). In particular, the first ping-pong data set is selected. Next, the FPGA is instructed to capture a video frame. Four images (reference images) are then initialized—a grey level reference (R), an edge reference (GER) and an archive edges reference. The FPGA is then instructed to process these data. The FPGA outputs are retrieved from the FPGA into the Bank 0 database.

After the system is initialized, the system operates in a video processing loop depicted in the simplified block diagrams of FIGS. 19-22. In an embodiment, the video processing loop 250 includes a get next frame step 252, a retrieve FPGA data step 254, a calculate all features step 214, a calculate detection & control step 258, a save FPGA data step 260, and a write diagnostics step 262.

Within the video processing loop 250, the CPU 125 process use the current ping/pong buffer to point to, load and unpack that data into a third database—the user data—bank U. This data is used in the CPU process later to generate features and detection decisions on the current frame. Preferably, at the same time, the CPU process starts the FPGA capture and process activity on the FPGA 124. While the CPU is processing features for the current frame, the FPGA is computing image data for the next frame. The detection and control activity sends the safety and activate signals out through the FPGA serial I/O interface. The CPU feature and detection processing takes longer than the FPGA computations. When the CPU finishes the current frame, the FPGA data is retrieved to the opposite bank (e.g., Bank 1 if processing Bank 0). Diagnostic messages can be output at the end of each frame processing, as well as at any point in the video processing. The process then loops to set Bank U to the new current bank (Bank 0 or Bank 1), and the FPGA is again initiated.

Turning to FIG. 22, a simplified block diagram is provided of an embodiment of a system resources allocation method, or ping/pong control, in accordance with the present invention. As stated previously, the video processing system 110 includes an FPGA 124 for image processing. This results in the production of derived image data 230 comprising edge segmentation, motion segmentation, and region segmentation.

Once the derived image data 230 is produced, it is preferably stored within one of a plurality of memory banks 230a, 230b and then provided, via switching, for feature processing. Accordingly, the derived image data 230 provided to the feature processing module 214 is static. However, the FPGA 124 continuously processes the electronic pixel data 218 and loads the results of the image processing, via switching, into the memory bank not currently accessible to the processing module 214. Accordingly, the derived image data 230 within the memory banks is accessible to the feature processing module via switched between the memory banks 230a,230b on a first-in-first-out basis.

Preferably, two memory banks 230a and 230b are provided. Turning back to FIG. 19, the get next frame step 252 provides for the capture and processing of electronic pixel data 218 by the image processing module 212 within the FPGA 124. In particular, a control and status register (CSR) is used for selection of the memory banks 230a,230b and to set capture & process bit.

The retrieve FPGA data step 254 provides for obtaining the static data within the memory banks for processing of the static data during the calculating all features step 256. In particular, temporary storage registers and counters are reset, and the static data is unpacked to provide the derived image data 230 for processing by the feature processing module 214 (FIG. 16).

In an embodiment, and as explained in detail further herein, the feature processing module 214 (FIG. 16) performs the calculate all features step 256, in response to the derived image data 230 (FIG. 16) and parameter data 228 (FIG. 16). In particular, the calculate all features step 256 produces feature data 232 (FIG. 16) comprising edge or P features, motion features, shadow and lightbeam or region features, and frame features.

Further, the detection processing module 216 performs the calculate detection & control step 258, in response to the feature data 232 (FIG. 16) and parameter data 228 (FIG. 16). In particular, frame analysis fault flags are evaluated, detection logic is executed, reference frame update requires are evaluated, automatic adaptive thresholds are evaluated, and motion reference data is updated.

The save FPGA data step 260 occurs once the FPGA 124 (FIGS. 15a and 15b) provides an interrupt to the CPU 125 (FIGS. 15a and 15b) indicating that the FPGA has completed processing of another image frame and the data is ready for processing by the feature processing module (FIG. 16 ). Moreover, if desired, the write diagnosis step 262, which is performed by the CPU 125 (FIGS. 15a and 15b), can store within memory one or more messages regarding how the processing of the previous frame data progressed. The video processing loop 250 the preferably continues back to the get next frame step 252.

Figure 23:
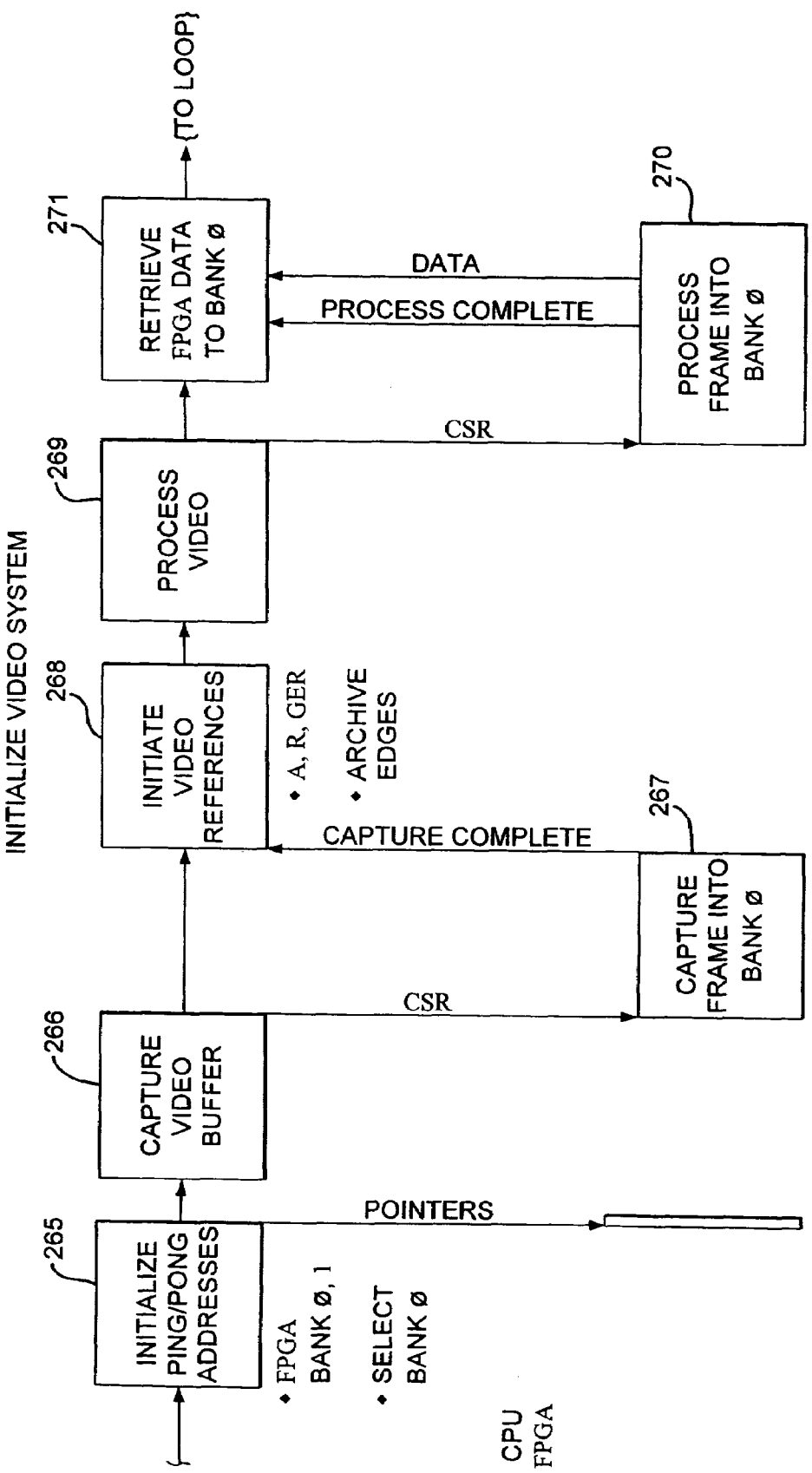
FIG. 23 is a simplified block diagram of the initialization of the ping-pong system depicted in FIG. 22.

Turning to FIG. 23, a simplified block diagram is provided of an embodiment of an initialization procedure for the ping-pong system of FIG. 22. In an embodiment, the ping-pong initialization procedure 264 includes an initialize ping-pong addresses module 265, a capture video buffer module 266, a capture frame module 267, an initiate video references module 268, a process video module 269, a process frame module 270, and a retrieve FPGA data module 271.

Figure 24:
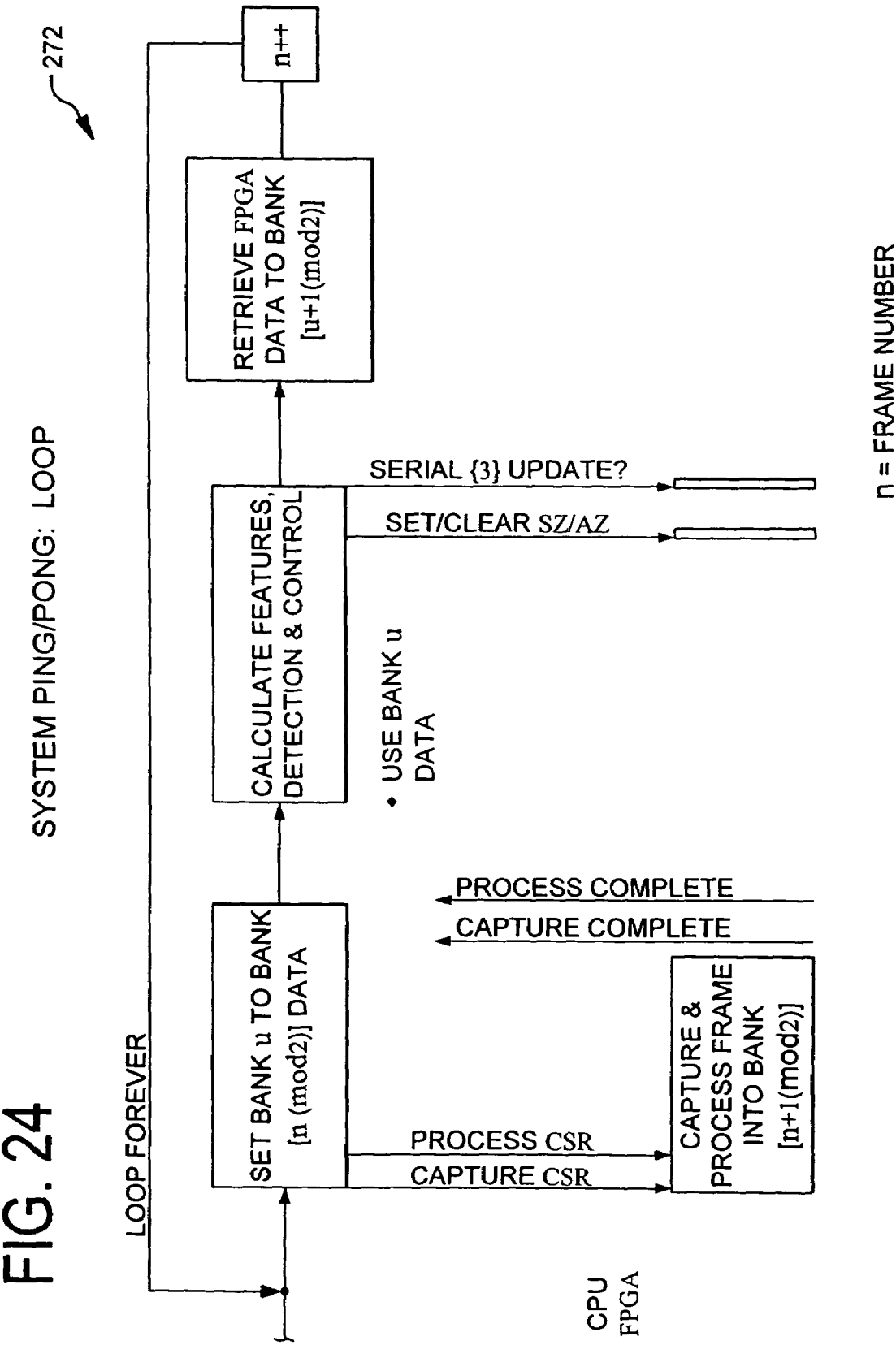
FIG. 24 is a simplified block diagram of the ping-pong process loop for the ping-pong system of FIG. 22.

FIG. 24 provides a simplified block diagram of the ping-pong process loop 272 for the ping-pong system of FIG. 22. The top of the loop 272 shows the CPU activity while the bottom shows the FPGA activity (not in time scale), with the associated serial I/O and CSR messaging.

Figure 25:
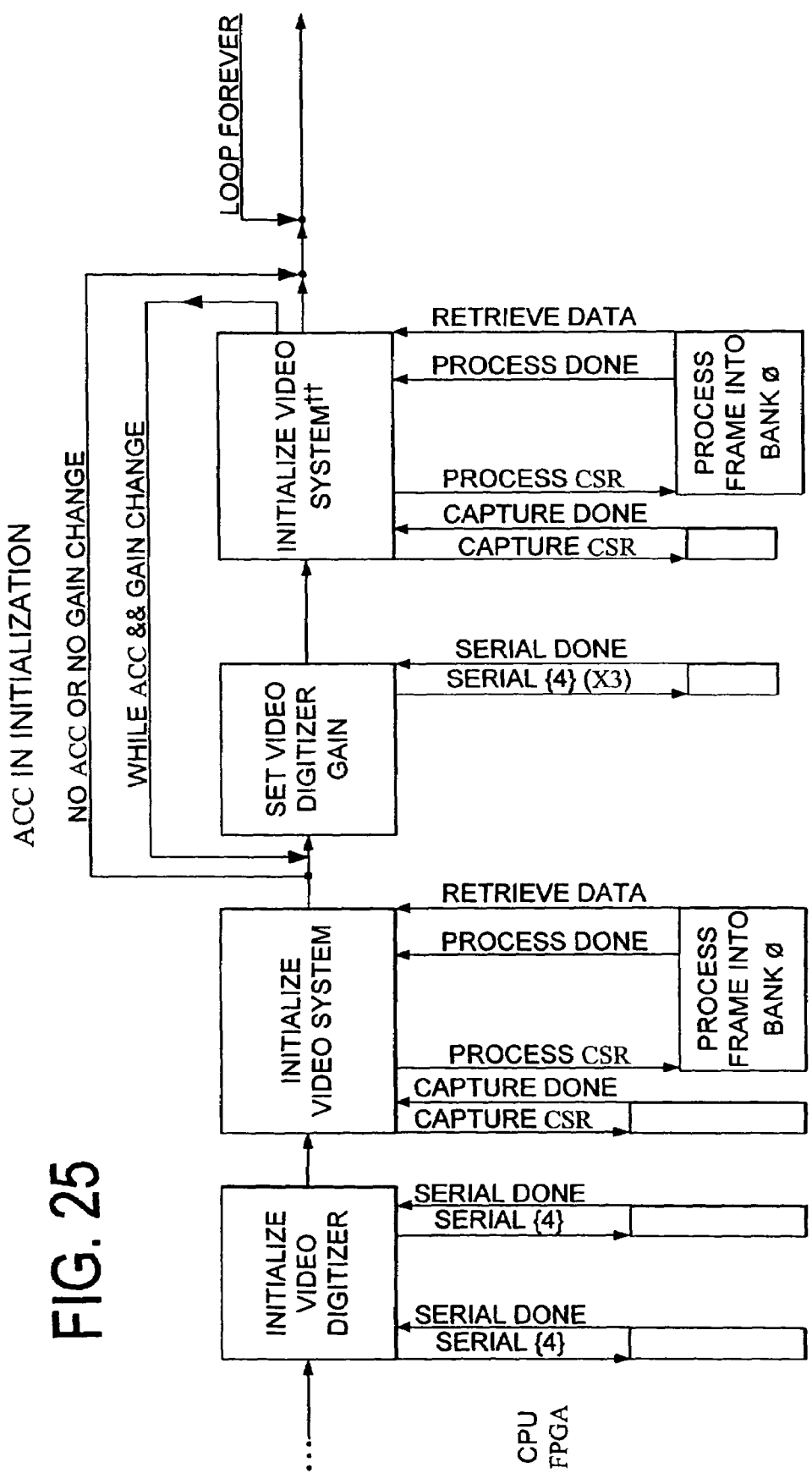
FIG. 25 is a simplified block diagram of an automatic contrast compensation initialization for the processing system of FIG. 16, for changing the video gain in response to image characteristic criteria and time dynamic criteria.
Figure 26:
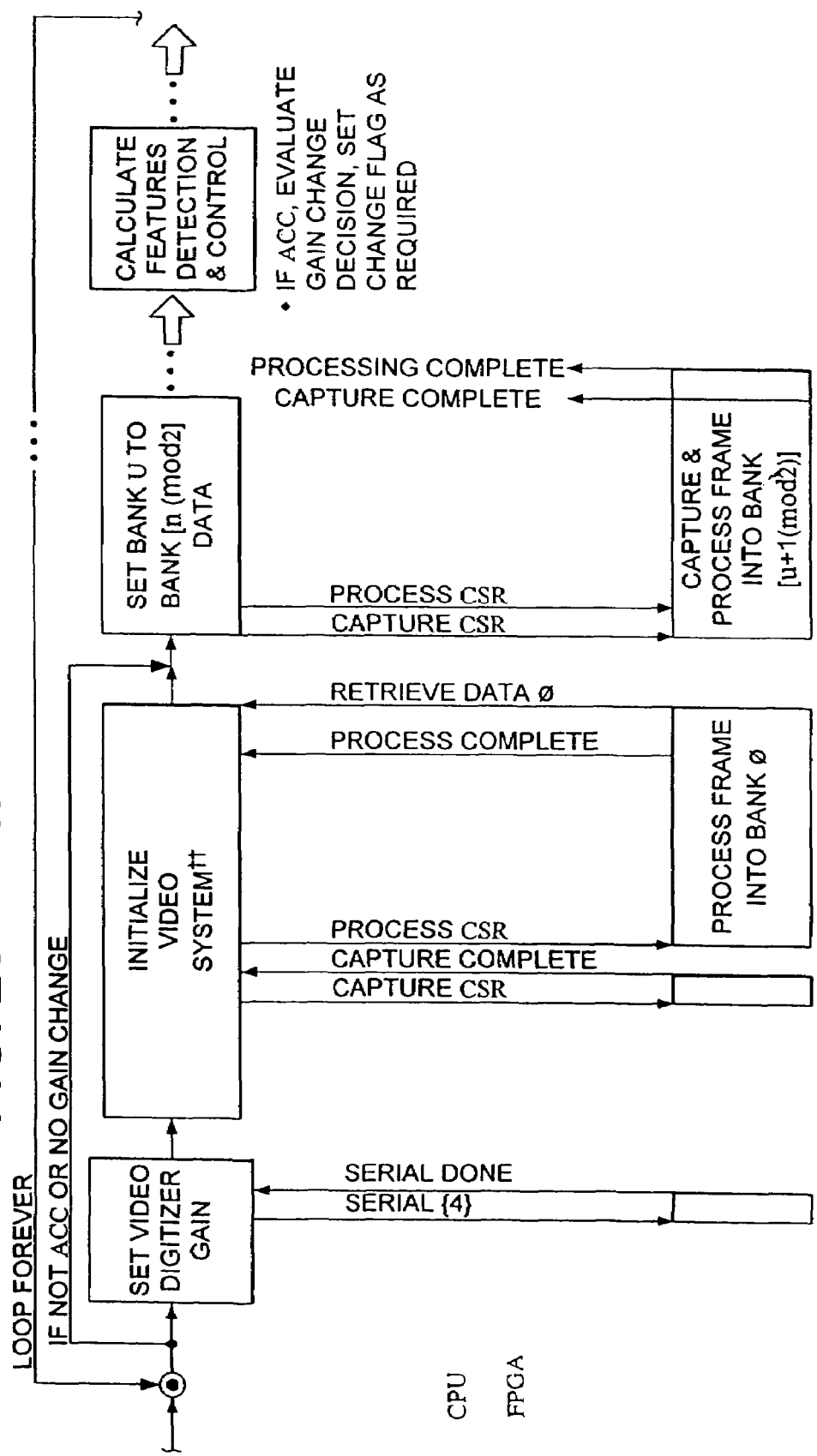
FIG. 26 is a simplified block diagram of the automatic contrast compensation in a video loop for the processing system of FIG. 16, for changing the video gain in response to image characteristic criteria and time dynamic criteria.

FIGS. 25 and 26 illustrate the details of the ping/pong activity (initialization & video loop) in an alternative embodiment having an automatic contrast circuit (ACC). The ACC can be used to improve system detection performance due to slowly changing lighting conditions. The ACC does this by changing the video gain in response to image characteristic criteria and time dynamic criteria. The ACC maximizes gain while preventing too much image white saturation. After a gain change, the video system is reinitialized.

The ACC, when enabled by user input, functions during initialization to find the best starting gain by iterating and testing the image result. When a gain is found which satisfies established criteria, iterating stops, and the process continues to the video loop with the selected gain. The ACC also functions at the beginning of the video loop, but does not iterate to fine a satisfactory gain. Only a single gain change is performed in the loop per frame. The gain change and consequent video system initialization take a much shorter time than a frame time (100 ms). The decision to require a gain change in the video loop is controlled by criteria calculated in the detection and control portion of the CPU activity. The criteria can include aging, zone activity, and long and short time-constant filters.

Figure 27:
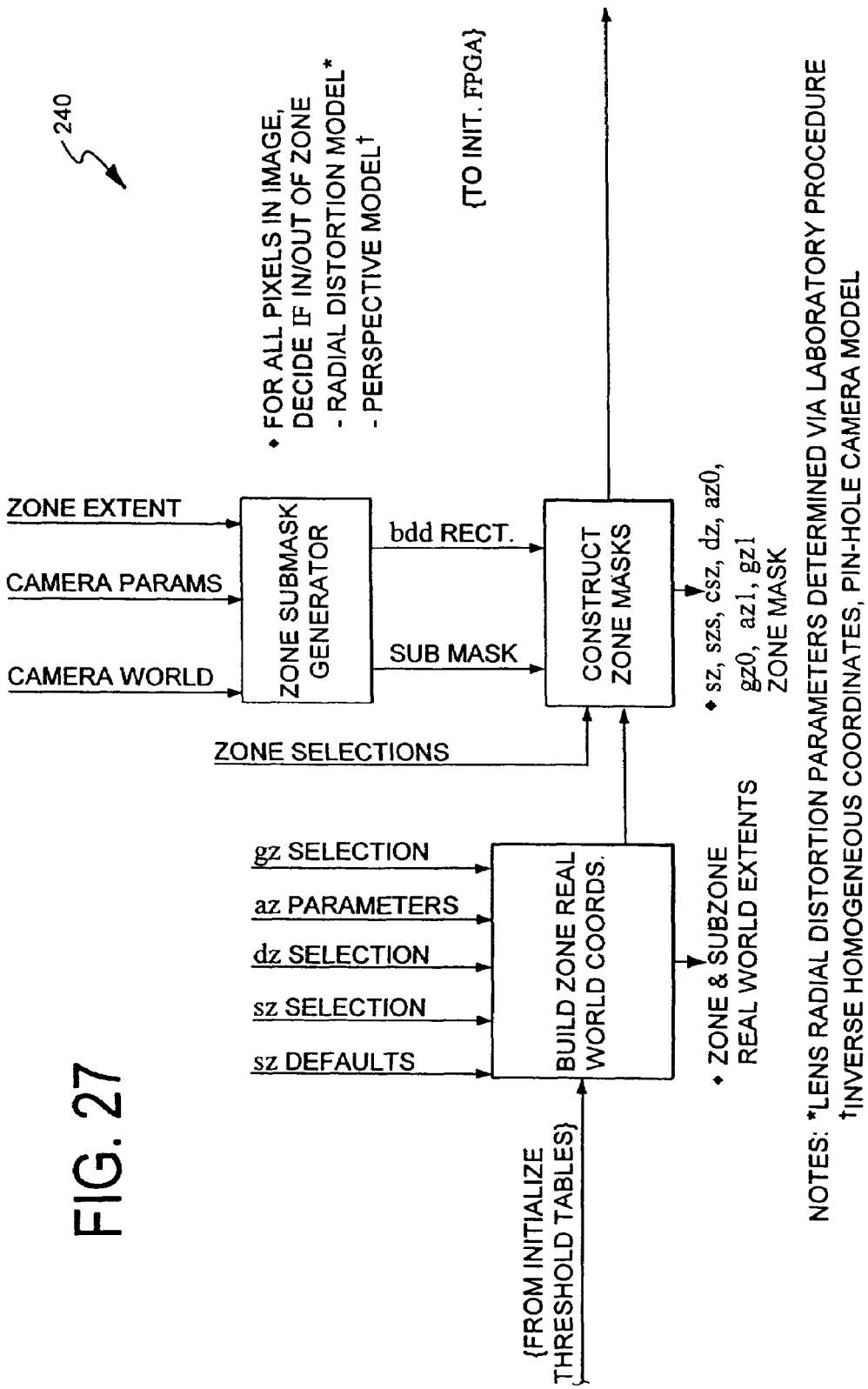
FIG. 27 is a simplified block diagram of the zone initialization sequence for the system initialization of FIG. 17, for building zones in real world coordinates, generating zone submasks and constructing zone masks.
Figure 28:
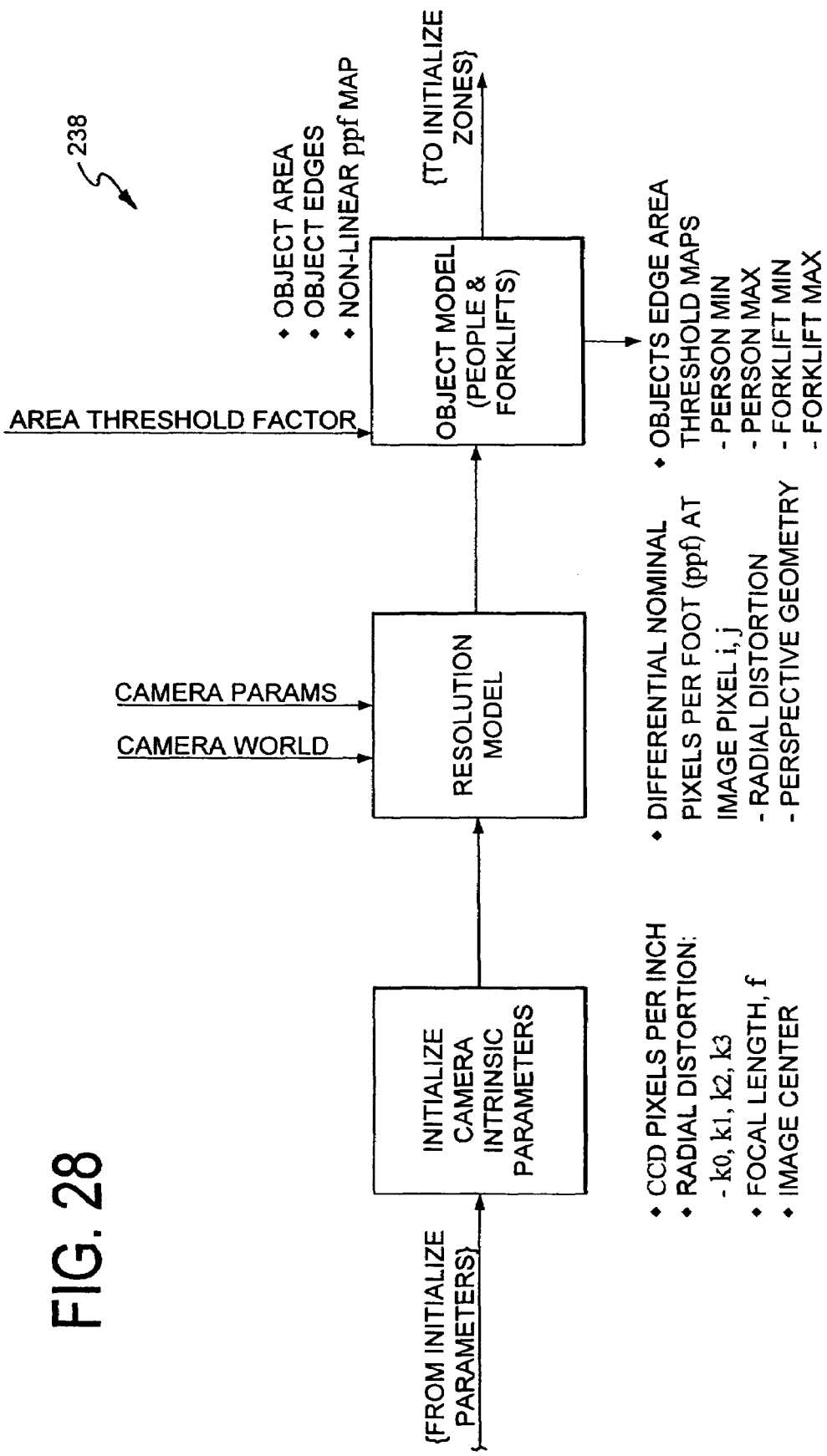
FIG. 28 is a simplified block diagram of the threshold tables initialization sequence for the system initialization of FIG. 17, having an initialize camera intrinsic parameters module, a resolution model module and an object model module.

FIG. 27 provides a simplified block diagram of the zone initialization sequence 240 for the system initialization of FIG. 17. The zone initialization sequence 240 results in the building of zones in real world coordinates, generating control zone submasks and constructing control zone masks. FIG. 28 provides a simplified block diagram of the threshold tables initialization sequence 238 for the system initialization of FIG. 17. The threshold tables initialization sequence 238 result in the initialization of camera intrinsic parameters, the resolution model, and the object model.

Figure 29:
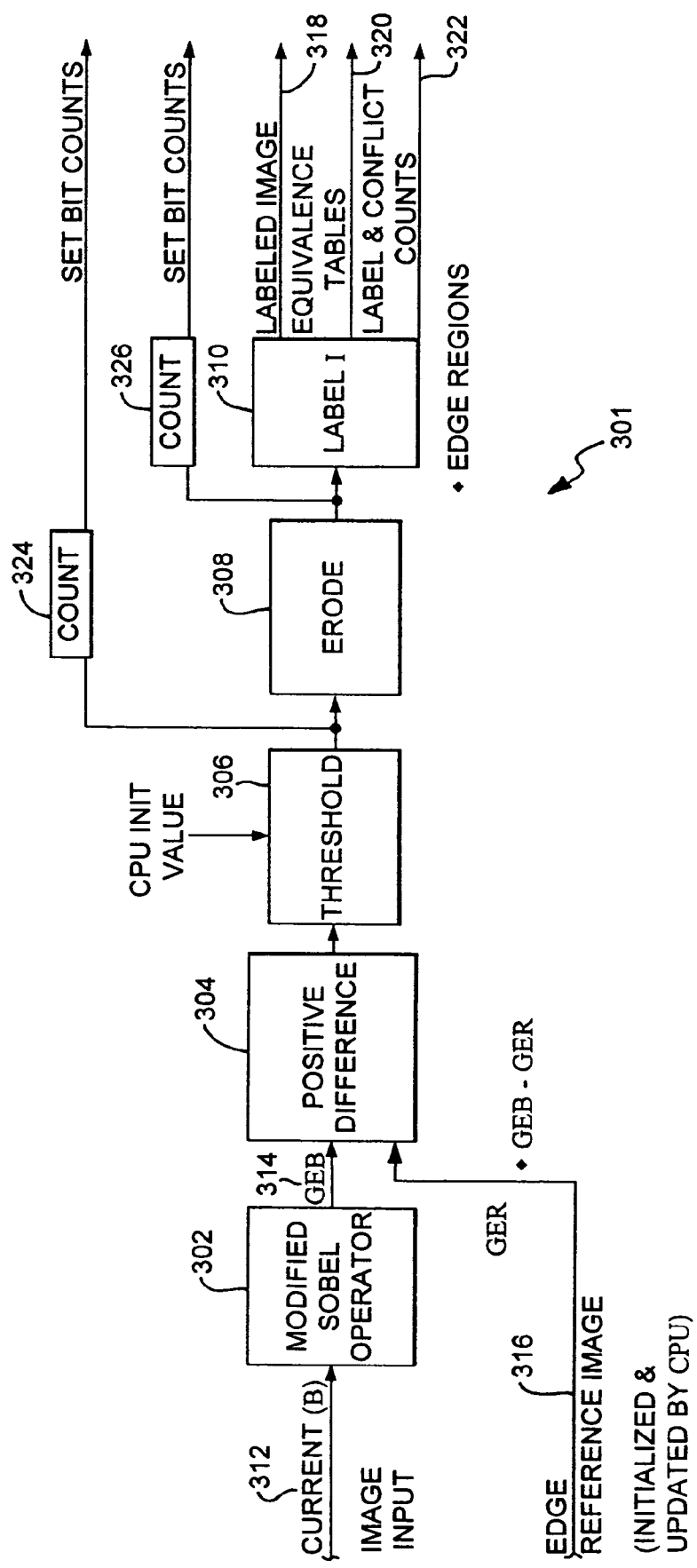
FIG. 29 is a simplified block diagram of the image processing module for the processing system of FIG. 16, having an edge detector.

Turning to FIG. 29 (and referencing FIGS. 48 and 49), a simplified block diagram is provided of the image processing module for the processing system of FIG. 16 which includes an edge detector 301. The edge detector 301 preferably includes a modified Sobel operator module 302, a positive difference module 304, a threshold module 306, an erode module 308, and a label I module 310.

In an embodiment, the modified Sobel operator module 302 receives current (B) image input 312 and generates the edge image (GEB) 314 from the current input image. A reference image (GER) 316, initialized in the CPU, is subtracted from the current edge image in the positive difference operator module 304, where negative values are set to zero. The grey-level edge image is thresholded 306, eroded 308, and labeled 310. The output of the label I operator 310 is a 16-bit labeled image 318, an equivalence table 320, and counts of the number of labels used 322 and the number of entries in the equivalence table. Counts of the number of set pixels in the binary input 324 and output 326 of the erode operator 308 are also output to the CPU, completing the edge image processing.

Label I operator 310 is used in each thread of the image processing. Label I 310 is the first part of a two step process used to produce the labeling of the connected components of the binary input. Label 1310 passes a 2×2 kernel over the binary input image beginning with the upper left of the image. The elements of the kernel are identified as follows:

| B | C |
|---|---|
| A | X |

If the binary pixel in X is zero, the output is zero. If X is set, the labels B, A, C are scanned in that order. If all of B, A, C are non-zero, the next value of a label counter is output at X and the counter is incremented. If any B, A, C are non-zero, the label operator is the value of the first non-zero label. If more than one of B, A, C is non-zero, the first non-zero value is output. If any of the remaining non-zero labels is different from the output value, the output value and the different value are written to an equivalence table.

Figure 30:
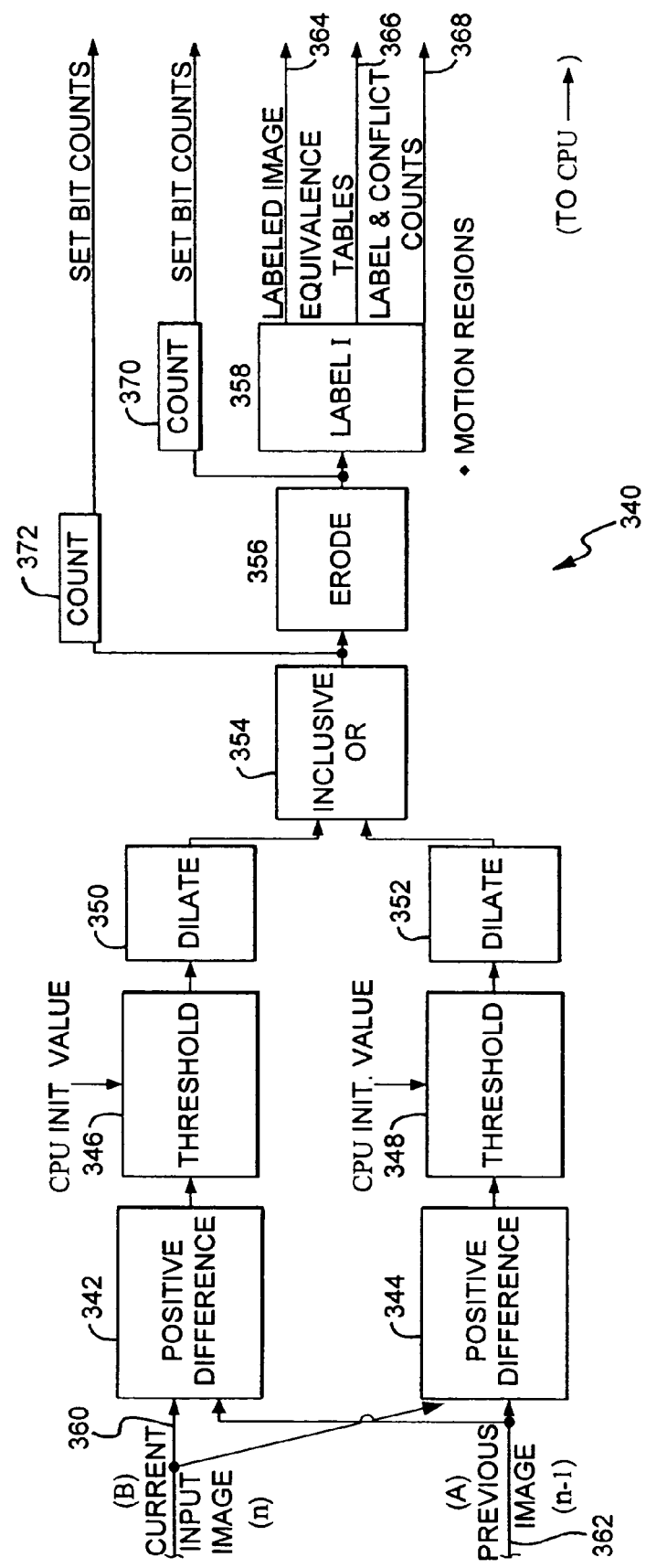
FIG. 30 is a simplified block diagram of the image processing module for the processing system of FIG. 16, having a motion detector that uses regions.

Turning to FIG. 30 (and referencing FIGS. 48 and 49), a simplified block diagram of the image processing module for the processing system of FIG. 16, having a motion detector that uses regions 340. The system 340 preferably includes positive difference modules 342 and 344, threshold modules 346 and 348, and dilate modules 350 and 352 for both the current (B) input image (n) and previous (A) image (n–1) respectively. The output is passed to the inclusive OR module 354, erode module 356, and Label I module 358.

The positive difference of the current grey-level input image (B) 360 and the previous image (A) 362 is thresholded 346 and 348 and dilated 350 and 352, as well as the positive difference of A and B 342 and 344. The results are inclusively ORed 354. The resulting binary image is labeled as in the edge case (FIG. 29), and the results are passed to the CPU.

The grey-level edge image is thresholded, eroded 356, and labeled 358. The output of the label I operator 358 is a 16-bit labeled image 364, an equivalence table 366, and counts of the number of labels used 368 and the number of entries in the equivalence table. Counts of the number of set pixels in the binary input 370 and output 372 of the erode operator 356 are also output to the CPU, completing the motion detector image processing using regions.

Label I operator 358 is used in each thread of the image processing. Label I 358 is the first part of a two step process used to produce the labeling of the connected components of the binary input. Label I 358 passes a 2×2 kernel over the binary input image beginning with the upper left of the image. The elements of the kernel are identified as follows:

| B | C |
|---|---|
| A | X |

If the binary pixel in X is zero, the output is zero. If X is set, the labels B, A, C are scanned in that order. If all of B, A, C are non-zero, the next value of a label counter is output at X and the counter is incremented. If any B, A, C are non-zero, the label operator is the value of the first non-zero label. If more than one of B, A, C is non-zero, the first non-zero value is output. If any of the remaining non-zero labels is different from the output value, the output value and the different value are written to an equivalence table.

Figure 31:
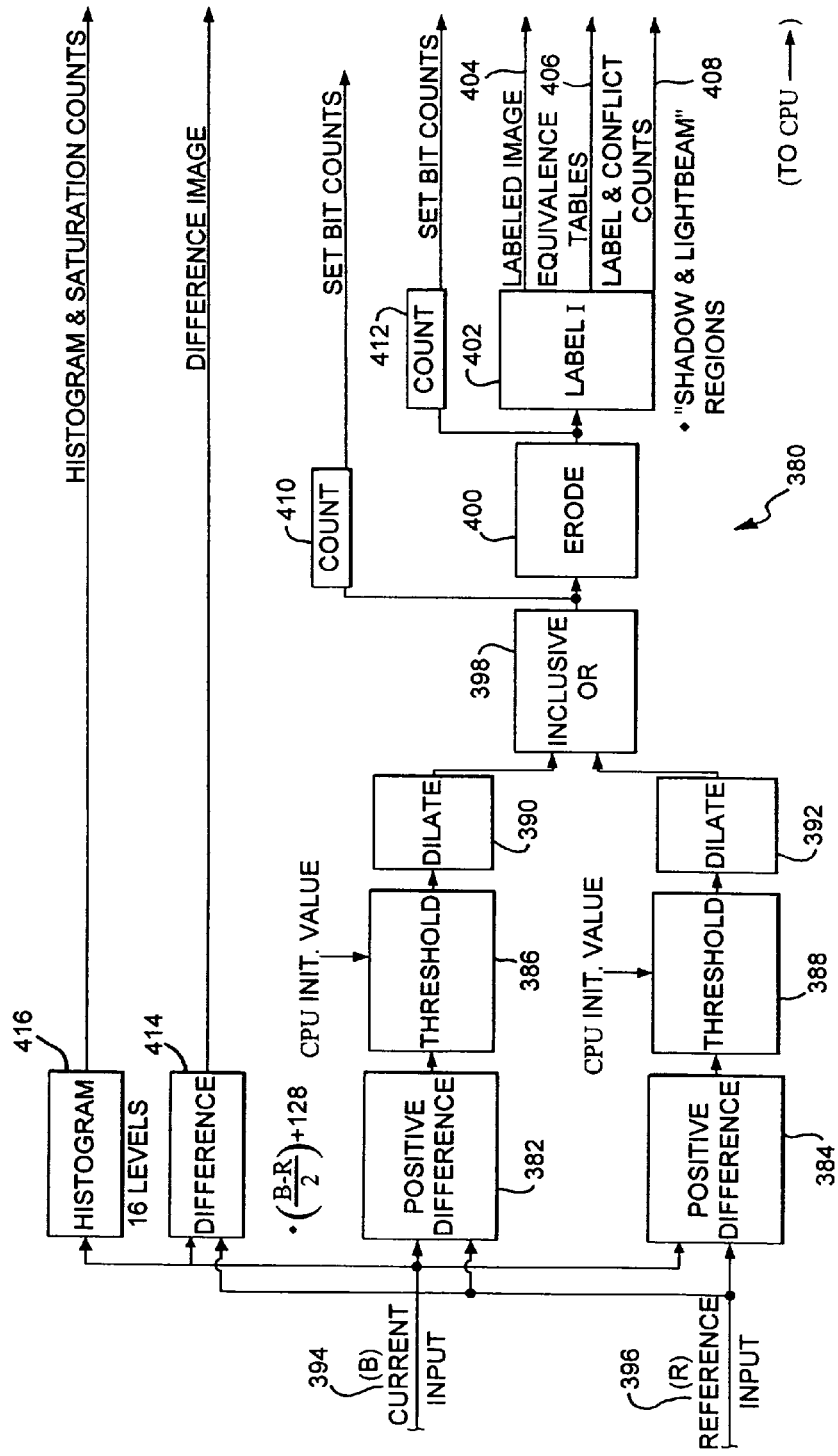
FIG. 31 is a simplified block diagram of the image processing module for the processing system of FIG. 16, having region analysis for shadow and lightbeam processing.

Turning to FIG. 31 (and referencing FIGS. 48 and 49), a simplified block diagram of the image processing module for the processing system of FIG. 16, having region analysis for shadow and lightbeam processing. The system 380 preferably includes positive difference modules 382 and 384, threshold modules 386 and 388, and dilate modules 390 and 392 for both the current (B) input image 394 and reference (R) input 396, respectively. The output is passed to the inclusive OR module 396, erode module 400, and Label I module 402. The output of the label I operator 402 is a 16-bit labeled image 404, an equivalence table 406, and counts of the number of labels used 408 and the number of entries in the equivalence table. Counts of the number of set pixels in the binary input 410 and output 412 of the erode operator 402 are also output to the CPU, completing the motion detector image processing using regions.

The system image processing region analysis detection operation is analogous to the motion detection operation of FIG. 30 except that instead of using the immediately previous image input A, it uses a previous image called the reference image 396 which is updated on CPU command as a copy of the current input image. The region analysis thread also produces a difference image 414 and a 16-level histogram 416 for CPU use.

Figure 32:
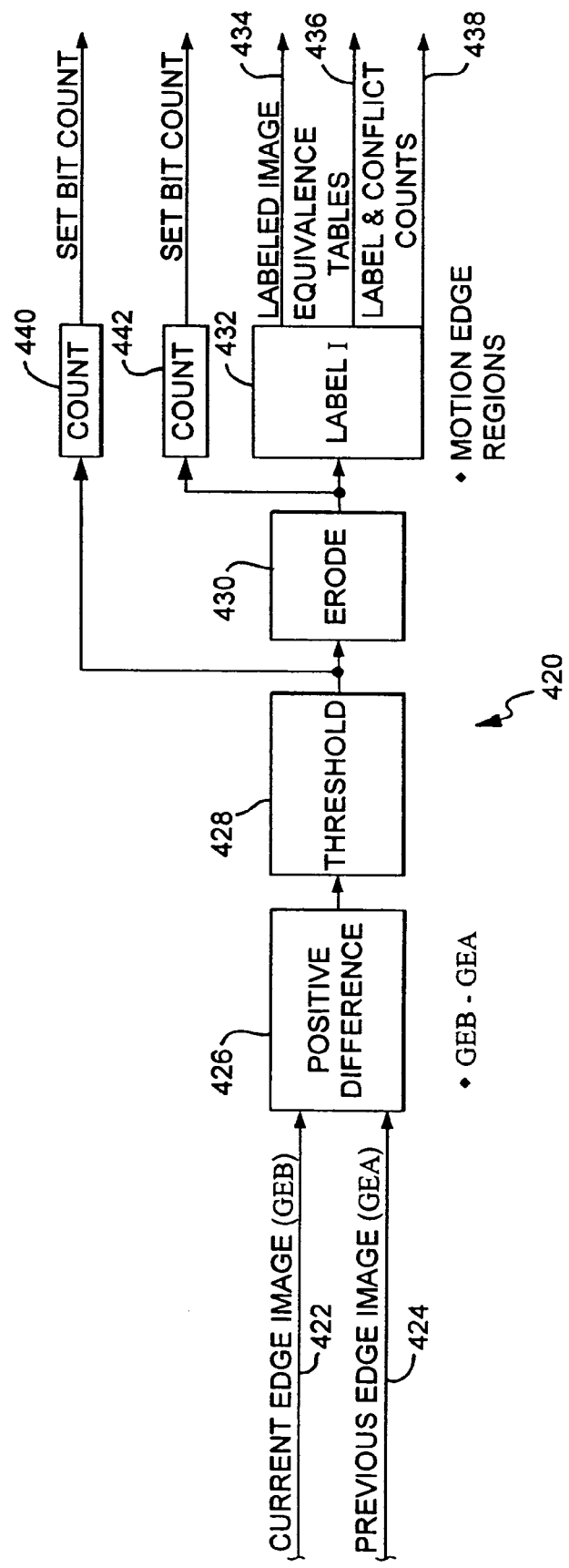
FIG. 32 is a simplified block diagram of the image processing module for the processing system of FIG. 16, having a motion detector that uses edges.

Turning to FIG. 32 (and referencing FIGS. 48 and 49), a simplified block diagram of the image processing module for the processing system of FIG. 16, having a motion detector that uses edges 420. The system 420 illustrates a selectable alternative motion detection image processing operation similar to the edge detection operation of FIG. 29, except that it takes the current edge image (GEB) 422 and the previous edge image (GEA) 424 as input to the positive difference module 426. The positive difference of GEB 422 minus GEA 424 is thresholded 428, eroded 430 and labeled 432 as in FIGS. 19, 20, and 21.

The output of the label I operator 432 is a 16-bit labeled image 434, an equivalence table 436, and counts of the number of labels used 438 and the number of entries in the equivalence table. Counts of the number of set pixels in the binary input 440 and output 442 of the erode operator 430 are also output to the CPU, completing the system image processing having a motion detector that uses edges.

Figure 33:
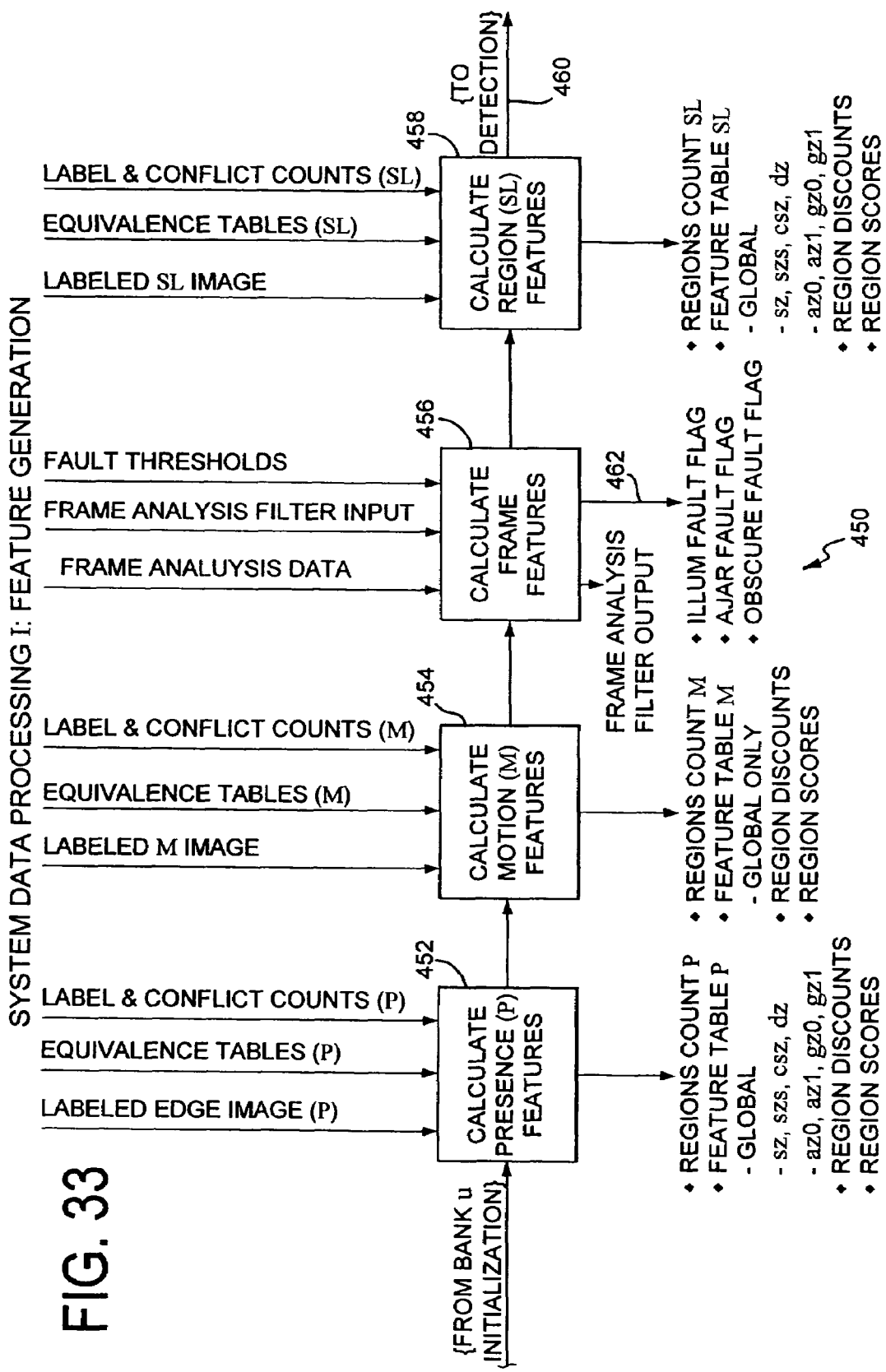
FIG. 33 is a simplified block diagram of the feature processing module for the processing system of FIG. 16, for calculating presence, motion, frame and region features.

Turning to FIG. 33, a simplified block diagram of the feature processing module 450 for the processing system of FIG. 16, for calculating presence, motion, frame and region features. The system data processing, calculating all features, is performed in the FPGA to unburden the CPU and achieve the desired processing rate.

The presence (P) or edge feature module 452 and the shadow and lightbeam (SL) or region feature module 458 calculations are quite similar to the point of generating the edge/region score discounts. Moreover, within the P feature 452 and SL feature 458 calculations, the global calculations are very similar to the zone calculations. The zone calculations restrict the spatial range of feature calculations for each zone using the associated zone mask. The results of the P and SL feature calculations are stored in a database (feature tables) for use in detection determination 460.

Frame features 456 are calculated differently than P and SL features. Frame features 456 are not features of objects, but of the input grey level image and the current edge image. Frame statistics are computed in order to draw inferences about conditions of the camera and video system integrity. Frame statistics are also used to condition some detection variables that act as adaptive thresholds. Three fault flags can be set by the calculate frame features module 456: illumination fault flag, obscure fault flag, and ajar fault 462. Each of these faults 462 is determined through associated metrics. The illumination fault is controlled by evaluating the modified Kuiper statistic, the uniform centered mean, and the variance of the grey level input. The obscure and ajar faults use the current and archive edges to detect whether the camera and/or video system have become obscured or knocked ajar.

The system 450 will not update the reference if any motion is detected in any zone. To determine if there is motion in each zone, the labeled edge image counts the number of non-zero pixels in the labeled zone, calculated in the presence P feature module 452. The non-zero pixels become motion pixels, calculated in the motion M feature module 454. The system 450 counts the non-zero pixels in the motion labeled image to verify if the zone motion pixels in each zone is greater than zero (0). The system 450 counts the non-zero pixels in the zone detection mask for accumulation in the count.

Figure 34:
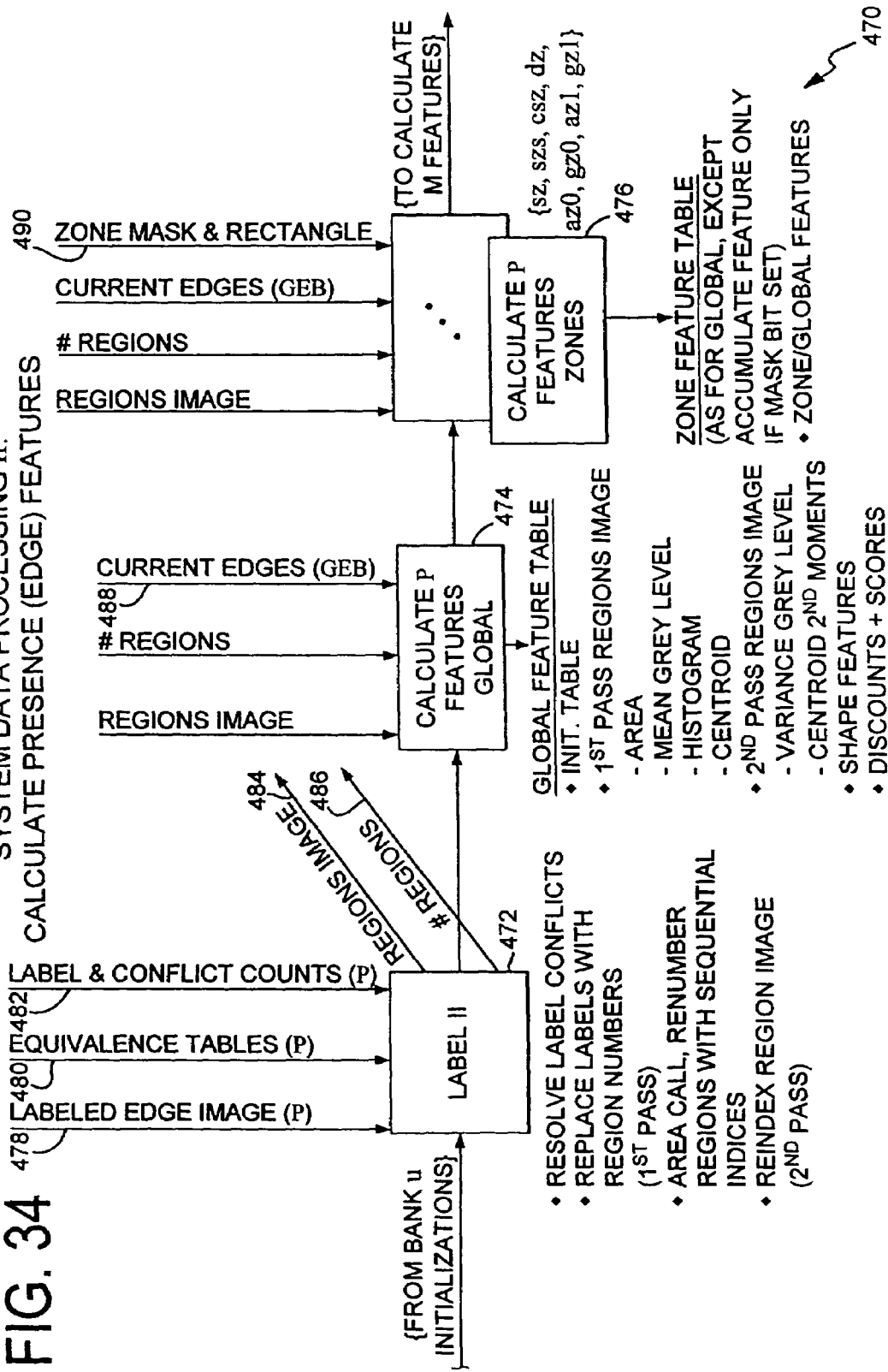
FIG. 34 is a simplified block diagram of the feature generation system of FIG. 33, having a label module, a calculate global presence features module and a calculate zone presence features module.

Turning to FIG. 34, a simplified block diagram of the feature generation system 470 of FIG. 33, having a label module 472, a calculate global presence features module 474 and a calculate zone presence features module 476.

The label module 472 receives presence input in the form of labeled edge image 478, equivalence tables 480, and label and conflict counts 482. The label module 472 resolves pixel labeling conflicts within the region, it replaces labels with region numbers, it makes an area call, renumbering regions with sequential indices, and re-indexes the region again, passing data related to the number of regions and regions image to the calculate global presence features model 474.

The calculate global presence features model 474 uses the regions image 484, the number of regions 486 and current edges (GEB) 488 to create a global feature table. The global feature table is first initialized, regions are labeled as to area, mean grey level intensity, histogram, and centroid. The region is then recalculated for variance of grey level and centroid, listing the features (global, safety, . . . ) of the pixels within the region.

The calculate P feature zones module 476 takes the aforementioned regions image 484, number of regions 486, the current edges (GEB) 488 and creates a zone feature table using zone mask and rectangle 490. The system 470 determines motion in zones by calculating detection in a safety zone, a secondary safety zone, a door zone, a first activation zone, a second activation zone, a first guard zone, and a second guard zone.

Figure 35:
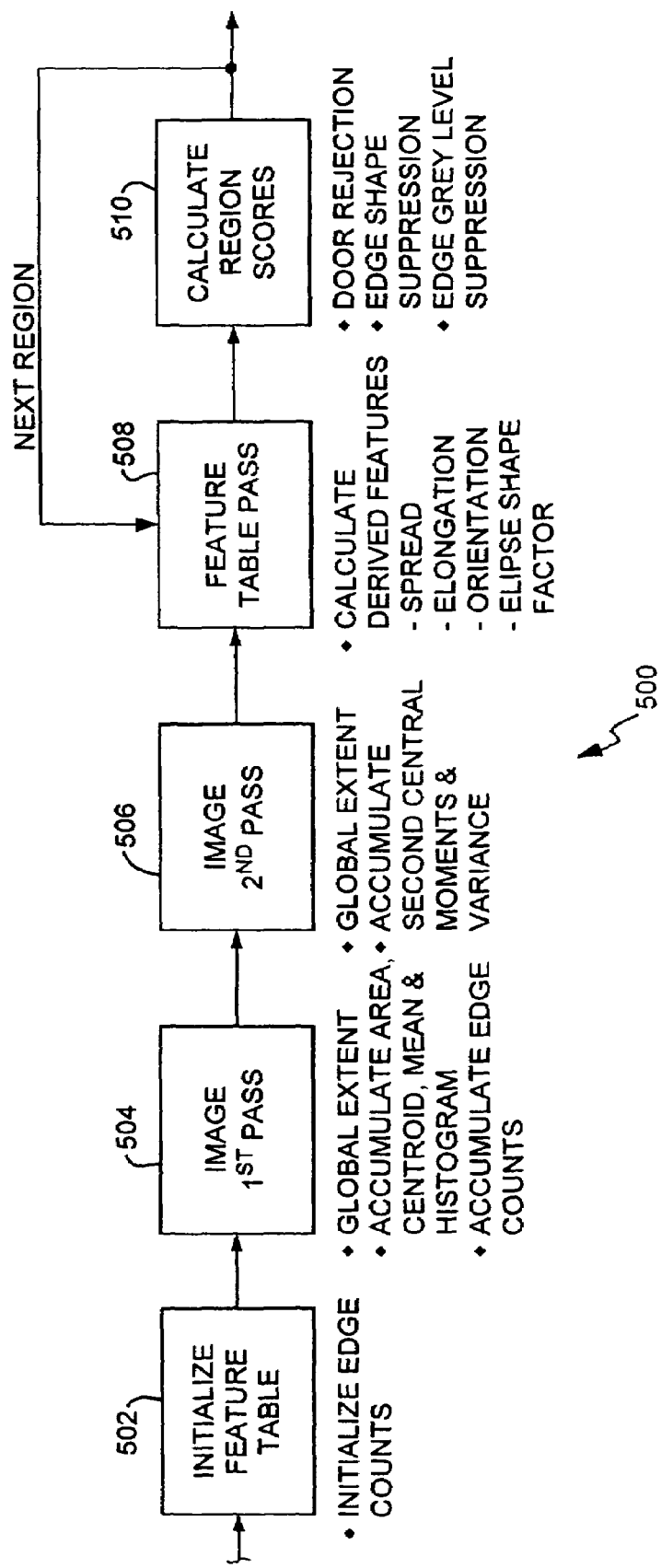
FIG. 35 is a simplified block diagram of the calculate presence feature system of FIG. 34, for calculating global presence features.

Turning to FIG. 35, a simplified block diagram of the calculate presence (edge) feature system of FIG. 34, for calculating global presence features module 500.

The global P features are calculated first by initializing the edge counts of the feature table 502. The global extent of the image is calculated in the image first pass module 504. Area, centroid, mean, histogram and edge counts are accumulated and put through the image second pass module 506 where a second central moments and variance is accumulated. The feature table pass module 508 calculates the derived features including the spread, elongation, orientation, and ellipse shape of the region. The calculate region scores module 510 determines door rejection, edge shape suppression, and edge grey level suppression. A score comes from the grey level variance of the region and a discount is applied to the score. After region scores are calculated 510, the next region is looped through the calculations of the feature table pass module 508.

Figure 36:
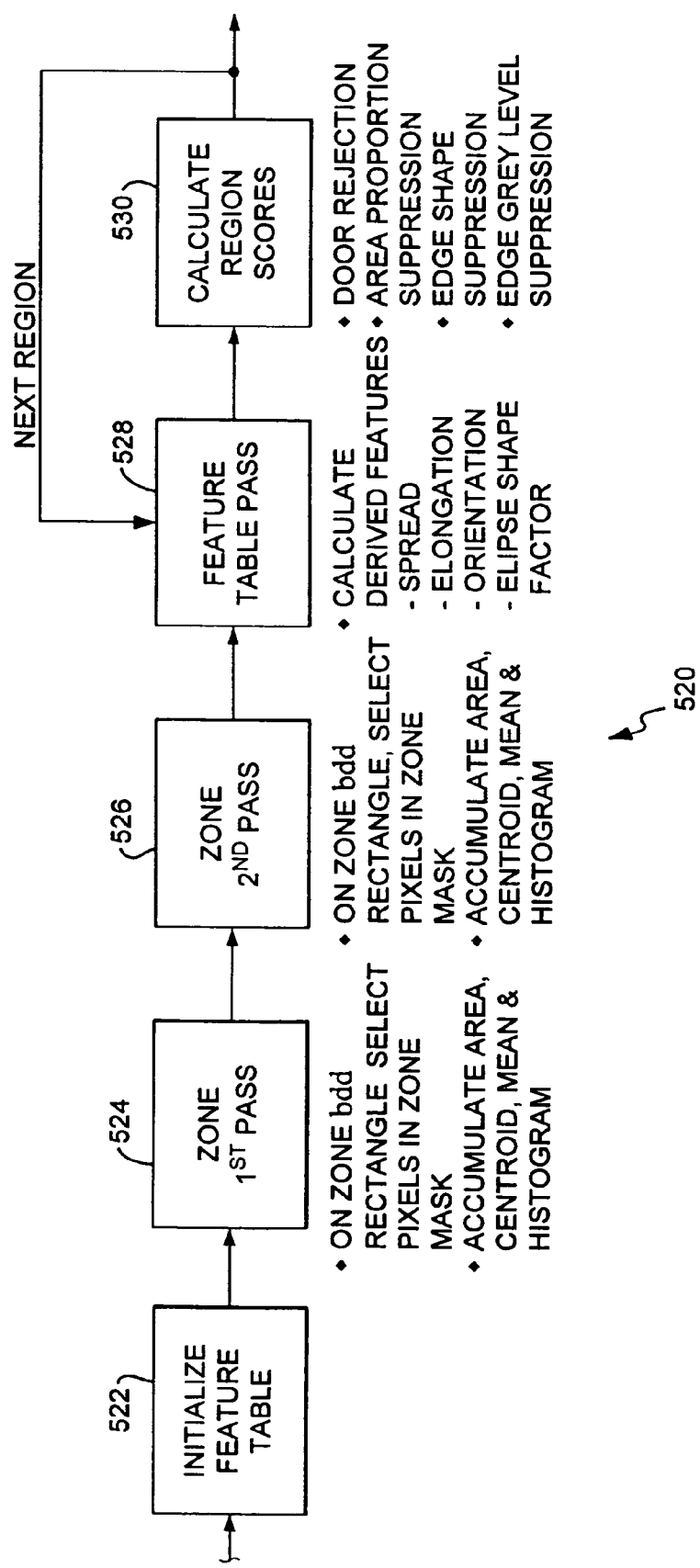
FIG. 36 is a simplified block diagram of the calculate presence feature system of FIG. 34, for calculating zone presence features.

Turning to FIG. 36, a simplified block diagram of the calculate presence feature system of FIG. 34, for calculating zone presence features.

The zone presence P features are calculated first by initializing the zone counts of the feature table 522. The global extent of the zone is calculated in the zone first pass module 524. The zone is calculated to determine if pixels are in the selected zone mask. Area, centroid, mean, and histogram are also accumulated and put through the image second pass module 526 where a second central moments and variance is accumulated. The feature table pass module 528 calculates the derived features including the spread, elongation, orientation, and ellipse shape of the region. The calculate region scores module 530 determines door rejection, area proportion suppression, edge shape suppression, and edge grey level suppression. After region scores are calculated 530, the next region is looped through the calculations of the feature table pass module 528.

Figure 37:
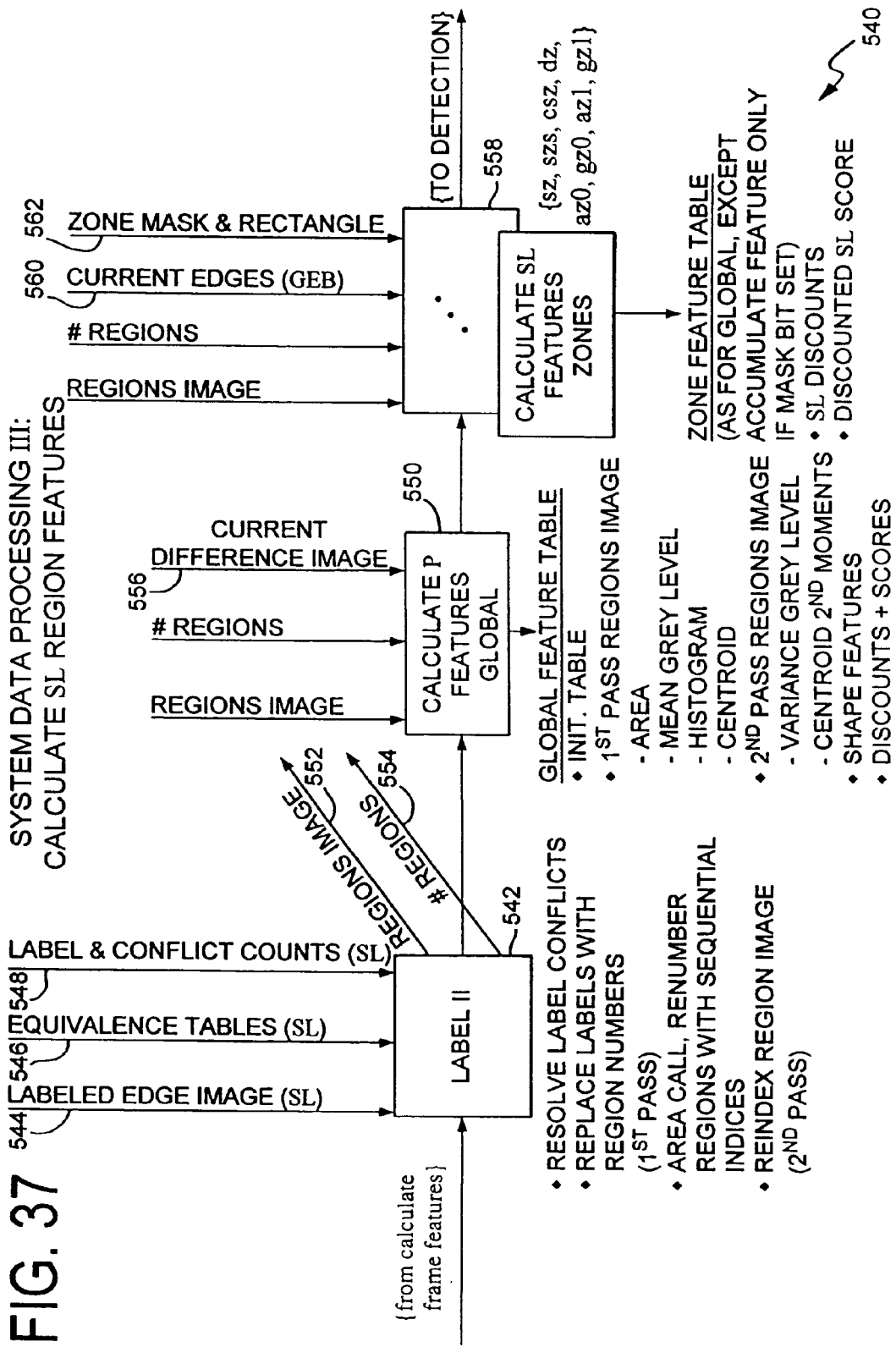
FIG. 37 is a simplified block diagram of the feature generation system of FIG. 33, having a label module, a calculate global shadow and lightbeam features module, and a calculate shadow and lightbeam zone features module.

Turning to FIG. 37, a simplified block diagram of the feature generation system 540 of FIG. 33, having a label module, a calculate global shadow and lightbeam (SL) features module, and a calculate shadow and lightbeam zone features module.

The label module 542 receives presence input in the form of labeled edge image 544, equivalence tables 546, and label and conflict counts 548. The label module 542 resolves pixel labeling conflicts within the region, it replaces labels with region numbers, it makes an area call, renumbering regions with sequential indices, and re-indexes the region again, passing data related to the number of regions and regions image to the calculate global presence features model 550.

The calculate global presence features model 550 uses the regions image 552, the number of regions 554 and the current difference image to create a global feature table. The global feature table is first initialized, regions are labeled as to area, mean grey level intensity, histogram, and centroid. The region image is then recalculated for variance of grey level and centroid second movements, listing the shape features of the image within the region.

The calculate SL feature zones module 558 takes the aforementioned regions image 552, number of regions 554, the current edges (GEB) 560 and creates a zone feature table using zone mask and rectangle 562. The system 540 determines motion in zones by calculating detection in a safety zone, a secondary safety zone, a door zone, a first activation zone, a second activation zone, a first guard zone, and a second guard zone.

Figure 38:
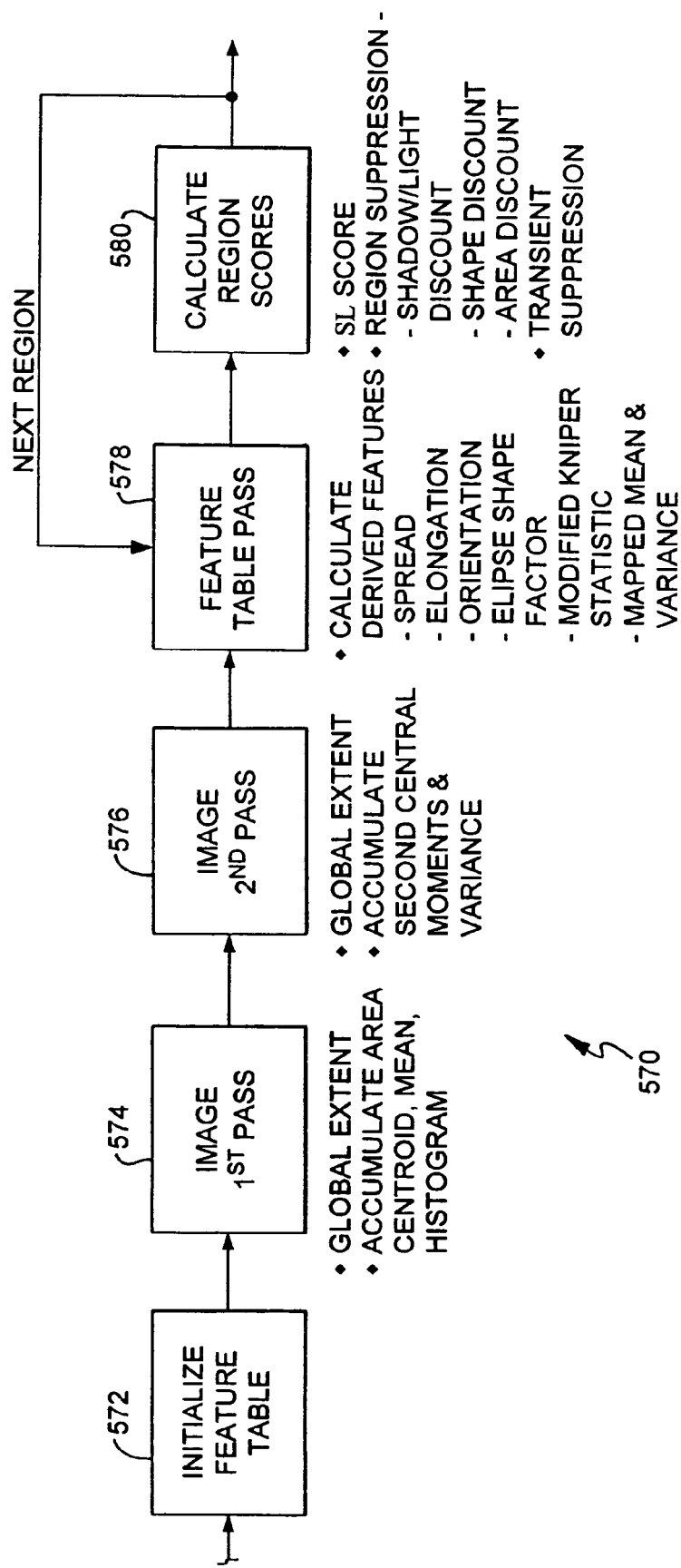
FIG. 38 is a simplified block diagram of the calculate shadow and lightbeam region features system of FIG. 37, for calculating global shadow and lightbeam features.

Turning to FIG. 38, a simplified block diagram of the calculate shadow and lightbeam region features 570 system of FIG. 37, for calculating global shadow and lightbeam (SL) features.

The global SL features are calculated first by initializing the edge counts of the feature table 572. The global extent of the image is calculated in the image first pass module 574. Area, centroid, mean, histogram and edge counts are accumulated and put through the image second pass module 576 where a second central moments and variance is accumulated. The feature table pass module 578 calculates the derived features including the spread, elongation, orientation, ellipse shape factor of the region, modified kniper statistic and mapped mean and variance. The calculate region scores module 580 determines the SL score with region suppression from shadow and light beam discount, shape discount, and area discount and with transient suppression. After region scores are calculated 580, the next region is looped through the calculations of the feature table pass module 578.

Figure 39:
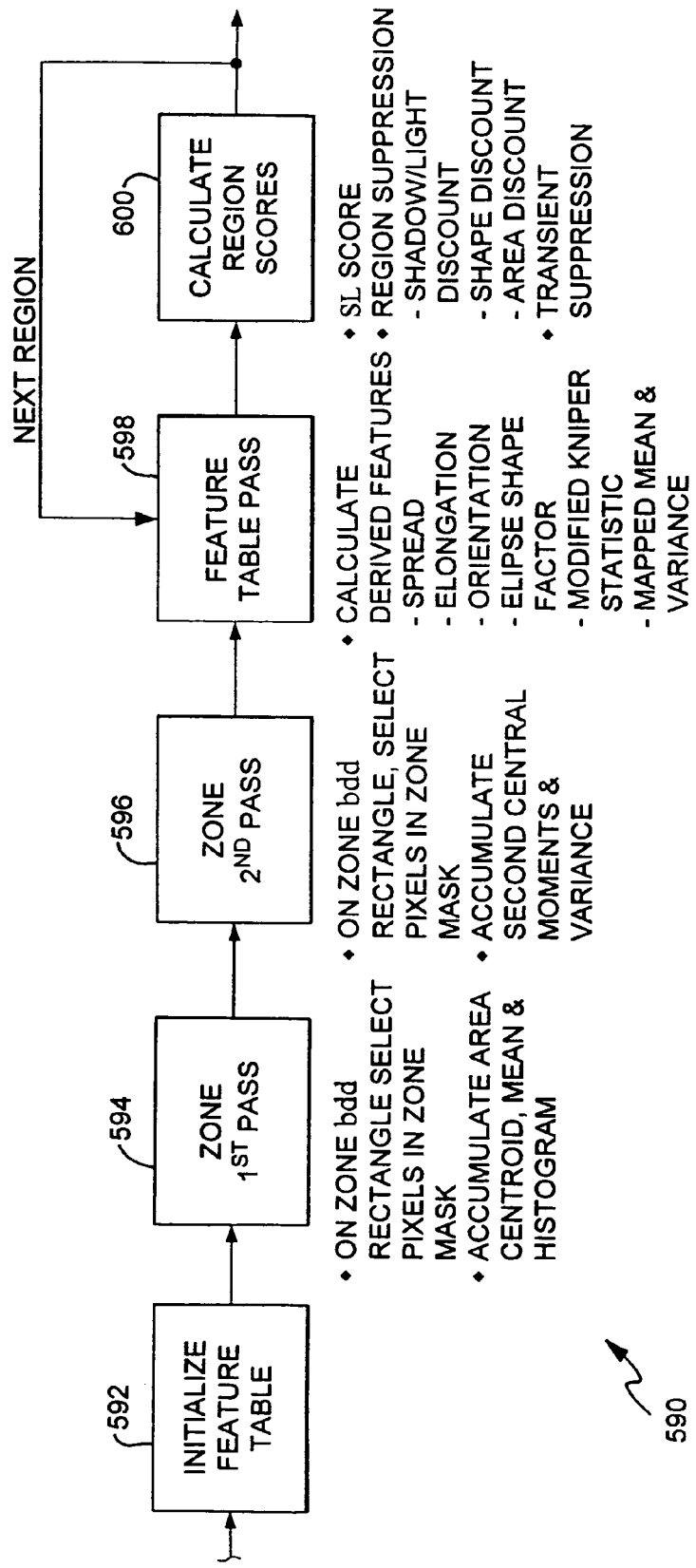
FIG. 39 is a simplified block diagram of the calculate shadow and lightbeam region features system of FIG. 37, for calculating shadow and lightbeam zone features.

Turning to FIG. 39, a simplified block diagram of the calculate shadow and lightbeam region features 590 system of FIG. 37, for calculating shadow and lightbeam (SL) zone features.

The zone SL features are calculated first by initializing the zone counts of the feature table 592. The global extent of the zone is calculated in the zone first pass module 594. The zone is calculated to determine if pixels or zone rectangle are in the selected zone mask. Area, centroid, mean, and histogram are also accumulated and put through the image second pass module 596 where a second central moments and variance is accumulated. The feature table pass module 598 calculates the derived features including the spread, elongation, orientation, ellipse shape factor, modified kniper statistic, and mapped means and variance of the region. The calculate region scores module 600 determines the SL score with region suppression from shadow and light beam discount, shape discount, and area discount and with transient suppression. After region scores are calculated 600, the next region is looped through the calculations of the feature table pass module 598.

Figure 40:
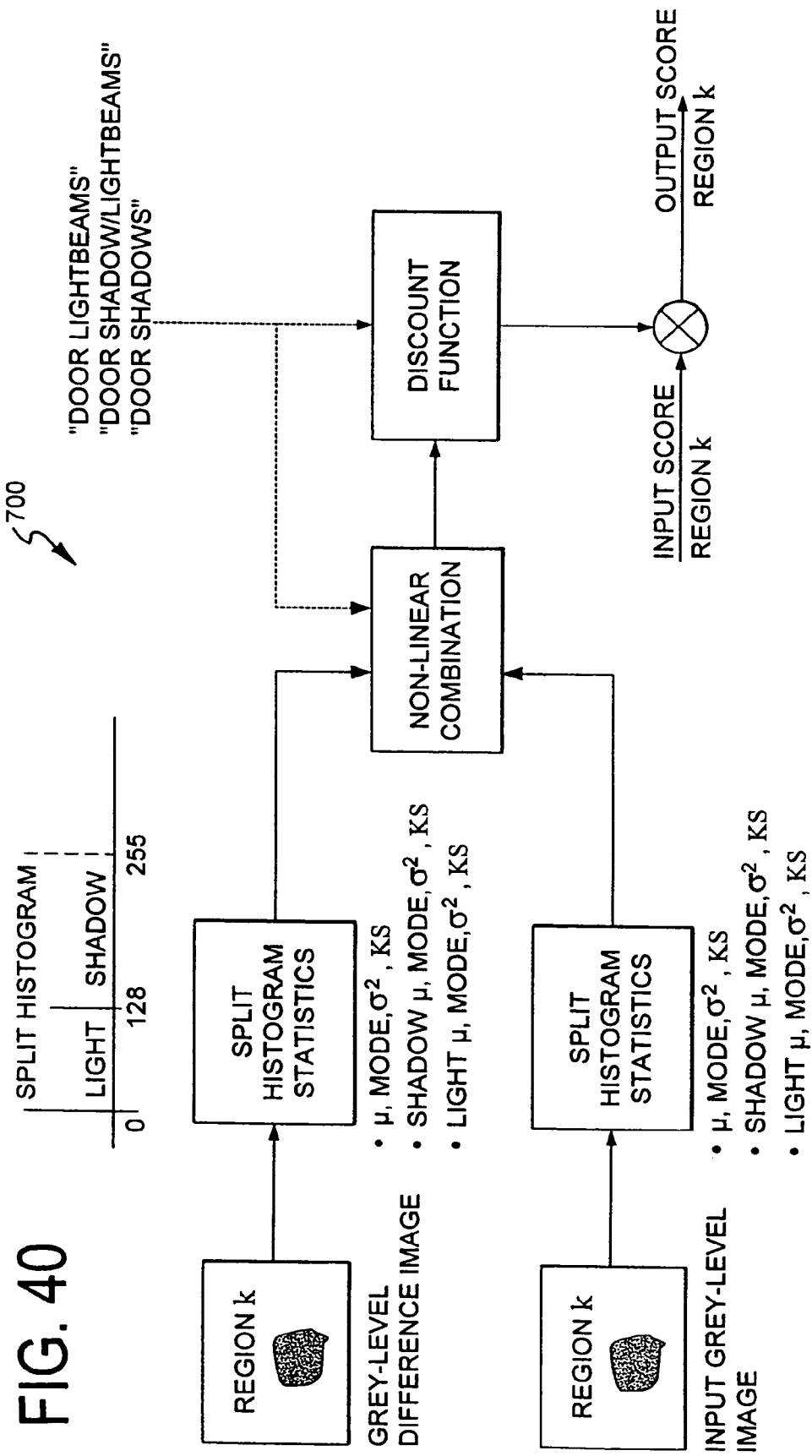
FIG. 40 is a simplified block diagram of a split histogram grey level analysis for the processing system of FIG. 16.

FIG. 40 provides a simplified block diagram of a split histogram grey level analysis 700 for the processing system of FIG. 16, and in particular the feature processing module 214. In an embodiment, the split histogram grey level analysis 700 can be provided to assists in the determination of region features.

Figure 41:
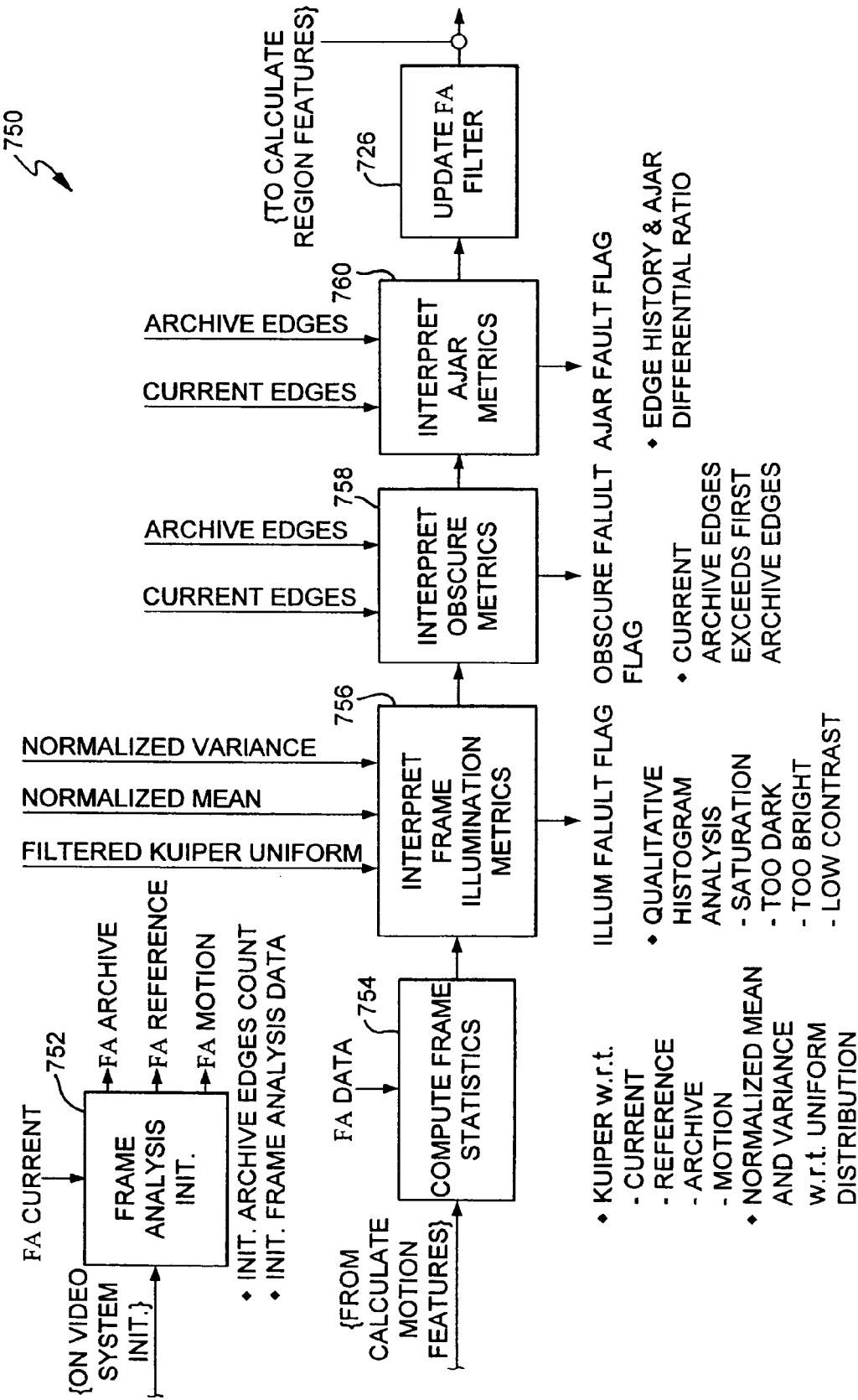
FIG. 41 is a simplified block diagram of the feature generation system of FIG. 33, for calculating frame features.

FIG. 41 provides a simplified block diagram of the feature generation system 750 of FIG. 33, for calculating frame features. The system 750 include a frame analysis initialization module 752, a compute frame statistics module 754, an interpret frame illumination metrics module 756, an interpret obscure metrics module 758, an interpret ajar metrics module 760, and an update FA filter 762.

Figure 42:
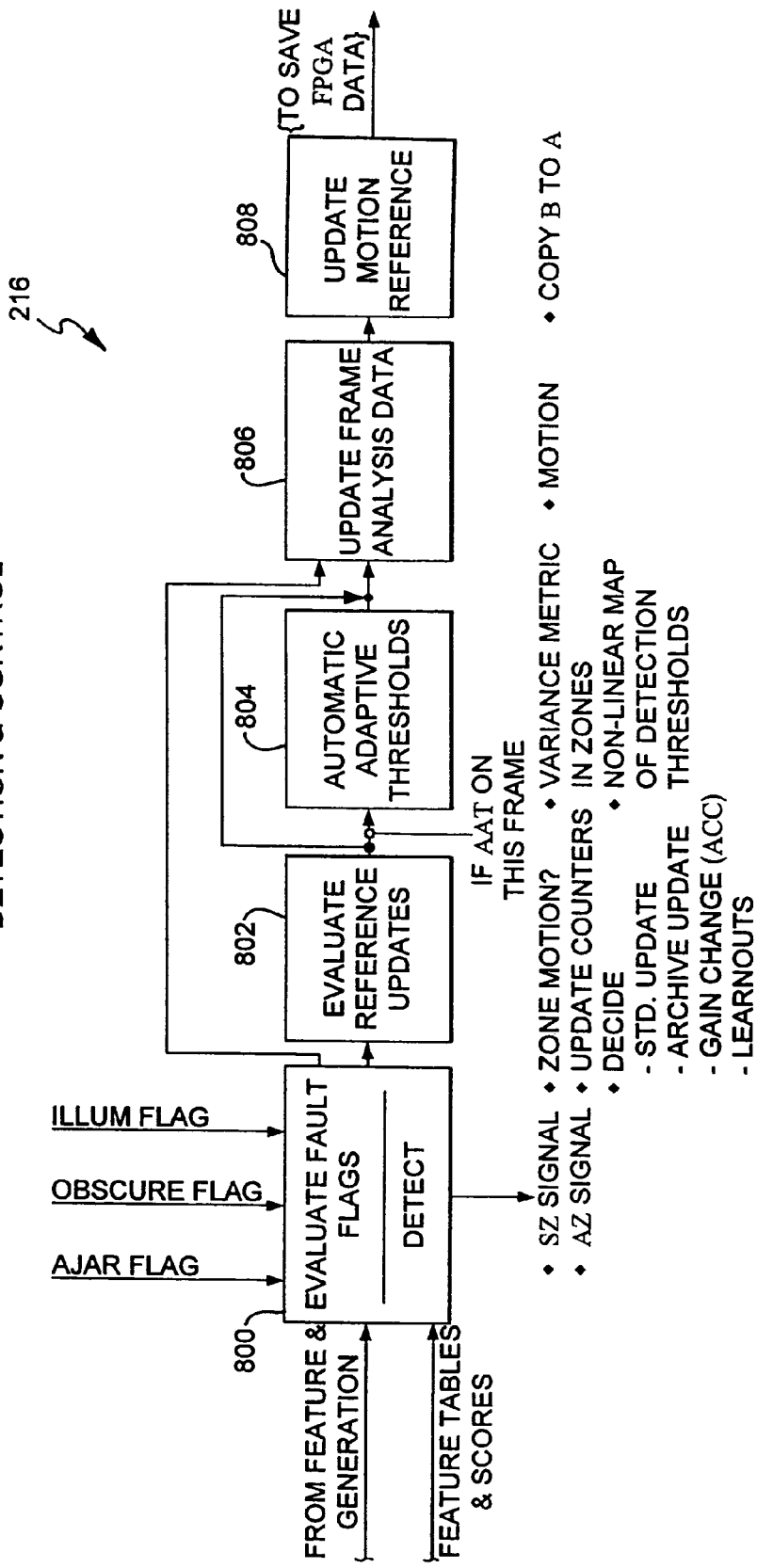
FIG. 42 is a simplified block diagram of the information processing module of FIG. 16, for detecting the presence of an object from features generated.

FIG. 42 is a simplified block diagram of the information processing module of FIG. 16, for detecting the presence of an object from features generated. The detection sequence includes an evaluate fault flags module 800, an evaluate reference updates module 802, an automatic adaptive thresholds module 804, an update frame analysis data module 806, and an update motion reference module 808.

Figure 43:
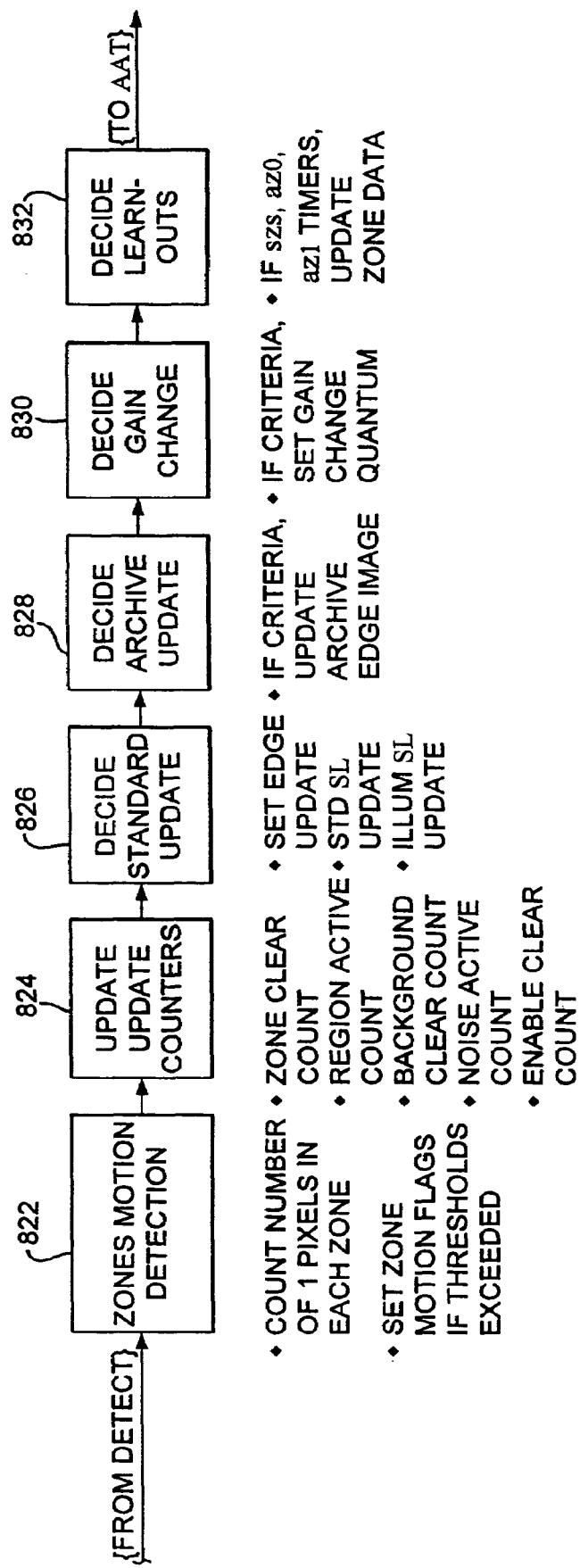
FIG. 43 is a simplified block diagram of the information processing module of FIG. 16, for evaluating and updating reference images.

FIG. 43 is a simplified block diagram of the information processing module of FIG. 16, for evaluating and updating reference images. The evaluate reference updates sequence includes a zones motion detection module 822, an update update counters module 824, a decide standard update module 826, a decide archive update module 828, a decide gain change module 830, and a decide learn-outs module 832.

Figure 44:
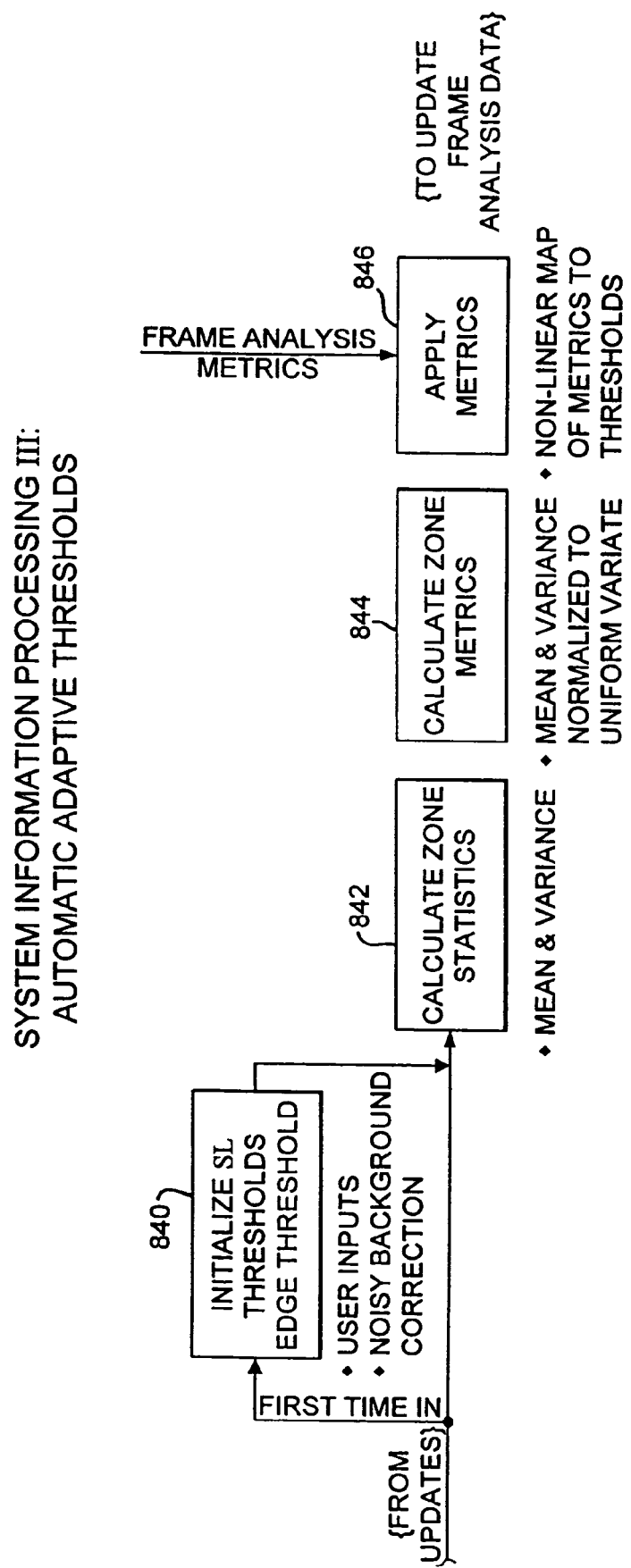
FIG. 44 is a simplified block diagram of the information processing module of FIG. 16, for changing threshold values relative to changing background values from the field of view.

FIG. 44 is a simplified block diagram of the information processing module of FIG. 16, for changing threshold values relative to changing background values from the field of view. The automatic adaptive thresholds sequence includes an initialize SL thresholds edge threshold 840, a calculate zone statistics module 842, a calculate zone metrics module 844, and an apply metrics module 846.

Figure 45:
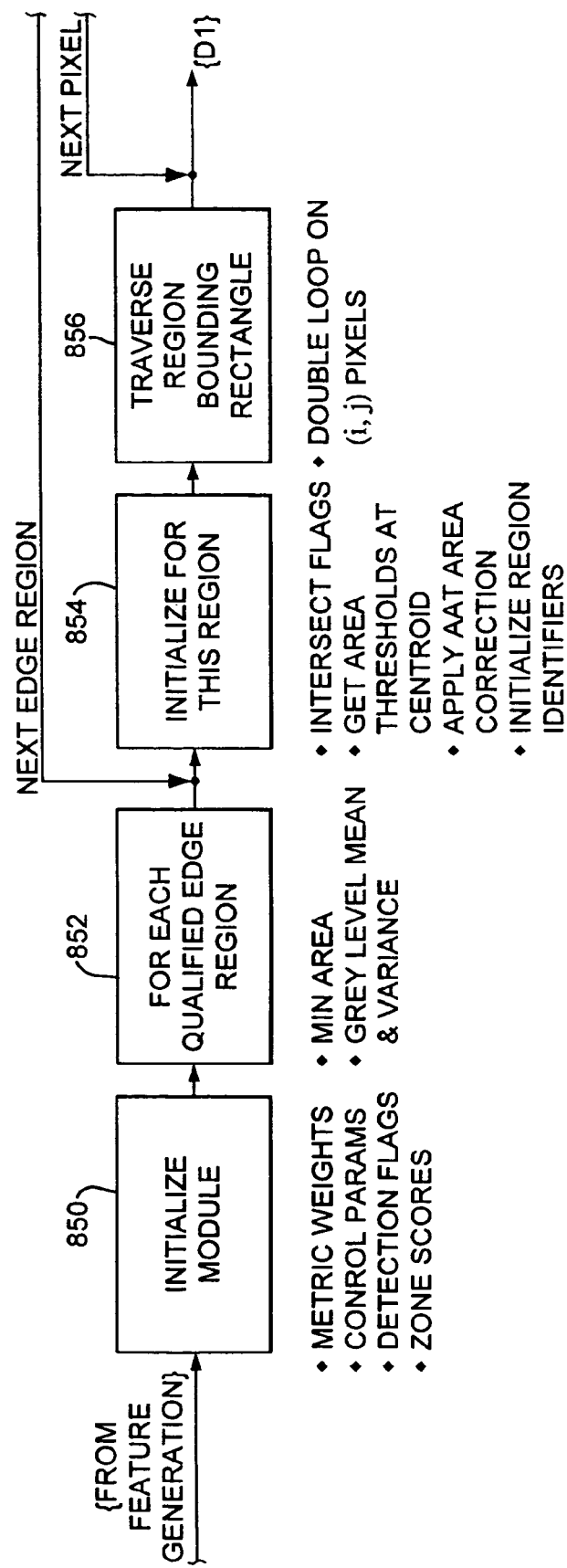
FIG. 45 is a simplified block diagram of the information processing module of FIG. 16, for determining the geometric association of edge and zone data in a detected object.

FIG. 45 is a simplified block diagram of the information processing module of FIG. 16, for determining the geometric association of edge and zone data in a detected object. The sequence includes an initialize module 850, an application for each qualified edge region 852, an application regarding initialization for a particular region 854, and a traverse region bounding rectangle module 856. The sequence then continues to FIG. 46.

Figure 46:
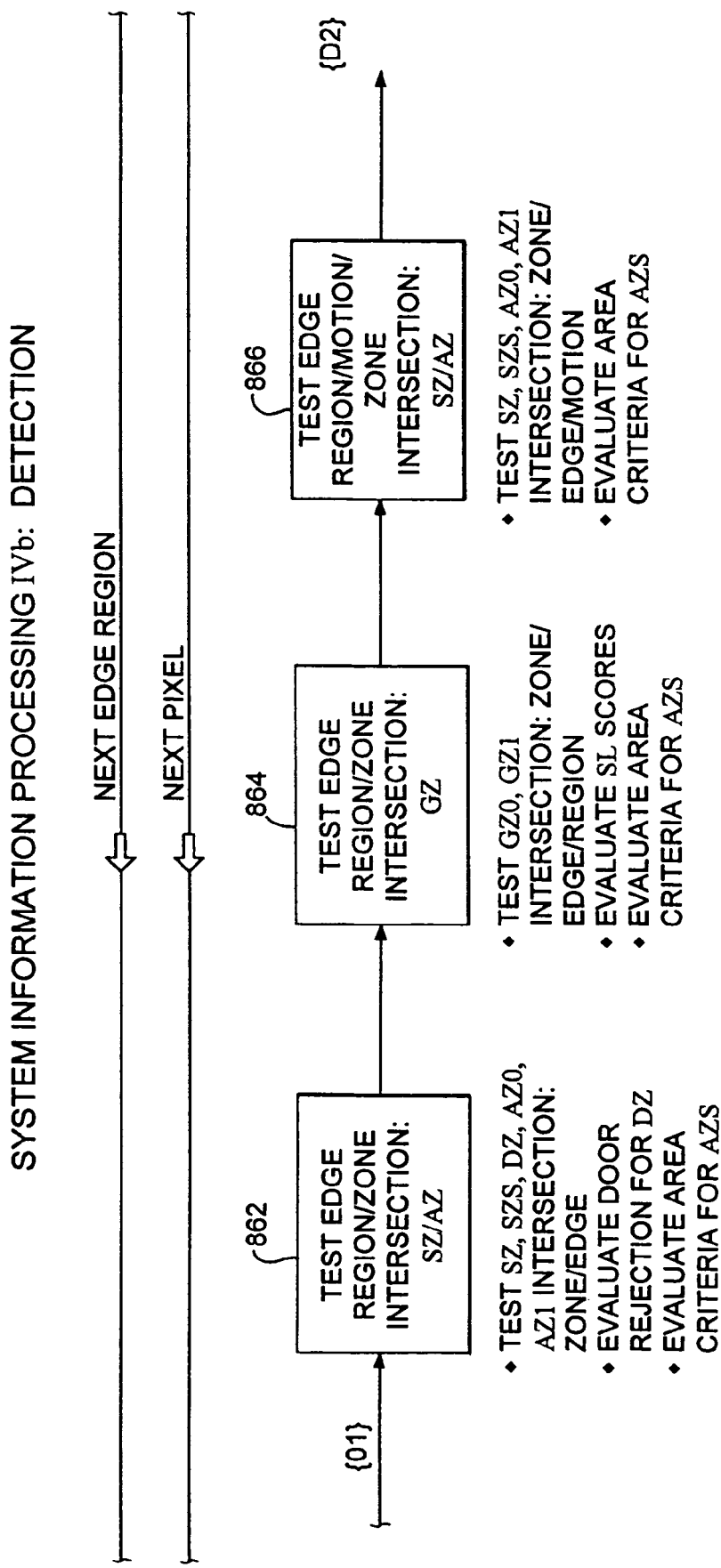
FIG. 46 is a continuation of FIG. 45 for the simplified block diagram of the information processing module of FIG. 16, and includes testing region edges to determine zone intersections in detected objects.

FIG. 46 is a continuation of FIG. 45 of the simplified block diagram of the information processing module of FIG. 16, and includes testing region edges to determine zone intersections in detected objects. The sequence includes a test edge region/zone intersection modules 862,864 and a test region/motion/zone intersection module 866.

Figure 47:
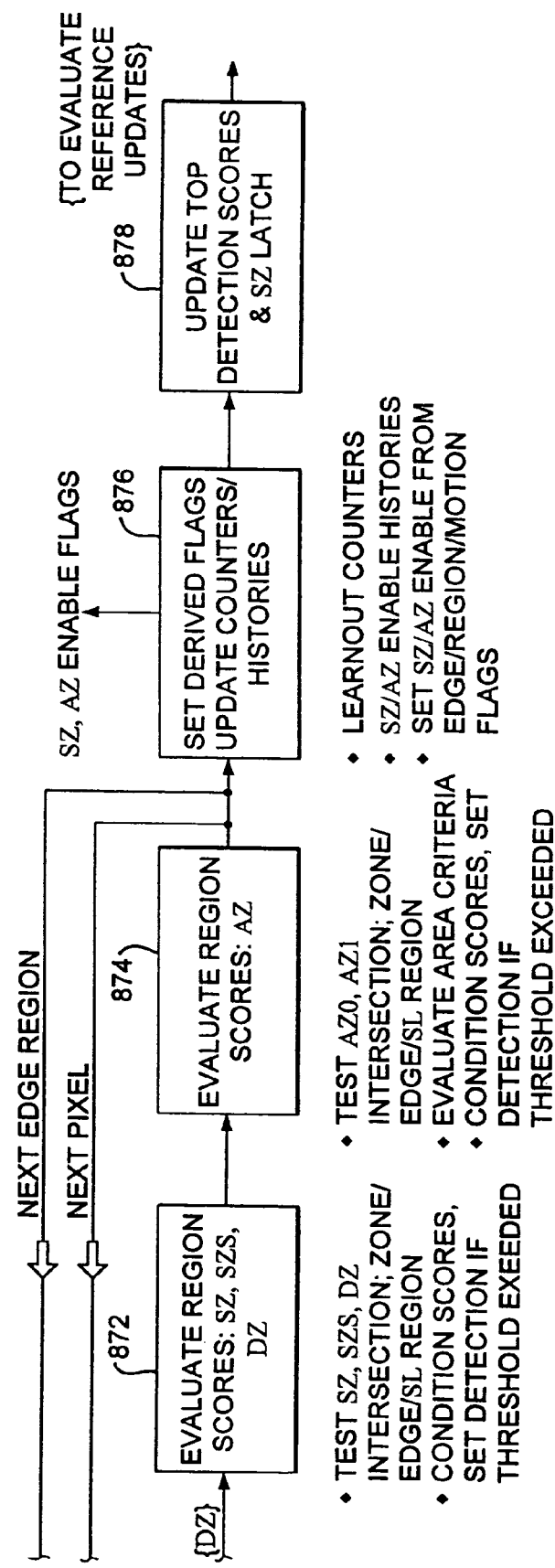
FIG. 47 is a continuation of FIG. 46 for the simplified block diagram of the information processing module of FIG. 16, and includes evaluating region scores of zones to determine zone intersections in detected objects.
Figure 50:
FIG. 50 is a representative example of a background or reference image.
Figure 51:
FIG. 51 is similar to FIG. 50 except it is a current image wherein an object has entered the field of view.

FIG. 47 is a continuation of FIG. 46 of the simplified block diagram of the information processing module of FIG. 16, and includes evaluating region scores of zones to determine zone intersections in detected objects. The sequence includes evaluate region scores modules 872,874, set derived flags update counter/histories module 876, and an update top detection scores & safety zone latch module 878.

In an embodiment, an automatic door control and safety system is provided that controls door behavior in accordance with logic that interprets a nominally optically sensed object situation and environment proximate to the door. The system uses a camera sensor sub-system fitted with an appropriate lens in order to generate an image of the desired sensing area. Digital images produced by the camera sub-system are processed using image processing in a processing sub-system in order to develop data used to drive specific decision logic to effect desired door control. Thus, door control is effected by computer interpretation of image content.

In an embodiment, from a processing point of view, the system incorporates several processing stages: 1) image formation; 2) image conditioning; 3) image processing; 4) image content processing; 5) derived data processing; 6) data interpretation processing; and 7) control logic processing.

The door control and safety system is supported by hardware elements to include the camera sub-system, and a general purpose processor sub-system that can be augmented by a digital signal processing device. The camera sub-system can include a lens system, a charge-coupled device imaging device, amplifiers, and an analog-to-digital conversion element. These element can be commonly found together in home computer applications, for example, which interface a digital camera to produce digital images on the computer screen for capture and storage for a variety of purposes.

The system uses a selection of image processing operators, implemented in an algorithm, and subsequent derived data processing and interpretation. The selected image processing operators and image content processing are derived through the optical phenomena exhibited by objects within the field of view of the camera. The image processing operates on the numbers contained in the array representative of scene determined though the lens and camera mounting geometry. This image processing creates internal arrays of numbers which are the results of the image processing, to be used by subsequent operations thus forming a sequence of image processing operations.

In an embodiment of the system, the entire image field is processed. Furthermore, there are no prior assumptions about target objects used to develop any processing elements designed to match anticipated object characteristics for the purpose of selecting subsets of the entire image field.

At the beginning of the image processing sequence, the image processing accepts a new input image of the scene (which is a single time sample ("frame") of the on-going image digitization stream). Storage is provided in order to maintain a previous image frame for comparison to a newly captured image frame (a "background" image). This stored image frame is captured in the same way as a new frame, and, in particular, is a single image frame, not an average of more than one frame.

In an embodiment, each new image frame is filtered to remove speckle noise using a median filter. The median filter removes isolated noise while not blurring the image as does averaging. Such isolation noise may be due to imaging sensor noise, downstream electronics noise or environmentally-produced scintillation. The image stored for comparison is filtered one with the median filter, as is the current image. The median filter in can be implemented as a 3×3 filter kernel that is passed over every pixel in the image array. The value at the center of the kernel is deposited in a new image array, and the value is that which is the median of the nine numbers in the filter kernel.

Figure 52:
FIG. 52 is the difference between subtracting the reference image in FIG. 50 from the current image in FIG. 51.

After image filtering, two new image arrays are generated (i.e., FIGS. 52 and 53). The first new image array (FIG. 52) is determined as the pixel-by-pixel difference of the current image minus the background image ("positive contrast"). The second new image array (FIG. 53) is determined as the pixel-by-pixel difference fo the background image minus the current image ("negative contrast"). The images are maintained as arrays of 8-bit numbers, so that when difference values are greater than 255 or less than 0, values are clipped accordingly.

After differencing, the images still contain 8-bit values. (Images with multiple bit levels are commonly referred to as grey-scale images). After image differencing, a thresholding operator is applied to each of the resulting positive and negative contrast grey-scale images. The threshold values applied to the two images may be different. The values can be fixed or adaptive wherein changes are made based on downstream image interpretation results. The pixel-by-pixel thresholding operation produces two new images. For each image, when the grey level in the input image exceeds the associated threshold value, a "1" is placed in the output image array, otherwise a "0" is placed. The result of the thresholding operation is thus two "binary" images.

Turning to FIGS. 54 and 55, selected binary image processing techniques of mathematical morphology are applied to the binary images to facilitate downstream image interpretation. In an embodiment, operators are selected to remove isolated binary regions that could not be from significant objects, while improving the "connectedness" of larger regions that may be significant. Referred to as shape filtering, each of the two binary images are filtered similarly to the median filter mechanism (a 3×3 spatial kernel), except that the filter kernel operation is a maximum operator followed by a minimum operation, not the median operation. Such a filter is referred to as a binary closing or "close." A "close" is a "dilation" followed by an "erosion." The "dilation" is the maximum operation on the kernel, and the "erosion" is the minimum operation.

Turning to FIG. 56, the two closed binary images (FIGS. 54 and 55) are logically OR-ed pixel-by-pixel to produce a resultant binary image representative of both positive and negative contrast differences with respect to the input images.

Turning to FIG. 57, a connected components algorithm is applied to the resultant binary OR image (FIG. 56). This algorithm identifies all the connected binary regions in the image. A connected region is one wherein every member pixel is a neighbor of at least one other member pixel. The connected components algorithm labels each region and builds a database containing derived features of each region. In an embodiment, the features can include region area, bounding rectangle, circularity, ellipse major and minor axis lengths, and perimeter. The region feature data is processed to select regions of interest. The regions are a direct result of the presence of the object in the field of view. No operator selection of sub-image regions of the total image field is involved in selecting the object-related regions—the regions are determined by the object.

With a database representative of image content, the features of each region are considered by interpretation logic to develop control logic decisions. In an embodiment, the interpretation logic is implemented as a set of "if-then-else" constructs, and can utilize arithmetic combination of the basic region features in order to determine image content interpretation. For instance, the resulting region area can be used to infer the presence of an object of interest, and the region centroid and bounding rectangle determine the location of that object. (The bounding rectangle is the smallest rectangle that includes all pixels belonging to the region.)

In an embodiment, the operator can define rectangular regions of the image field of view to determine areas for specific control actions. The bounding rectangle coordinates of the computer-derived object regions of interest are compared to the coordinates of the operator-determined decision regions in order to determine subsequent control logic results. If an object is declared to be in the safety zone, for example, the control logic indicates that the door should remain open until the safety zone is clear. Similarly, if an object is determined to be in the activation zone (the binary region bounding rectangle representative of the image object intersects the activation zone decision rectangle), then the signal is sent to open the door. In an embodiment, the image regions selected by the operator for control logic purposes are not used in any way to initialize or otherwise influence the image processing of the entire image in order to determine image content.

While the specific embodiments have been illustrated and described, numerous modifications come to mind without significantly departing from the spirit of the invention, and the scope of protection is only limited by the scope of the accompanying claims.

The invention claimed is:

1. An input device for communication with a controller for an automatic door comprising:
   a first sequencing key which is configured to prompt a user to enter a first set of data into the device when actuated a first time and prompt the user to enter a second set of data when actuated a second time;
   at least one input key;
   at least one input; and,
   a display for displaying user input and pre-stored user options for selection in response to prompts from the first sequencing key.

2. The device of claim 1 wherein the display displaying only a portion of the pre-stored data to be displayed for each actuation of the at least one input key.

3. The device of claim 1 including an input selector which accepts and stores user input when actuated.

4. The device of claim 1 including a second sequencing key which is configured to prompt a user to enter a third set of data into the device using a first display key when actuated a first time and prompt the user to enter a fourth set of data into the device using the first display key when actuated a second time.

5. The device of claim 4 including a third sequencing key which is configured to prompt a user to enter a fifth set of data into the device using a first display key when actuated a first time and prompt the user to enter a sixth set of data into the device using the first display key when actuated a second time.

6. The device of claim 5 wherein the first and third sequencing keys are configured with a hierarchy, the hierarchy allowing the first sequencing key to override operation of the third sequencing key.

7. The device of claim 5 wherein the first, second and third sequencing keys are configured with a hierarchy, the hierarchy allowing the first sequencing key to override the operation of the second and third sequencing keys.

8. The device of claim 4 wherein the first and second sequencing keys are configured with a hierarchy, the hierarchy allowing the first sequencing key to override operation of the second sequencing key.

9. The device of claim 1 including a second sequencing key which is configured to prompt a user to enter a third set of data into the device using the first display key when actuated a first time and prompt the user to enter a fourth set of data into the device using a second display key when actuated a second time.

10. The device of claim 1 including a third sequencing key which is configured to prompt a user to enter a fifth set of data into the device using a first display key when actuated a first time and prompt the user to enter a sixth set of data into the device using a second display key when actuated a second time.

11. The device of claim 1 wherein the at least one input is a numerical input.

12. The device of claim 1 wherein the at least one input is an alpha input.

13. A sensor system for controlling an automatic door which has a door panel selectively blocking an opening comprising:
   a sensor having a field of view of areas of interest about the opening and a signal output relative to objects sensed in the field of view of the sensor;
   a signal processor responsive to sensor output signals;
   a door drive responsive to the signal processor; and,
   an input device having a signal output, the signal processor responsive to output signals from the input device,
   wherein the input device having a pose input for permitting input data indicative of the pose of the sensor as mounted to obtain the field of view, the pose input including at least one of the group consisting of installed height of the sensor, width of the opening, and distance of the sensor from the opening.

14. The sensor system of claim 13 wherein the pose input includes a nominal height of the sensor.

15. The sensor system of claim 13 wherein the pose input includes a model number of the door associated with the field of view.

16. The sensor system of claim 13 wherein the pose input includes the side of the opening on which the sensor is installed.

17. The sensor system of claim 13 wherein the pose input includes a length of the opening.

18. The sensor system of claim 13 wherein the pose input includes a first position of an activation zone.

19. The sensor system of claim 13 wherein the pose input includes a second position of an activation zone.

20. The system of claim 13 wherein the sensor is a camera.

21. The sensor system of claim 13 wherein the sensor signal output includes object boundary coordinates.

22. The sensor system of claim 13 wherein the signal processor is selected from at least one of the group consisting of CPUs, FPGAs, and video digitizers.

23. A sensor system for controlling an automatic door which has a door panel selectively blocking an opening, the sensor system comprising:
   a sensor configured to sense objects in a field of view; and,
   an input device having an output for communication with a controller for the automatic door, and an input relative to at least one of the group consisting of installed sensor height, width of the opening, and distance of the sensor from the opening.

24. The system of claim 23 wherein the input device having a data set stored relative to door model.

25. The system of claim 23 wherein the sensor is a camera.

26. A system for controlling an automatic door which selectively blocks an opening, the system comprising:
   a sensor configured and adapted to sense one of either active or passive energy or both from a field of view;
   an imager configured to form an image from the energy sensed by the sensor;
   an image analyzer responsive to the imager, the image analyzer being configured and adapted to define image content information from the image;
   a decision maker responsive to the image analyzer, the decision maker being adapted and configured to make determinations about the objects in the field of view based upon the image content information, and having a first decision metric, the first decision metric being based upon the relationship of selected image information content to a first predetermined area of zone within the image; and,
   a door controller for controlling at least the opening and closing of the door, the door controller being responsive to the decision maker.

27. The system of claim 26 wherein the decision maker having a first decision metric, the first decision metric being based upon the relationship of selected image information content to a second predetermined area or zone within the image.

28. The system of claim 27 wherein the selected image information content is indicative of the presence of a stationary object.

29. The system of claim 28 wherein the relationship to the area or zone includes whether at least a portion of the object is within the first or second predetermined zones.

30. The system of claim 27 wherein the relationship to the area or zone includes whether at least a portion of an object is within the first or second predetermined zones.

31. The system of claim 26 including a geometry mapper which translates the dimensions and geometries of the field of view to coordinates.

32. The system of claim 31 wherein the coordinates represent the edges of the objects in the field of view.

33. The system of claim 31 wherein the image content information includes polar coordinates related to an object in the field of view.

34. The system of claim 26 wherein the sensor is a camera.

35. The system of claim 26 wherein the energy sensed by the sensor to form an image includes boundary information.

36. The system of claim 35 wherein the boundary information includes boundary coordinates representing edges of an object.

37. The system of claim 26 wherein the image content information includes boundary coordinates.

38. The system of claim 37 wherein the boundary coordinates represent edges of an object.

39. The system of claim 26 wherein the imager is selected from at least one of the group consisting of CPUs, FPGAs, signal processing devices and video digitizers.

40. The system of claim 26 wherein the image analyzer is selected from at least one of the group consisting of CPUs, FPGAs, signal processing devices and video digitizers.

41. The system of claim 26 wherein the decision maker selected from at least one of the group consisting of CPUs, FPGAs, signal processing devices and video digitizers.

42. A system for controlling a door comprising:
a sensor for collecting image data;
a control unit receiving the data from the sensor, wherein the control unit has a means for defining at least a portion of an image as a control zone;
a drive motor for controlling the opening and closing of the door, the drive motor receiving control signals from the control unit; and,
a first control zone wherein selected image data within the first control zone will cause a control signal to open the door.

43. The system of claim 42 including a second control zone wherein selected image data within the second control zone will generate a first control condition preventing the door from closing.

44. The system of claim 43 wherein
the control unit analyzes the image data in the second control zone at a first time;
the control unit analyzes the image data in the second control zone at a second time; and
the control unit compares the image data at the first time and the image data at the second time to determine whether an object is present in the first control zone.

45. The system of claim 43 further including a third control zone wherein selected image data within the third control zone will generate a second control condition preventing the door from closing.

46. The system of claim 43 wherein the second control zone comprises a plurality of predetermined shapes.

47. The system of claim 46 wherein the third control zone comprises a plurality of predetermined shapes, the shapes of the third control zone being complementary to the shapes of the second control zone.

48. The system of claim 47 wherein
the control unit analyzes the image data in the third control zone at a first time;
the control unit analyzes the image data in the third control zone at a second time; and
the control unit compares the image data at the first time and the image data at the second time to determine whether an object is present in the third control zone.

49. The door of claim 42 wherein the means for defining includes defining the image as a pixel map and choosing coordinates from all pixel coordinates by direct access within the control zone.

50. The system of claim 42 wherein the means for defining includes choosing from multiple predefined zones.

51. The system of claim 42 wherein the means for defining includes putting real objects in a field of view so as to delineate boundary coordinates and the real objects become part of the image data, the control zone being defined from the real objects image data.

52. The system of claim 42 wherein
the control unit analyzes the image data in the first control zone at a first time;
the control unit analyzes the image data in the first control zone at a second time; and
the control unit compares the image data at the first time and the image data at the second time to determine whether an object is present in the first control zone.

53. The system of claim 52 wherein the object is analyzed to determine if any portion of the object is within the first control zone.

54. The system of claim 53 wherein the selected image data within the first control zone causes the control signal to open the door if any portion of the object is within the first control zone.

55. The system of claim 54 wherein the control unit chooses a portion of the object to determine a bottom edge of the object.

56. The system of claim 55 wherein the control unit analyzes the bottom edge to determine if the bottom edge is within the first control zone.

57. The system of claim 56 wherein a fourth control zone is defined adjacent the first control zone, the fourth control zone possessing objects between the first control zone and the sensor.

58. The system of claim 57 wherein the fourth control zone is between the first control zone and the camera.

59. The system of claim 58 wherein the presence of the object in the fourth control zone will prevent the first control zone from sending the control signal to open the door.

60. The system of claim 59 wherein the presence of the object in the fourth control zone will cause the first control zone to send the control signal to open the door.

61. The system of claim 42 wherein the first control zone includes means for comparing the image data to a plurality of user specified dimensions.

62. The system of claim 42 wherein the sensor senses energy selected from the group consisting of: visible light waves, infrared lights waves, microwaves, radar, laser, and sound waves.

63. The system of claim 42 wherein a user can enter data to define at least one control zone parameter from the group consisting of area, location, shape, number of control zones and control criteria.

64. The system of claim 42 wherein the sensor is a camera.

65. The system of claim 42 wherein the image data includes boundary coordinates.

66. The system of claim 65 wherein the boundary coordinates are polar coordinates.

67. A system for controlling a door comprising:
   a sensor, the sensor having, for example, a beam for sensing coherent energy from objects near the door;
   a control unit receiving electronic values from the sensor indicative of energy sensed by the camera;
   a drive motor for controlling the opening and closing of the door, the drive motor receiving control signals from the control unit; and
   means for defining a portion of a beam pattern as a control zone wherein the control zone is defined within a beam pattern.

68. The system of claim 67 wherein the electronic values representing energy sensed by the sensor are coordinate values.

69. The system of claim 68 wherein the coordinate values represent boundaries of the energy sensed.

* * * * *

UNITED STATES PATENT AND TRADEMARK OFFICE
CERTIFICATE OF CORRECTION

PATENT NO. : 7,522,745 B2
APPLICATION NO. : 10/363149
DATED : April 21, 2009
INVENTOR(S) : Grasso et al.

It is certified that error appears in the above-identified patent and that said Letters Patent is hereby corrected as shown below:

| | |
|---|---|
| Claim 4, Column 19, line 28 | add "for" – "when actuated for a second" |
| Claim 10, Column 19, line 59 | replace "a second" with "the first" – "device using the first a second display key" |
| Claim 14, Column 20, line 15 | replace "nominal" with "normal" – "includes a nominal normal height of the sensor." |
| Claim 26, Column 20, line 61 | replace "of" with "or" – "predetermined area of or zone" |
| Claim 44, Column 21, line 63 | replace "first" with "second" – "present in the first second control zone" |
| Claim 48, Column 22, line 9 | delete "at" – "zone "at" a first time" |
| Claim 52, Column 22, line 31 | replace "unit" with "zone" – "zone unit at a second time; and" |
| Claim 58, Column 22, line 54 | replace "camera" with "sensor" – "the first control zone and the camera sensor." |
| Claim 62, column 22, line 66 | replace "lights" with "light" – "waves, infrared lights light waves," |

UNITED STATES PATENT AND TRADEMARK OFFICE
CERTIFICATE OF CORRECTION

PATENT NO. : 7,522,745 B2
APPLICATION NO. : 10/363149
DATED : April 21, 2009
INVENTOR(S) : Grasso et al.

It is certified that error appears in the above-identified patent and that said Letters Patent is hereby corrected as shown below:

Claim 67, column 23, line 14      replace "camera" with "sensor" – "energy sensed by the ~~camera~~ sensor;

Signed and Sealed this

Second Day of June, 2009

JOHN DOLL
*Acting Director of the United States Patent and Trademark Office*